(12) United States Patent
Kumagai et al.

(10) Patent No.: US 8,423,948 B2
(45) Date of Patent: Apr. 16, 2013

(54) WIRING DESIGN SUPPORT DEVICE AND WIRING DESIGN SUPPORTING METHOD

(75) Inventors: Kazunori Kumagai, Yokohama (JP); Toshiyasu Sakata, Hino (JP); Eiichi Konno, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/418,470

(22) Filed: Mar. 13, 2012

(65) Prior Publication Data

US 2012/0240094 A1 Sep. 20, 2012

(30) Foreign Application Priority Data

Mar. 18, 2011 (JP) ................................. 2011-061667

(51) Int. Cl.
G06F 17/50 (2006.01)
(52) U.S. Cl.
USPC ............ 716/137; 716/118; 716/119; 716/126
(58) Field of Classification Search .................. 716/118, 716/119, 126, 137
See application file for complete search history.

(56) References Cited

U.S. PATENT DOCUMENTS

| 6,490,713 B2 | 12/2002 | Matsumoto |
| 6,510,544 B1 | 1/2003 | Matsumoto et al. |
| 7,454,736 B2 | 11/2008 | Kitamura |
| 2003/0005398 A1* | 1/2003 | Cho et al. ........................... 716/8 |
| 2007/0153702 A1* | 7/2007 | Khan Alicherry et al. ... 370/252 |
| 2010/0235804 A1 | 9/2010 | Ohtsuka et al. |

FOREIGN PATENT DOCUMENTS

| JP | 3184796 | 7/2001 |
| JP | 3224114 | 10/2001 |
| JP | 3548070 | 7/2004 |
| JP | 4443450 | 3/2010 |
| JP | 2010-211753 | 9/2010 |

* cited by examiner

Primary Examiner — Thuan Do
Assistant Examiner — Brian Ngo
(74) Attorney, Agent, or Firm — Fujitsu Patent Center

(57) ABSTRACT

A device includes a definition unit which defines a directional graph having a grid point as a node and a line connecting adjacent grid points as a branch, a generation unit which sets a branch connecting a grid pointing a wiring prohibited area in the branches of the directional graph to the capacity of "0", and which sets another branch to the capacity of "1", and which connects the starting point or the end point to each grid point of the wiring terminal indicated by wiring information, thereby generating a flow network, a search unit which searches the flow network for a path of a flow having the maximum amount of flow from the starting point to the end point, and a determination unit which determines a wiring path connecting the grid point indicated by the wiring information according to the search result of the path.

19 Claims, 43 Drawing Sheets

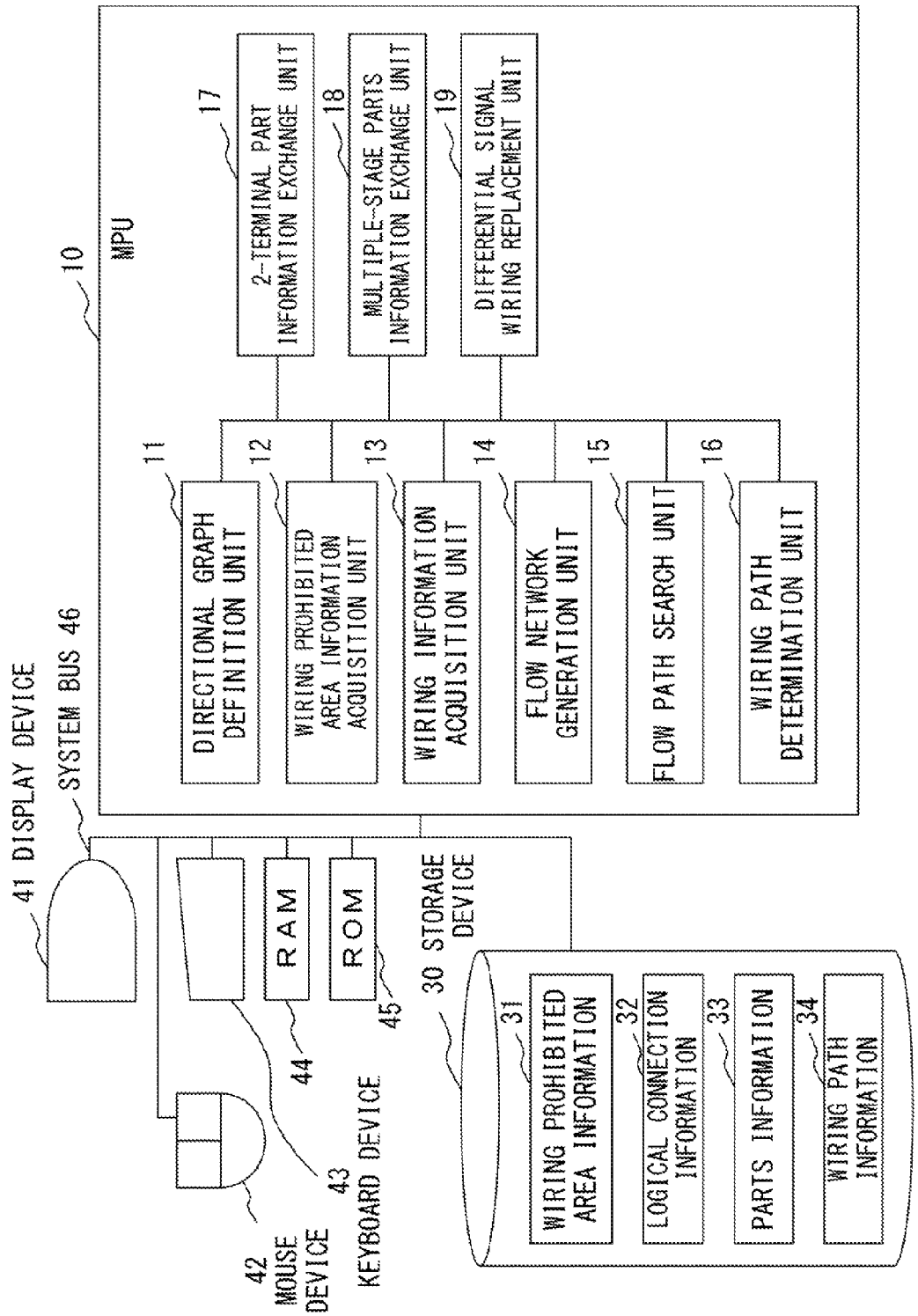
F I G. 1

FIG. 2

WIRING PROHIBITED AREA INFORMATION 31

| SHAPE | LAYER |
|---|---|
| RECTANGLE (Min(0, 0), Max(60000, 1000)) | L1~L12 |
| RECTANGLE (Min(0, 39000), Max(60000, 40000)) | L1~L12 |

LOGICAL CONNECTION INFORMATION 32

| CONNECTION NAME | STARTING POINT PIN NAME | END POINT PIN NAME |
|---|---|---|
| SIG-1 | LSI1.1 | R1.1 |
| SIG-2 | LSI1.2 | R2.1 |
| SIG-3 | LSI1.3 | R3.1 |
| SIG-4 | LSI1.4 | R4.1 |
| SIG-5 | LSI1.5 | R5.1 |

PARTS INFORMATION 33

| PARTS NAME | PARTS POSITION | DIRECTION | PIN NAME 1 | PIN POSITION 1 (RELATIVE COORDINATES) | PIN NAME 2 | PIN POSITION 2 (RELATIVE COORDINATES) | PIN NAME 3 | PIN POSITION 3 (RELATIVE COORDINATES) | ... |
|---|---|---|---|---|---|---|---|---|---|
| LSI1 | (44500, 27500) | 0 | 1 | (0, 0) | 2 | (1000, 0) | 3 | (2000, 0) | ... |
| LSI2 | (162000, 63000) | 0 | 1 | (0, 0) | 2 | (1000, 0) | 3 | (2000, 0) | ... |
| ... | ... | ... | ... | ... | ... | ... | ... | ... | ... |
| R1 | (62600, 72600) | 90 | 1 | (0, 0) | 2 | (1000, 0) | | | |
| R2 | (783900, 83700) | 180 | 1 | (0, 0) | 2 | (1000, 0) | | | |

WIRING PATH INFORMATION 34

| CONNECTION NAME | LAYER | COORDINATES 1 | COORDINATES 2 | COORDINATES 3 | COORDINATES 4 | ... |
|---|---|---|---|---|---|---|
| SIG-1 | L12 | (45000, 28000) | (45500, 28000) | (45500, 32000) | (52500, 32000) | ... |
| SIG-2 | L12 | (50000, 23000) | | | | |
| SIG-3 | L12 | (40000, 33000) | | | | |
| SIG-4 | L12 | (50000, 33000) | | | | |
| SIG-5 | L12 | (40000, 23000) | | | | |

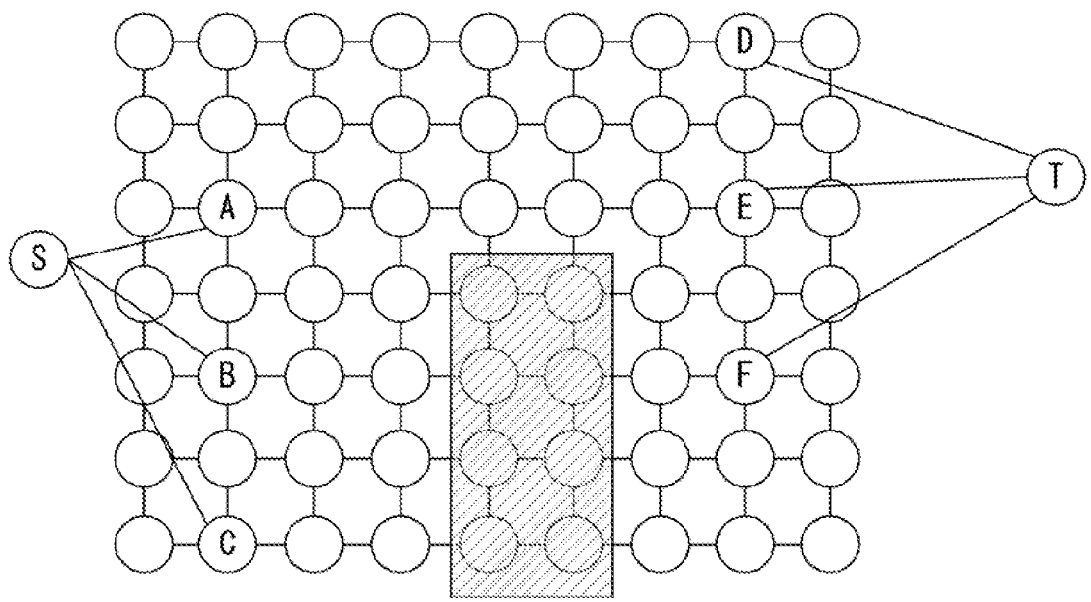
F I G. 7

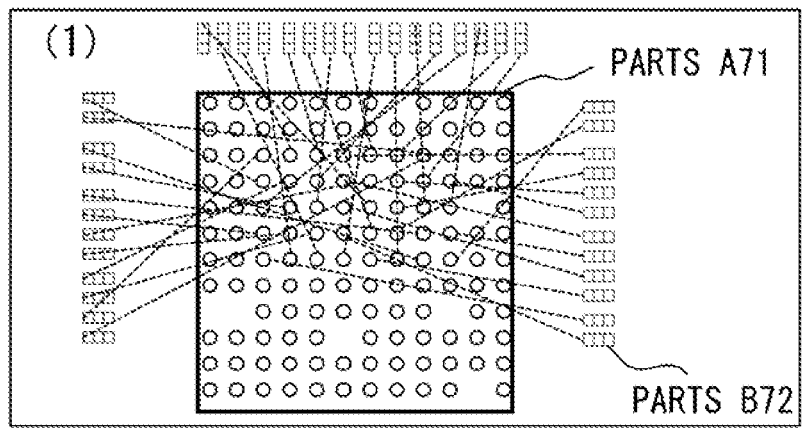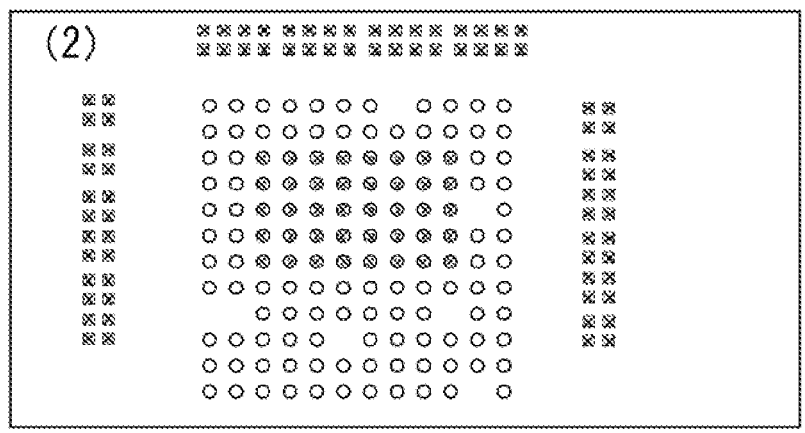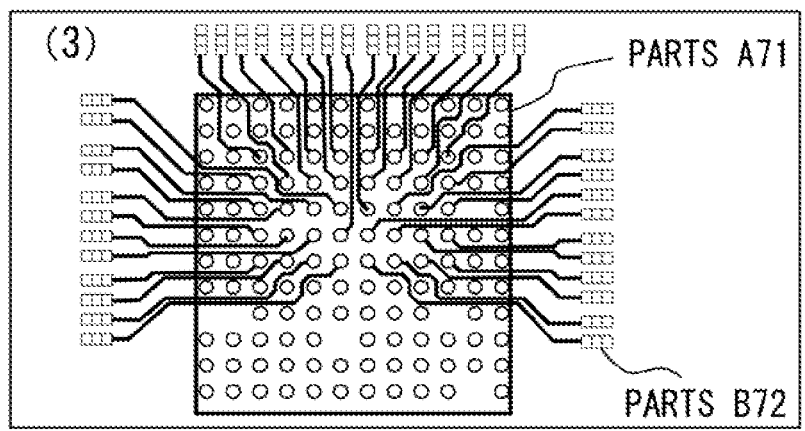
F I G. 1 0 A

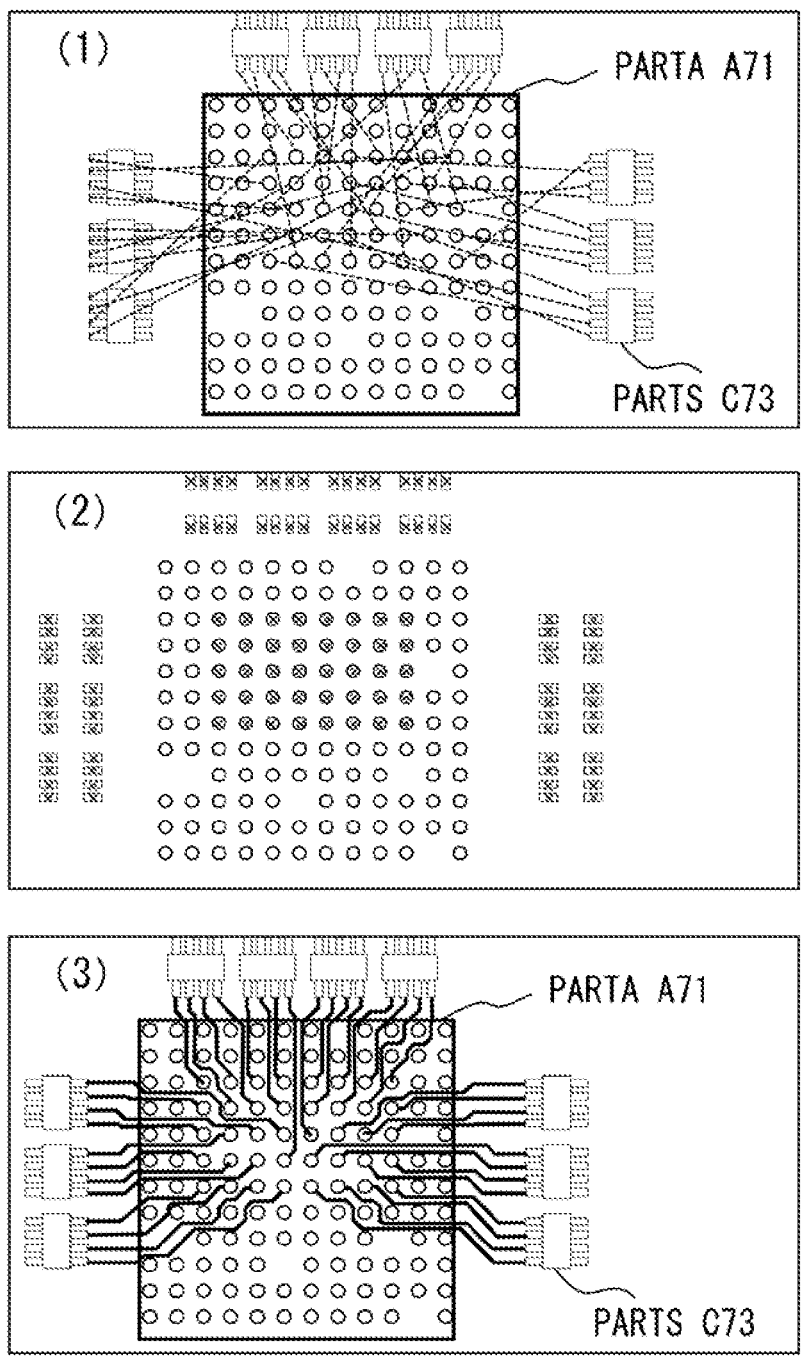
F I G. 1 0 B

FIG. 14A

NODE INFORMATION TABLE 81

| NUMBER | COORDINATES (X, Y) | NUMBER OF BRANCHES | BRANCH NUMBER 1 | BRANCH NUMBER 2 | BRANCH NUMBER 3 | ... | BRANCH NUMBER n |
|---|---|---|---|---|---|---|---|
| 1 | (25000, 25000) | 1 | 1 | | | | |
| 2 | (25000, 25000) | 4 | 2 | 3 | 4 | | |
| 3 | (26000, 25000) | 1 | 6 | | | | |
| 4 | (27000, 25000) | 4 | 7 | 8 | 9 | | |
| 5 | (27000, 25000) | 1 | 11 | | | | |
| ... | ... | ... | ... | ... | ... | ... | ... |
| S | NONE | 120 | 3762 | 2763 | 3764 | ... | 3882 |
| C | NONE | 1 | 2883 | | | | |
| ... | ... | ... | ... | ... | ... | ... | ... |
| T | NONE | 0 | | | | | |

BRANCH INFORMATION
TABLE 82

| NUMBER | NODE INFORMATION | CAPACITY |
|--------|------------------|----------|
| 1 | 2 | 1 |
| 2 | 3 | 1 |
| 3 | 5 | 1 |
| 4 | 7 | 1 |
| 5 | 9 | 1 |
| ⋮ |  | ⋮ |

F I G. 1 4 B

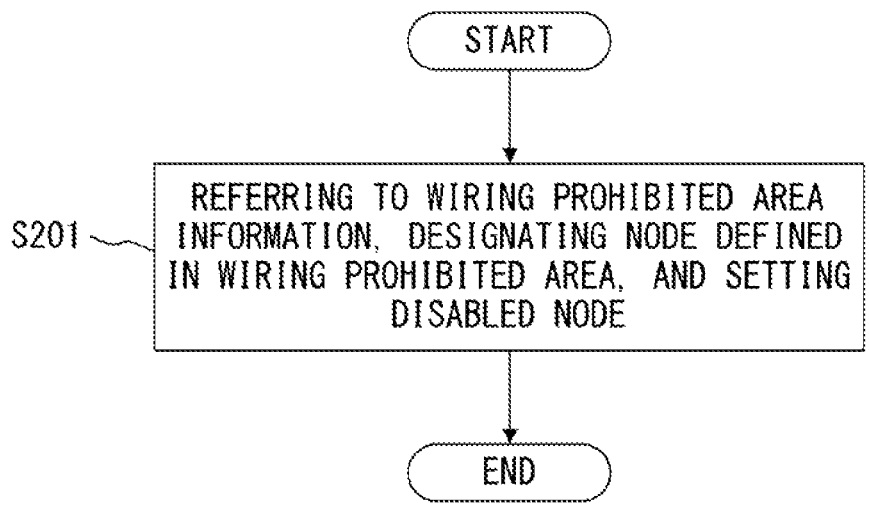
F I G. 1 5

| DISABLED NODE TABLE 83 |
| --- |
| NODE NUMBER |
| 843 |
| 4832 |
| 903 |
| 2934 |
| 382 |
| ⋮ |

F I G. 1 6

ENDPOINT ELEMENT
RESERVATION TABLE 84

| NODE NUMBER | PARTS PIN NAME | SET NUMBER | CONNECTION NUMBER | INVERSION |
|---|---|---|---|---|
| 215 | LSI1.32 | 0 | | 0 |
| 371 | LSI1.45 | 0 | | 0 |
| 6251 | LSI1.12 | 0 | | 0 |
| 3235 | LSI1.382 | 0 | | 0 |
| 324 | LSI1.31 | 0 | | 0 |
| ⋮ | ⋮ | ⋮ | ⋮ | ⋮ |
| 42 | R1.1 | 1 | | 0 |
| 242 | R1.2 | 1 | | 1 |
| 85 | R2.1 | 2 | | 0 |
| 3798 | R2.2 | 2 | | 1 |
| 6794 | R3.1 | 3 | | 0 |
| 2973 | R3.2 | 3 | | 1 |
| 749 | R4.1 | 4 | | 0 |
| 570 | R4.2 | 4 | | 1 |
| ⋮ | ⋮ | ⋮ | | ⋮ |

BRANCH USE AMOUNT TABLE 85

| NUMBER | AMOUNT OF USE |
|---|---|
| 1 | 0 |
| 2 | 0 |
| 3 | 0 |
| 4 | 0 |
| 5 | 0 |
| .. | |

PATH SEARCHING QUEUE TABLE 86

| NODE NUMBER |
|---|
| 1 |
| 2 |
| 3 |
| 4 |
| 5 |
| .. |

REFERENCING NODE MANAGEMENT TABLE 87

| NUMBER | REFERENCING NODE NUMBER |
|---|---|
| 1 | 0 |
| 2 | 0 |
| 3 | 0 |
| 4 | 0 |
| 5 | 0 |
| .. | |

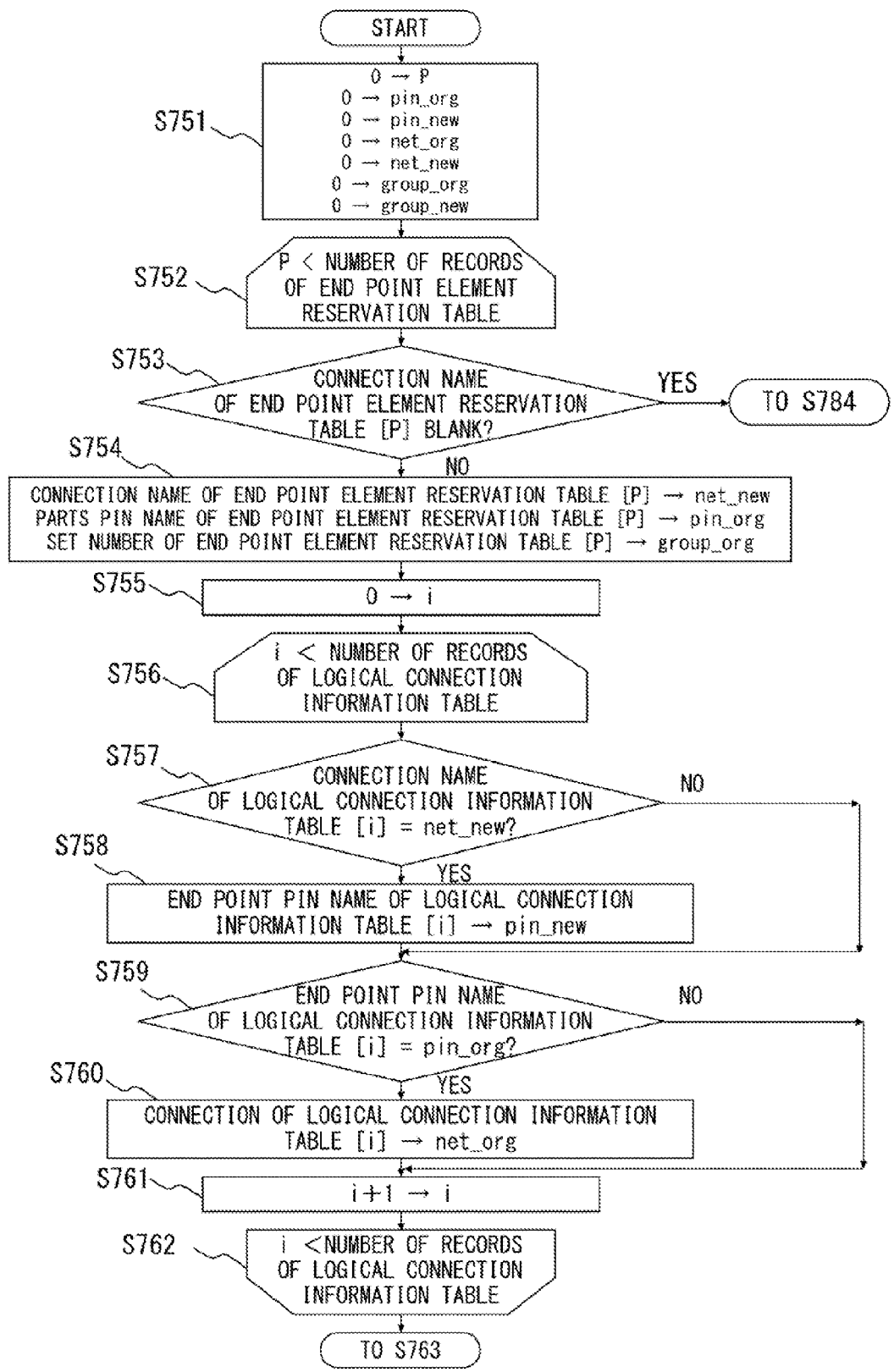
F I G. 25A

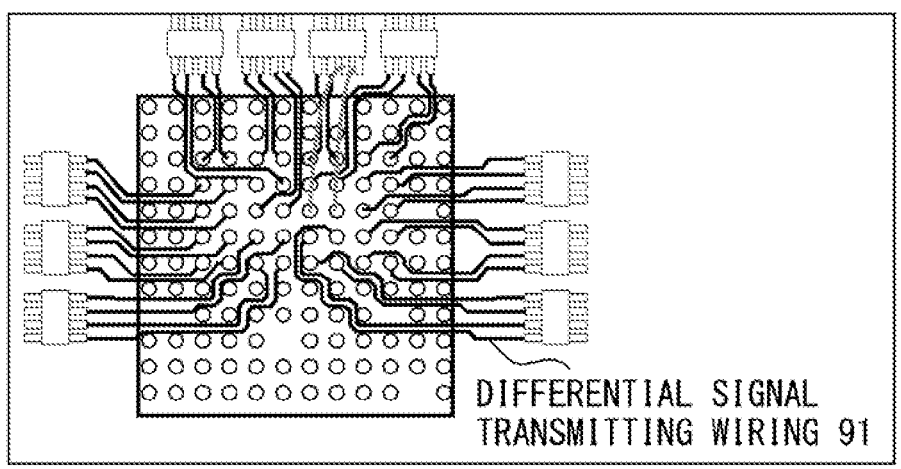
F I G. 26A

WIRING DESIGN SUPPORT DEVICE AND WIRING DESIGN SUPPORTING METHOD

CROSS-REFERENCE TO RELATED APPLICATIONS

This application is based upon and claims the benefit of priority of the prior Japanese Patent Application No. 2011-061667, filed on Mar. 18, 2011, the entire contents of which are incorporated herein by reference.

FIELD

The embodiments discussed herein are related to the technology of supporting wiring design on a printed circuit board.

BACKGROUND

Relating to designing the wiring path between a bonding pad of a semiconductor chip and a pin of a semiconductor package, the technology of designing the wiring for connection of a plurality of endpoints on a plane through a path passing an area other than a wiring prohibited area on the plane is known. The technology is to generate a side for monitoring temporary wiring density (monitor side) between any of the endpoints and any wiring prohibited area on the plane, and to design a wiring path for connection of endpoints based on the width of the wiring crossing each of the monitor sides.

Also known is the technology of automatically generating a multi-terminal network in a package such as a semiconductor chip etc. to automatically generate a traversable multi-terminal network which can be wired and does not include a redundant path. In this technology, (N−1) terminal wiring data satisfying a provided design rule for a package is provided as initial data so that an N terminal (N is an integer equal to or larger than 3) network can be automatically generated. In this technology, based on the terminal group at the wiring start point and the terminal group at the N-th terminal for which a net is to be generated, the interposed terminal group is ignored in performing a 2-terminal net generating process. Then, a provisional net is generated by combining the initial data and an execution result of the 2-terminal net generating process, and the provisional net is amended to satisfy the design rule of a package.

Further known is the technology of automatically determining by the operating process the position of the optimum wiring to each via portion which is wired from each pad portion on the board. In this technology, the distance between the intersection formed by two temporary wiring connecting each pad portion and each via portion and each of the corresponding via portions is determined. The temporary wiring indicating a longer distance is bypassed round the via portion corresponding to the temporary wiring indicating a shorter distance, thereby determining provisional wiring. This process is sequentially performed on all intersections formed by each temporary wiring. Next, the distance between the intersection of two provisional wiring or of provisional wiring and temporary wiring and a corresponding via portion of the provisional wiring or the temporary wiring is determined. The provisional wiring or the temporary wiring indicating the longer distance is bypassed round the corresponding via portion of the provisional wiring or temporary wiring indicating the shorter distance, thereby determining the optimum wiring. This process is sequentially performed on all intersections formed by the provisional wiring and by provisional wiring and temporary wiring.

There is also the well-known technology of setting an optical path set between two nodes as logically as possible in an optical communication network in which a number of nodes are connected by wavelength-multiplexed optical transmission line, thereby reducing the number of wavelengths required in an optical path network. In this technology, the shortest path is searched for by calculating the distance (number of accommodated paths) of the optical transmission line by assuming the faults of all optical transmission lines in a path search for a preliminary path, thereby reducing the wavelengths for the optical transmission line having the largest number of multiplexed wavelengths.

Also known is the technology of appropriately supporting the generation of a wiring path in an integrated circuit package. In this technology, at least each pin, each point between horizontal pins, each point between vertical pins, and each point between diagonal pins of the integrated circuit package are defined as bottleneck portions of wiring, and each bottleneck point is assigned a wiring capacity. Next, two nodes, that is, an inlet node and an outlet node, are generated for each bottleneck. Then, a directional branch from the inlet node in the bottleneck portion to the outlet node is generated for each bottleneck portion. Between adjacent bottleneck portions, a directional branch from one outlet node to another inlet node is generated. Between the bottleneck portion between the diagonal pins and all diagonally adjacent bottleneck portions between the diagonal pins, directional branches from one outlet node to the other inlet node are mutually generated. Then, all generated directional branches are assigned the minimum value of the wiring capacity allocated to the bottleneck portions as the amount of branch capacity.

The technologies described in the following documents are well known.
Document 1:
Japanese Patent No. 3184796
Document 2:
Japanese Patent No. 3548070
Document 3:
Japanese Patent No. 4443450
Document 4:
Japanese Patent No. 3224114
Document 5:
Japanese Laid-open Patent Publication No. 2010-211753

Recently, a printed circuit board for use in electronic equipment indicates an increasing number of wiring sections with the growth of a larger and high-density electronic circuit. Additionally, with an increasing demand for the quality of a waveform accompanied with a higher-speed and power-saving digital signal, there are increasing opportunities of inserting a damping resistor and a terminal resistor especially as a countermeasure against reflective noise. Since preferable effects of these resistor parts cannot be expected unless the shortest possible wire length is realized for a connection by an arrangement in an appropriate position, a designer of a printed circuit board arranges resistor parts and performs a wiring designing operation between terminals (pins) by careful consideration for shorter wiring.

For example, when a part provided with a large number of pins such as a BGA (ball grid array) etc. (hereafter referred to as a "multi-pin part") is arranged, it is necessary to arrange several tens to several hundreds of resistor parts around the part (multi-pin part), and design the wiring by consideration for shorter wiring. In a general method to realize the wiring with a single layer, the wiring is first devised to make the least possible bypass from each pin in the multi-pin part to the outside of the multi-pin part. Next, depending on the wiring order, the resistor parts such as a chip resistor, a multiple-stage resistor, etc. are arranged, or the resistor parts are replaced, thereby performing a connection to the above-mentioned wiring. However, with a larger number of wiring sections, a previously mounted wiring line may often become an interference with a subsequently mounted wiring line, and an amendment to a wiring path is to be made for each interference. The amendment is a factor of taking a long time in the wiring design for a printed circuit board.

SUMMARY

According to an aspect of the embodiment, a device which supports designing a wiring path on a printed circuit board, includes: a directional graph definition unit which defines, on a target area surface on which the wiring path is generated, a directional graph having a grid point as a node and a line as a branch connecting adjacent grid points; a wiring prohibited area information acquisition unit which acquires an input about wiring prohibited area information about a position of an area in which an arrangement of wiring is prohibited on the target area surface; a wiring information acquisition unit which acquires an input about wiring information as information about a set of plural sets of grid points connected by respective wiring in the grid points defined on the target area surface; a flow network generation unit which generates a flow network by setting a flow capacity to "0" for a branch connected to a grid point placed in an area indicated by the wiring prohibited area information in branches configuring the directional graph, setting a flow capacity to "1" for other branches, and connecting a starting point and an endpoint of a flow through a branch having the flow capacity of "1" to a pair of grid points belonging to each set of the plural sets of grid points; a flow path search unit which searches the flow network for a path of a flow having a maximum amount of flow from the starting point to the end point under the flow capacity set by the flow network generation unit for each branch; and a wiring path determination unit which determines the plural wiring paths connecting respective pairs of grid points belonging to respective sets of the plural sets of grid points indicated by the wiring information according to a search result of the path by the flow path search unit.

According to another aspect of the embodiment, a method of supporting designing a wiring path on a printed circuit board, comprising: defining, on a target area surface on which the wiring path is generated, a directional graph having a grid point as a node and a line as a branch connecting adjacent grid points; acquiring an input about wiring prohibited area information about a position of an area in which an arrangement of wiring is prohibited on the target area surface; acquiring an input about wiring information as information about a set of plural sets of grid points connected by respective wiring in the grid points defined on the target area surface; generating a flow network by setting a flow capacity to "0" for a branch connected to a grid point placed in an area indicated by the wiring prohibited area information in branches configuring the directional graph, setting a flow capacity to "1" for other branches, and connecting a starting point and an end point of a flow through a branch having the flow capacity of "1" to a pair of grid points belonging to each set of the plural sets of grid points; searching the flow network for a path of a flow having a maximum amount of flow from the starting point to the end point under the flow capacity for each branch; and determining the plural wiring paths connecting respective pairs of grid points belonging to respective sets of the plural sets of grid points indicated by the wiring information according to a search result of the path.

According to further another aspect of the embodiment, a computer-readable non-transitory recording medium storing a program used to direct a computer to support designing a wiring path on a printed circuit board, the program comprising: defining, on a target area surface on which the wiring path is generated, a directional graph having a grid point as a node and a line as a branch connecting adjacent grid points; acquiring an input about wiring prohibited area information about a position of an area in which an arrangement of wiring is prohibited on the target area surface; acquiring an input about wiring information as information about a set of plural sets of grid points connected by respective wiring in the grid points defined on the target area surface; generating a flow network by setting a flow capacity to "0" for a branch connected to a grid point placed in an area indicated by the wiring prohibited area information in branches configuring the directional graph, setting a flow capacity to "1" for other branches, and connecting a starting point and an end point of a flow through a branch having the flow capacity of "1" to a pair of grid points belonging to each set of the plural sets of grid points; searching the flow network for a path of a flow having a maximum amount of flow from the starting point to the end point under the flow capacity for each branch; and determining the plural wiring paths connecting respective pairs of grid points belonging to respective sets of the plural sets of grid points indicated by the wiring information according to a search result of the path.

The object and advantages of the invention will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a block diagram of the function of an embodiment of a wiring design support device.

FIG. 2 is an explanatory view of the data structure of each type of stored data in a storage device.

FIG. 7 is an example (1) of generating a flow network.

FIG. 10A is an explanatory view (1) of the outline of the procedure of a wiring path automatic designing process.

FIG. 10B is an explanatory view (2) of the outline of the procedure of a wiring path automatic designing process.

FIG. 14A is an explanatory view of the data structure of a node information table.

FIG. 14B is an explanatory view of the data structure of a branch information table.

FIG. 15 is a flowchart of the contents of the wiring prohibited area information acquiring process.

FIG. 16 is an explanatory view of the data structure of a disabled node table.

FIG. 18 is an explanatory view of the data structure of an endpoint element reservation table.

FIG. 22 is an explanatory view of the data structure of various kinds of data table used in the flow path searching process.

FIG. 25A is a flowchart (1) of the contents of a multiple-stage parts information exchanging process.

FIG. 26A is an example of a wiring path applicable to the transmission of a differential signal.

DESCRIPTION OF EMBODIMENTS

Figure 3:
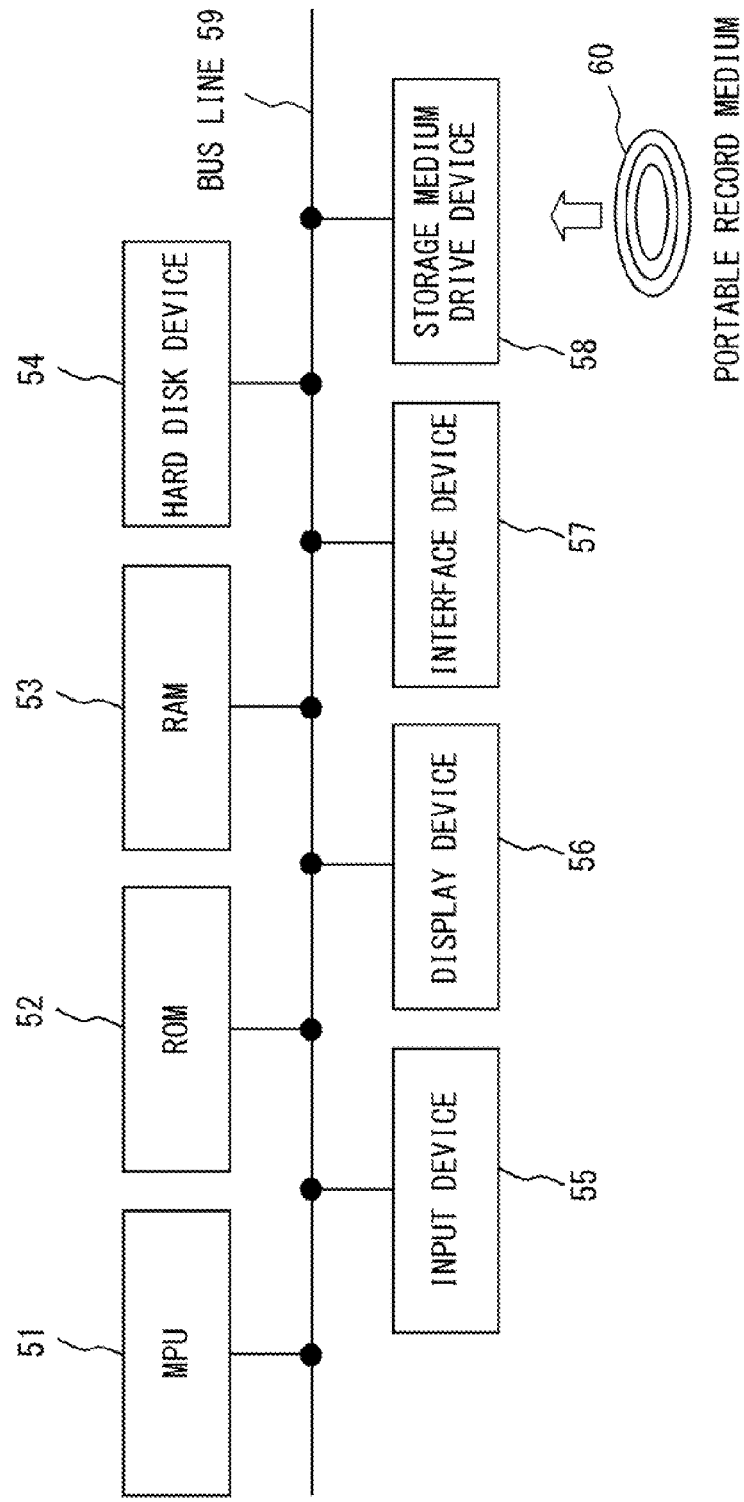
FIG. 3 is an example of a configuration of the hardware of a computer.

Preferred embodiments of the present invention will be explained with reference to accompanying drawings.

The block diagram in FIG. 1 is described first below. FIG. 1 is a block diagram of the function of an embodiment of the wiring design support device for supporting the designing operation of a wiring path by automatically designing the wiring path on the printed circuit board.

A wiring design support device 1 includes an MPU 10, a storage device 30, a display device 41, a mouse device 42, a keyboard device 43, RAM 44, and ROM 45. These components are connected through a system bus 46, and can communicate various data with one another under the control of the MPU 10.

The MPU (micro processing unit) 10 is a processor for controlling the entire operation of the wiring design support device 1. The MPU 10 functions as a directional graph definition unit 11, a wiring prohibited area information acquisition unit 12, a wiring information acquisition unit 13, a flow network generation unit 14, a flow path search unit 15, and a wiring path determination unit 16. The MPU 10 can further function as a 2-terminal part information exchange unit 17, a multiple-stage parts information exchange unit 18, and a differential signal wiring replacement unit 19. The details of their functions are described later. The MPU 10 can provide the function of each function block by reading a specified control program stored in advance in the ROM 45 and executing the program.

The storage device 30 stores wiring prohibited area information 31, logical connection information 32, and parts information 33 input to the wiring design support device 1, and wiring path information 34 output from the wiring design support device 1. The practical contents of these pieces of information are described later.

The display device 41 displays various text data and images depending on the display data transmitted from the MPU 10.

The mouse device 42 and the keyboard device 43 are input devices for reception of the input of various instructions and data from a user of the wiring design support device 1.

The RAM (random access memory) 44 is semiconductor memory where data can be written and read at any time and is used as a working storage area as necessary by storing, for example, various generated tables when the control program is executed by the MPU 10.

The ROM (read only memory) 45 is a read only semiconductor memory storing a specified control program in advance. The MPU 10 can control the entire wiring design support device 1 and provide the function of each function block above by reading the control program when the wiring design support device 1 is activated and executing the program.

Described next is the function of each function block above provided by the MPU 10.

The directional graph definition unit 11 defines a directional graph having a grid point as a node and a line connecting adjacent grid points as a branch on the target area surface on which a wiring path is generated on the printed circuit board. The interval of the grid points is set based on, for example, the definition of the line width and the wiring interval in the printed circuit wiring on the target area surface.

The wiring prohibited area information acquisition unit 12 acquires the input about the wiring prohibited area information 31 indicating the position of the area in which the arrangement of wiring is prohibited on the target area surface above.

The wiring information acquisition unit 13 acquires the input about the wiring information as the information about the plural sets of grid points connected by each of the plurality of wiring.

The flow network generation unit 14 generates a flow network. To be more practical, the flow network generation unit 14 sets to "0" of the flow capacity of the branch coupled to the grid point located in the area indicated by the wiring prohibited area information 31 among the branches configuring the directional graph defined by the directional graph definition unit 11. Then, the unit sets to "1" the flow capacity for other branches. Next, the flow network generation unit 14 connects the starting point and the endpoint of a flow through the branch having the flow capacity of "1" to a pair of grid points belonging to each of the plural sets of grid points. Thus, the flow network generation unit 14 generates a flow network.

The flow path search unit 15 searches the flow network generated by the flow network generation unit 14 for the path of the flow indicating the maximum amount of flow from the starting point to the end point under the flow capacity set by the flow network generation unit 14 for each branch.

The wiring path determination unit 16 determines a plurality of wiring paths connecting a pair of grid points belonging to each of plural sets of grid points indicated by the wiring information above according to the search result of the path above by the flow path search unit 15. The wiring path determination unit 16 stores the information designating the determined wiring path as the wiring path information 34 in the storage device 30.

With the configuration, the automatic designing using the printed circuit board is executed by relating it to the maximum flow problem in the flow network. In addition, the capacity of the branch in the flow network is set to "0" to express a wiring prohibited area, and the capacity is set to "1" to express a wiring enabled area. With the configuration, the search can be successfully performed if the wiring path exists, and the time taken to perform the automatic designing of a wiring path can be successfully shortened.

The wiring information acquisition unit 13 uses the wiring information, for example, as follows. That is, the wiring information acquisition unit 13 first generates the correspondence information indicating the correspondence between the terminal to be connected by wiring and the grid point from the input of the arrangement position information on the target area surface of the terminal. The arrangement position information about each terminal is acquired from the parts information 33. The wiring information acquisition unit 13 acquires the wiring information based on the input of the correspondence information and the logical connection information 32 between the terminals to be connected by wiring.

When the terminal to be connected by wiring designated by the logical connection information 32 is one terminal in a 2-terminal part, each function block can provide the following function.

In this case, the wiring information acquisition unit 13 first generates the correspondence information about the other terminal in the 2-terminal part and the grid point. In addition, in this case, the flow network generation unit 14 newly defines a relay node for the 2-terminal part, and inserts the relay node into the intermediate point of the branch for connection of the grid point corresponding to the one terminal described above and the starting point or the end point. Furthermore, the flow network generation unit 14 connects the grid point whose correspondence with the other terminal described above is indicated in the correspondence information to the relay node through the branch having the flow capacity of "1".

The 2-terminal part information exchange unit 17 is used in the case above. When one connection target to be connected by wiring whose path is determined by the wiring path determination unit 16 is the other terminal in the 2-terminal part described above, the 2-terminal part information exchange unit 17 changes the information input for the arrangement position on the target area surface of the terminal to be connected by the wiring. The change is to exchange the information about the other terminal for the information about the one terminal in the 2-terminal part so that the terminal connected by the wiring can match the terminal designated by the logical connection information 32.

The details are described later, but the wiring design support device 1 can shorten the wiring path in a specific case by providing the 2-terminal part information exchange unit 17.

The 2-terminal part information exchange unit 17 can provide the function described below when there exist at least two wiring in which one connection target to be connected is the 2-terminal part having the same shape in a plurality of wiring whose path is determined by the wiring path determination unit 16. That is, the 2-terminal part information exchange unit 17 changes the information input for the arrangement position on the target area surface of the terminal to be connected by the wiring in this case. The change is to exchange the information about the terminal of the 2-terminal part to be connected by one wiring in the case above for the information about the terminal of another 2-terminal part other than the 2-terminal part above. By the change, the terminal connected by the first wiring can match the terminal designated by the logical connection information 32.

The details are described later, but, by the 2-terminal part information exchange unit 17 providing the function above, a part of the restriction conditions by the logical connection information 32 can be temporarily excluded in determining the wiring path, thereby solving the problem of non-matching between the wiring path and the logical connection information 32. Thus, the number of cases in which it is necessary to amend the path of the wiring already arranged for generation of a wiring path in a late order is reduced, and the time taken for the designing operation can be shortened.

The multiple-stage parts information exchange unit 18 can provide the function described below when there exist at least two wiring in which one connection target to be connected is the multi-stage part having the same shape in a plurality of wiring whose path is determined by the wiring path determination unit 16. That is, in this case, the multiple-stage parts information exchange unit 18 changes the information input for the arrangement position on the target area surface of the terminal to be connected by the wiring. The change is to exchange the information about the terminal of the multiple-stage part to be connected by one wiring in the case above for the information about the terminal of another terminal of the multiple-stage part or the terminal of another multiple-stage part other than the multiple-stage part above. By the change, the terminal connected by the first wiring can match the terminal designated by the logical connection information 32.

In the present application, a "multiple-stage part" generally refers to a part called a network resistor, a chip capacitor network, etc. in which a plurality of 2-terminal elements having the same element value are included in one package.

The details are described later, but, by the wiring design support device 1 provided with the multiple-stage parts information exchange unit 18, a part of the restriction conditions by the logical connection information 32 can be temporarily excluded in determining the wiring path, thereby solving the problem of non-matching between the wiring path and the logical connection information 32. Thus, the number of cases in which it is necessary to amend the path of the wiring already arranged for generation of a wiring path in a late order is reduced, and the time taken for the designing operation can be shortened.

The differential signal wiring replacement unit 19 replaces the wiring in which the wiring path determination unit 16 has determined a path with a differential signal wiring as parallel wiring including a pair of lines as a set.

The wiring design support device 1 can support designing differential signal wiring for which it is preferable to perform wiring by parallel paths for a pair of wiring by providing the differential signal wiring replacement unit 19.

Next, the data structure of various types of data stored by the storage device 30 is described below with reference to FIG. 2.

As illustrated in FIG. 2, the wiring prohibited area information 31, the logical connection information 32, the parts information 33, and the wiring path information 34 have the data structures of a table structure.

The wiring prohibited area information 31 associates a "shape" with a "layer". The item "shape" designates the position of the wiring prohibited area on the printed circuit board. For example, the data example of the "shape" in line 1 indicates the rectangular area having two diagonal points of the coordinates (0, 0) and (60000, 1000) on the two dimensional orthogonal coordinate plane (X, Y) defined on the printed circuit board as a wiring prohibited area. The item "layer" designates a wiring layer in which the wiring prohibited area is set in each wiring layer on the printed circuit board as a multilayer substrate. For example, the data example of the "layer" in line 1 indicates that the area expressed by the information about the "shape" is defined as a wiring prohibited area in each wiring layer of the layers 1 through 12.

The logical connection information 32 associates a "starting point pin name" with an "endpoint pin name" for each "connection name". The item "connection name" individually identifies the logical connection information 32, and each of the "starting point pin name" and the "end point pin name" designates a pair of terminals to be connected by an automatically designed wiring path by the wiring design support device 1. For example, the data example of the "SIG-1" in line 1 indicates that the parts name connects the first pin of the part having the parts name of LSI1 to the first pin of the part having the parts name of R1.

The parts information 33 associates the "parts position", the "direction", the "pin name", and the "pin position" for each "parts name". The item "parts name" individually identifies the part arranged on the printed circuit board. The item "parts position" indicates the position (of the first pin of the corresponding parts) of the part designated by the "parts name". The "direction" indicates the arrangement direction of the part designated by the "parts name" by the rotation angle for the specified reference direction. The item "pin name" individually identifies the terminal provided for the part designated by the "parts name". Furthermore, the information about the "pin position" indicates the position (relative position when the position of the first pin of the parts is the reference position) of the terminal of the part designated by the "parts name" and the "pin name" by the coordinates. For example, the data example about the "LSI1" in line 1 indicates that the part having the part name of LSI1 is arranged in the reference direction at the position (44599, 27500) of the first pin. In this data example, the relative position of the second pin of the part is (1000, 0), and the relative position of the third pin is (2000, 0).

The above-mentioned wiring prohibited area information 31, logical connection information 32, and parts information 33 are prepared by a user of the wiring design support device 1, and stored in advance in the storage device 30.

The wiring path information 34 indicates the wiring path automatically designed by the wiring design support device 1 about the logical connection information 32 expressed as the "connection name". For example, the data example about the "SIG-1" in line 1 indicates the path in which each point of the coordinates (45000, 28000), (45500, 28000), (45500, 32000), (525000, 32000), . . . is connected in this order in the layer 12.

Each type of information stored in the storage device 30 has the data structures above.

The wiring design support device 1 illustrated in FIG. 1 can also be configured using a computer of a standard configuration.

Described below is the example illustrated in FIG. 3. FIG. 3 illustrates an example of the hardware configuration of a computer.

A computer 50 includes an MPU 51, ROM 52, RAM 53, a hard disk device 54, an input device 55, a display device 56, an interface device 57 and a storage medium drive device 58. These components are connected through a bus line 59, and can mutually communicate various types of data under control of the MPU 51.

The MPU 51 is a processor for controlling the entire operation of the computer 50, and functions as the MPU 10 in FIG. 1.

The ROM 52 is read only semiconductor memory storing in advance a specified basic control program. The MPU 51 can control the operation of each component of the computer 50 by executing the basic control program after reading program when the computer 50 is activated. The ROM 52 provides a part of the function of the ROM 45 in FIG. 1.

The RAM 53 is semiconductor memory writable and readable at any time which is used as a working storage area as necessary when the MPU 51 executes various control programs, and functions as the RAM 44 in FIG. 1.

The hard disk device 54 is a storage device storing various types of control programs executed by the MPU 51 and data. The MPU 51 can perform various controlling processes by reading and executing a specified control program stored in the hard disk device 54. The hard disk device 54 provides the function of the storage device 30 in FIG. 1, and provides a part of the function of the ROM 45.

When the input device 55 is operated by the operator of the computer 50, the input device 55 acquires the input of each type of information associated with the operation contents from the administrator, and transmits the acquired input information to the MPU 51. The input device 55 corresponds to the mouse device 42 and the keyboard device 43 in FIG. 1.

The display device 56 is, for example, a liquid crystal display for displaying various text data and images depending on the display data transmitted from the MPU 51, and corresponds to the display device 41 in FIG. 1.

The interface device 57 manages the communication of various types of information with various kinds of equipment connected to the computer 50.

The storage medium drive device 58 reads various types of control programs and data stored in a portable record medium 60. The MPU 51 performs various types of controlling processes described later by reading and executing a specified control program stored in the portable record medium 60 through the storage medium drive device 58. The portable record medium 60 can be, for example, CD-ROM (compact disc read only memory), DVD-ROM (digital versatile disc read only memory), flash memory provided with a connector of a USB (universal serial bus) standard, etc.

To configure the wiring design support device 1 using the above-mentioned computer 50, for example, a control program is generated for directing the MPU 51 to perform a wiring path automatic designing process explained later using a flowchart. The generated control program is stored in advance in the hard disk device 54 or the portable record medium 60. Then, a specified instruction is transmitted to the MPU 51 to read the control program for execution. Thus, the computer 50 can provide the function of each component of the wiring design support device 1.

Next, the method of determining a wiring path by the wiring design support device 1 in FIG. 1 is described below with reference to the attached drawings.

The wiring design support device 1 determines a wiring path using the Edmonds-Karp algorithm widely known as a method of solving the maximum flow problem in the flow network.

Figure 4:
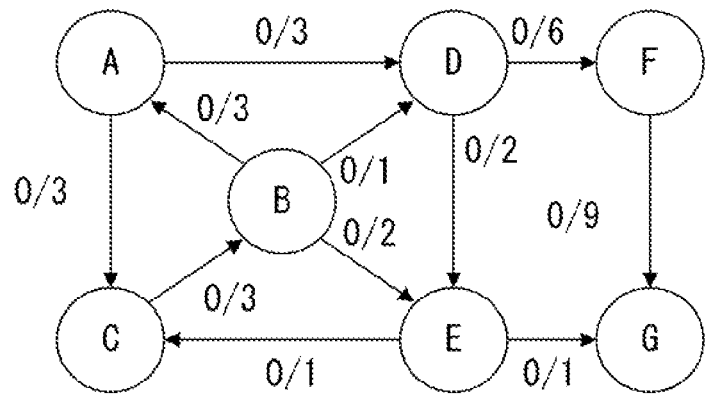
FIG. 4 is an example of a flow network.

FIG. 4 is an example of a flow network.

The flow network is provided with a total of seven nodes (points) from A to G. In this example, A is defined as the starting point of the flow, that is, the node from which the flow is generated, and G is defined as the end point of the flow, that is the node in which the flow is consumed. In the flow network, applied in each node except the starting point and the end point is the low of conservation of flow that the sum of the amount of incoming flow and the amount of outgoing flow is zero.

In the example in FIG. 4, the direction of the flow is defined as indicated by the arrow for the branch (arc) between the nodes. Each branch is assigned a character in "f/c" form. In this example, "f" refers to the amount of flow passing through the branch, "c" refers to the capacity of the branch, that is, the maximum amount of flow that can pass through the branch. In each branch, the flow can be passed inversely to the direction indicated by the arrow within the capacity of the branch. The example in FIG. 4 illustrates the initial state, and the amount of flow of all branches is "0".

The maximum flow problem is to obtain the flow indicating the maximum amount of flow from the starting point to the end point in the flow network. The Edmonds-Karp algorithm solves the maximum flow problem as follows. That is, the search of the path from the starting point to the endpoint is performed based on the breadth-first search. If there is room for the capacity of each branch on the path, the flow is formed through the path (backtrace). The procedure is repeated until there is no new path detected (iteration).

The procedure of solving the maximum flow problem about the flow network exemplified in FIG. 4 using the Edmonds-Karp algorithm is described with reference to each of FIGS. 5A, 5B, 5C, 5D, 5E, and 6.

Figure 5A:
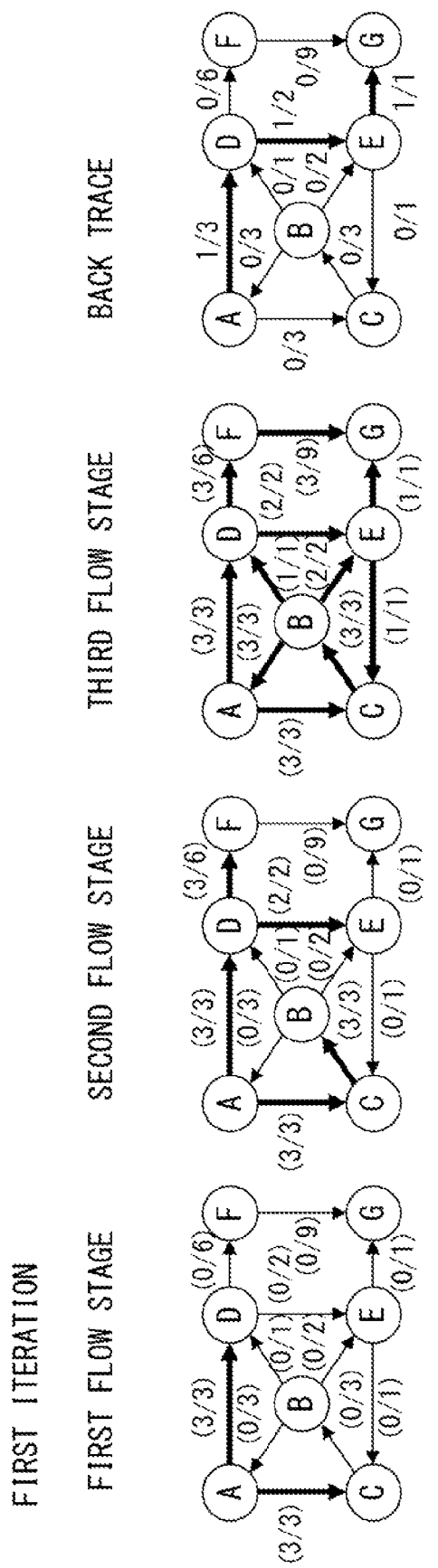
FIG. 5A is an explanatory view (1) of an Edmonds-Karp algorithm.

The "first iteration" is described first with reference to FIG. 5A.

The figure of the "first flow stage" is regarded. The "first flow stage" refers to the path from the starting point to the point after passing one branch.

In the nodes adjacent (directly connected by one branch) to the starting point A, the node which the flow from A is allowed to reach is the node C or D with the direction of the flow taken into account. In this case, by considering the capacity of the branch from the node A to the node C, the amount of flow allowed from the node A to the node C is "3". Assume that the flow of the amount of flow of "3" is allowed. Similarly, assume that the flow of the amount of flow of "3" is allowed to reach the node D by the flow from the node A to the node D.

Next, the figure of the "second flow stage" is regarded. The "second flow stage" refers to the path from the starting point to the point after passing two branches.

First, the node C is regarded. In the nodes adjacent to the node C, the node which the flow from the node A to the node C is allowed to reach is only the node B. In this case, by considering the capacity of the branch from the node C to the node B, the amount of flow allowed to reach the node B in the incoming flow to the node C is "3". In this case, assume that the flow of the amount of flow of "3" is allowed to reach the node B.

As described above, according to the Edmonds-Karp algorithm, the search of the path is performed based on the breadth-first search. Therefore, the search of the path to be performed next is not the search of the path from the node B reached by the "second flow stage", but the search of the path from the node D for which the search of the path has not been performed in the nodes reached by the "first flow stage".

In the nodes adjacent to the node D, the nodes which the flow reaching from node A to the node D is allowed to reach are nodes E and F.

First, the node E is considered. By considering the capacity of the branch from the node D to the node E, the amount of flow allowed to reach the node E in the flow which has reached the node D is "2". In this case, assume that the flow of the amount of flow of "2" reaches the node E.

Next, the node F is considered. By considering the amount of flow reaching the node D, the amount of flow allowed to reach the node F in the flow reaching the node D is "3". In this case, assume that the flow of the amount of flow of "3" reaches the node F.

Next, the figure of the "third flow stage" is regarded. The "third flow stage" refers to the path from the starting point to the point after passing three branches.

First, the node B is considered. In the nodes adjacent to the node B, the nodes which the flow reaching the node B from the node A and the node C is allowed to reach are nodes A, D, and E. In this case, assume that the flow of the amount of flow of "3" reaches the node A from the node B, that the flow of the amount of flow of "1" reaches the node D from the node B, and that the flow of the amount of flow of "2" reaches the node E from the node B.

Next, in the nodes reached by the "second flow stage", the node E for which the path has not been searched is considered. In the nodes adjacent to the node E, the node which the flow reaching the node E from the node A and the node D is allowed to reach is the node C or node G. Between them, the node C is considered with the capacity of the branch from the node E to the node C taken into account, and it is assumed that the flow of the amount of flow of "1" reaches the node C.

Next, the node G is considered. What is noticed here is that the node G is the end point. That is, by the search of the path, the flow outgoing from the starting point A reaches the end point G. As a result, the search of the path in the "first iteration" terminates. In this case, the amount of flow allowed to reach the node G through the nodes A, D, and E is "1" with the capacity of the branch from the node E to the node G taken into account. As a result, the flow of the amount of flow of "1", which reaches the node G through the nodes A, D, and E, is generated. The figure of the "backtrace" illustrates the path detected by the search of the path in the "first iteration" and indicated by a bold arrow. In this figure, the amount of flow of each branch configuring the path is displayed as "1".

Figure 5B:
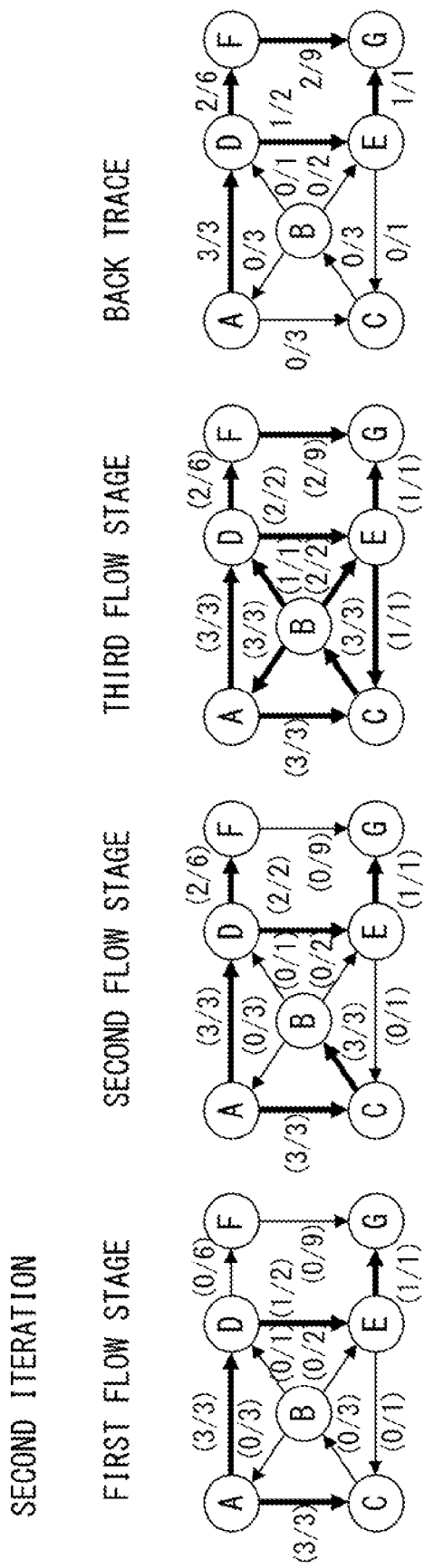
FIG. 5B is an explanatory view (2) of an Edmonds-Karp algorithm.

Next, the "second iteration" is described below with reference to each figure in FIG. 5B.

First, the figure of the "first flow stage" is regarded. In the nodes adjacent to the starting point A, the node which the flow from the node A is allowed to reach is the node C or the node D as in the "first iteration". In this case, since the amount of flow allowed to reach from the node A to the node C is "3" as in the "first iteration", it is assumed that the flow of the amount of flow of "3" reaches the node C.

On the other hand, the path from the node A to the node D overlaps the path detected by the search of the path in the "first iteration", and it is assumed that the flow of the amount of flow of "1" is allowed to pass. Therefore, the amount of flow (hereafter referred to as the "residual capacity") allowed to pass and remaining from the node A to the node D is a difference of "2" obtained by subtracting "1" from the original capacity of "3". It is assumed that the flow of the amount of flow of "2" reaches the node D.

Next, the figure of the "second flow stage" is regarded.

The node C is first considered. In the nodes adjacent to the node C, the node which the flow reaching the node C from the node A is allowed to reach is only the node B, and in the flow which has reached the node C, the amount of flow allowed to reach the node B is "3". Therefore, it is assumed that the flow of the amount of flow of "3" reaches the node B.

Next, in the nodes which have passed by the "first flow stage", the node D for which the search of the path has not been performed is considered. In the nodes adjacent to the node D, the nodes which the flow reaching the node D from the node A is allowed to reach are nodes E and F.

First, the node E is considered. The path from the node D to the node E overlaps the path detected by the search of the path in the "first iteration", and it is already assumed that the flow of the amount of flow of "1" is allowed to pass. Therefore, the residual capacity from the node D to the node E is a difference of "1" obtained by subtracting "1" from the original capacity of "2". It is assumes that the flow of the amount of flow of "1" reaches the node D.

Next, the node F is considered. By considering the amount of flow reaching the node D in the "second iteration", the amount of flow allowed to reach the node F in the flow which has reached the node D is "2". In this example, it is assumed that the flow of the amount of flow of "2" reaches the node F.

Next, the figure of the "third flow stage" is regarded.

First, the node B is considered. In the nodes adjacent to the node B, the nodes which the flow reaching the node B through the nodes A and C is allowed to reach are nodes A, D, and E. In this example, assume that the flow of the amount of flow of "3" reaches the node A from the node B, that the flow of the amount of flow of "1" reaches the node D from the node B, and that the flow of the amount of flow of "2" reaches the node E from the node B.

Next, in the nodes reached by the "second flow stage", the node E for which the path has not been searched is considered. In the nodes adjacent to the node E, the node which the flow reaching the node E from the node A and the node D is allowed to reach is the node C or node G. However, the path from the node E to the node G overlaps the path detected by the search of the path in the "first iteration", and it is already assumed that the flow of the amount of flow of "1" is allowed to pass. Therefore, the residual capacity from the node E to the node G is a difference of "0" obtained by subtracting "1" from the original capacity of "1". Therefore, in the "second iteration", no flow can be added to the path from the node E to the node G. On the other hand, relating to the node C, it is assumed that the flow of the amount of flow of "1" reaches the node C by considering the capacity of the branch from the node E to the node C.

Next, in the nodes reached by the "second flow stage", the node F for which the path has not been searched is considered. In the nodes adjacent to the node F, the node which the flow reaching the node F from the node A and the node D is allowed to reach is the node G. That is, by the preceding search for the path, the flow from the starting point A reaches the end point G. As a result, the search of the path in the "second iteration" terminates. In this case, the amount of flow allowed to reach the node G through node, A, D, and F is "2" with the amount of flow reaching the node D in the "second iteration" taken into account. As a result, the flow of the amount of flow of "2", which reaches the node G through the nodes A, D, and E, is generated. The figure of the "backtrace" illustrates the path detected by the search of the path in the "first iteration" and the "second iteration" and indicated by a bold arrow. In this figure, the amount of flow through the branches A through D shared in the two paths detected in the search of the path in the "first iteration" and the "second iteration" is indicated as "3", that is, the sum of the amount of flow in the two paths. On the other hand, in the paths detected by the search of the path in the "second iteration", the branch from the node D to the node F and the branch from the node F to the node G, which are not used in the path detected by the search of the path in the "first iteration", are displayed as having the amount of flow of "2".

Figure 5C:
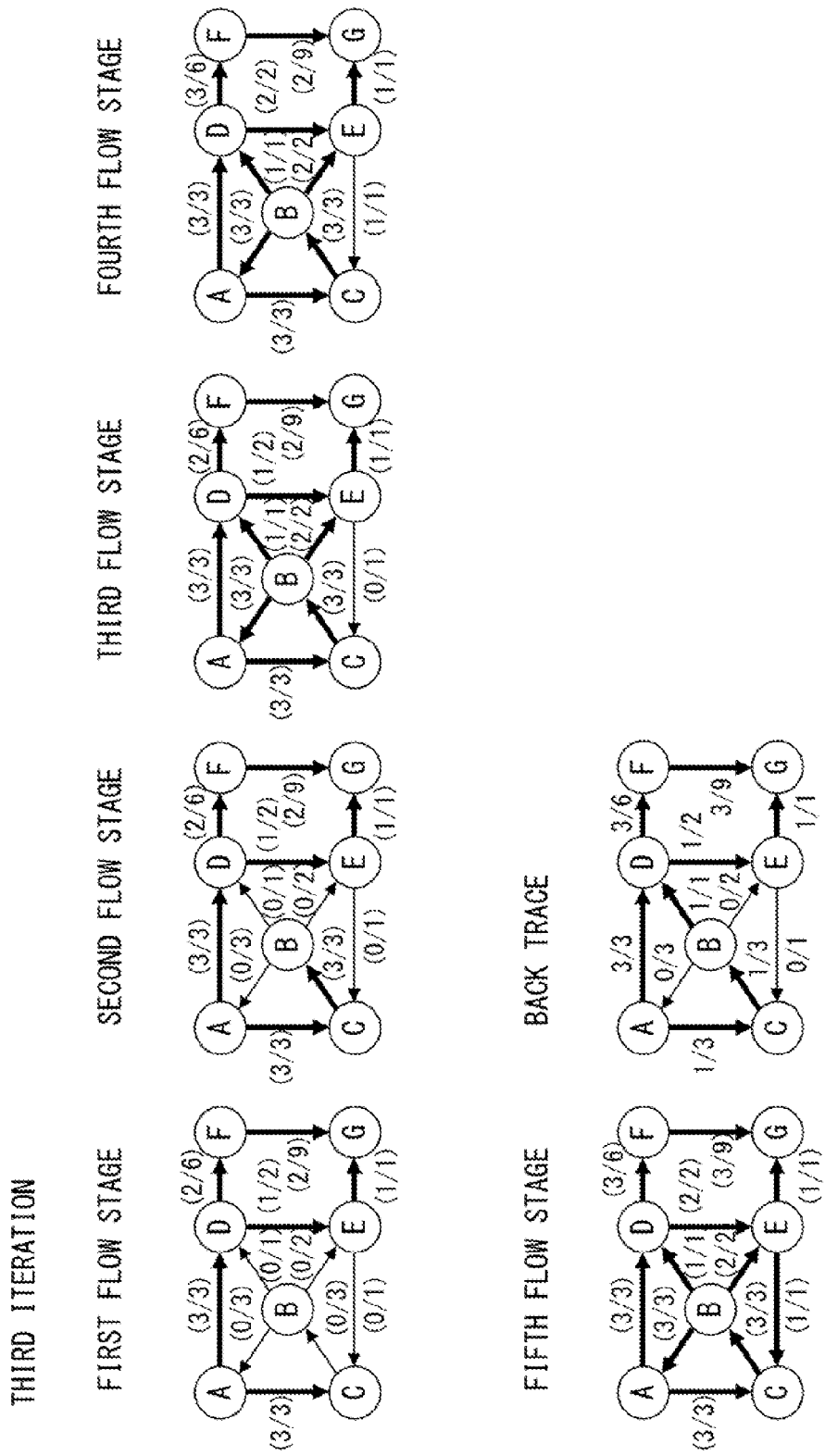
FIG. 5C is an explanatory view (3) of an Edmonds-Karp algorithm.

Since the procedure in the "third iteration" is the same as the procedure in the "second iteration", the detailed explanation is omitted here. Generated by the "third iteration" is the flow of the amount of flow of "1" which reaches the node G from the node A through the nodes C, B, D, and F. The figures of the "backtrace" in FIG. 5C illustrate the paths detected by the search of the path in the "first iteration", the "second iteration", and the "third iteration" indicated by bold arrows.

Figure 5D:
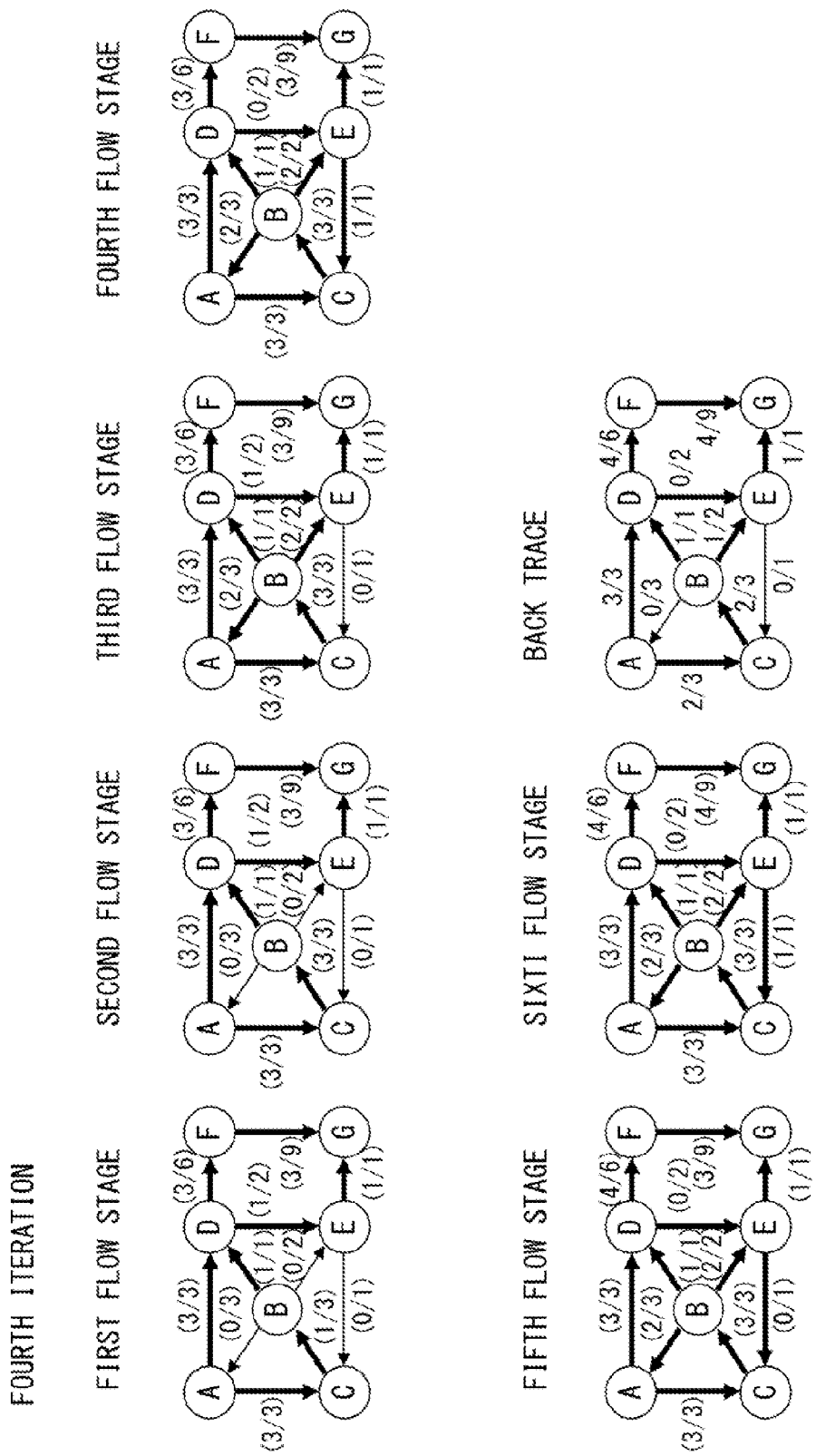
FIG. 5D is an explanatory view (4) of an Edmonds-Karp algorithm.

Next, the "fourth iteration" is described below with reference to each figure in FIG. 5D.

First, the figure of the "first flow stage" is regarded.

In the nodes adjacent to the starting point A, the node which the flow from the node A is allowed to reach is the node C or D. However, by the preceding search of the path, the residual capacity of the branch from the node A to the node D is "0", the node which the flow from the node A is allowed to reach is only the node C. In this example, it is assumed that the flow of the amount of flow of "2" reaches the node C from the node A.

Next, the figure of the "second flow stage" is regarded.

The node C is considered. In the nodes adjacent to the node C, the node which the flow from the node A is allowed to reach is only the node B. The residual capacity of the branch from the node C to the node B is "2" which is equal to the amount of flow assumed to reach the node C from the node A. Therefore, it is assumed that the flow of the amount of flow of "2" reaches the node B from the node C.

Next, the figure of the "third flow stage" is regarded.

The node B is considered. In the nodes adjacent to the node B, the nodes which the flow from node A is allowed to reach through the node C are nodes A, D, and E. However, the residual capacity of the branch from the node B to the node D is "0". Therefore, in this example, it is assumed that the flow of the amount of flow of "2" reaches the node A from the node B, and that the flow of the amount of flow of "2" reaches the node E from the node B.

Next, the figure of the "fourth flow stage" is regarded.

First, the node A is considered, but the node A is a starting point, and it is not appropriate to take the path through the starting point itself in the search of the path from the starting point to the end point. Therefore, the path is invalid.

Next, the node E is considered. In the nodes adjacent to the node E, the node which the flow from the node A through the nodes C and B is allowed to reach are only the nodes C and G apparently, but the path from the node E to the node D is to be regarded here.

The capacity of the branch configuring the path from the node E to the node D is "2", and the flow of the amount of flow of "1" in the opposite direction (from the node D to the node E) has already been generated by the search of the path up to the "third iteration". In this case, it is assumed that the flow of the amount to offset the opposite flow, that is, the flow of the amount of flow of "1", is allowed to pass in the direction from the node E to the node D. Thus, in the nodes adjacent to the node E, the nodes which the flow from the node A is allowed to reach through the nodes C and B is the node D in addition to the nodes C and G.

Since the residual capacity of the branch from the node E to the node G is "0", the flow from the node A through the nodes C and B is not allowed to reach the node G from the node E. Therefore, in this case, it is assumed that the flow of the amount of flow of "1" reaches the node C, and it is further assumed that the flow of the amount of flow of "1" from the node E reaches the node D.

Next, the figure of the "fifth flow stage" is regarded.

First, the node C is considered, but the path up to this point in the "fourth iteration" is A, C, B, E, and C, and the path forms a ring at the node C. Since the ring path is not appropriate, the path is invalid.

Next, the node D is considered. In the nodes adjacent to the node D, the nodes which the flow from the node A through the nodes C, B, and E is allowed to reach are nodes A and F. However, since the residual capacity of the branch from the node D to the node A is "0", it is assumed that the flow of the amount of flow of "1" reaches the node F.

Next, the figure of the "sixth flow stage" is regarded.

In the nodes adjacent to the node F, the node which the flow from the node A through the nodes C, B, E, and D is allowed to reach is the node G. That is, by the search of the path up to this point, the flow from the starting point A reaches the end point G. As a result, the search of the path in the "fourth iteration" terminates. As a result, generated is the flow of the amount of flow of "1" which is allowed to reach the node G from the node A through the nodes C, B, E, D, and F. The figure of the "backtrace" indicates the path detected by the search of the path in the "first iteration" through the "fourth iteration" in bold arrows.

Figure 5E:
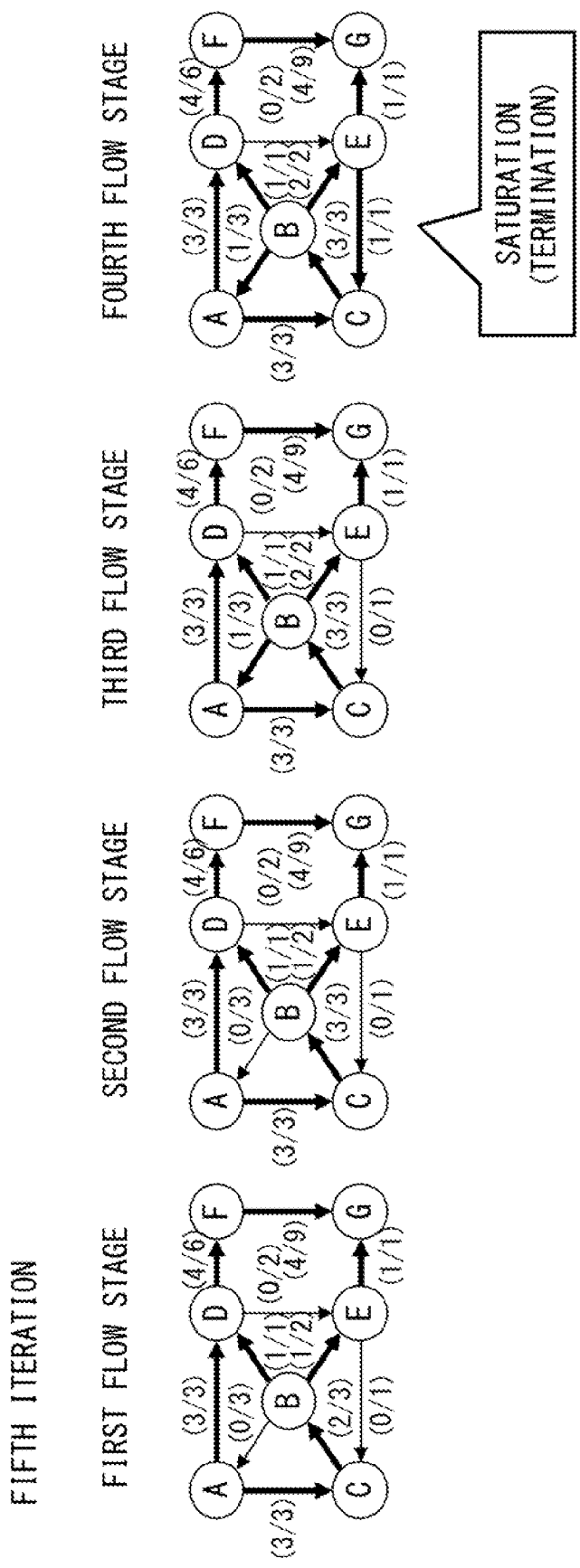
FIG. 5E is an explanatory view (5) of an Edmonds-Karp algorithm.

Next, the "fifth iteration" is described below with reference to each figure in FIG. 5E.

In the "fifth iteration", the search of the path A, C,→B, and A and the path A, C, B, and E is performed in the procedures from the "first flow stage" to the "third flow stage". In the procedure of the next "fourth flow stage", it is found that no subsequent and appropriate path exists (saturation is reached). As a result, the "fifth iteration" terminates, and the entire search of the path terminates.

Figure 6:
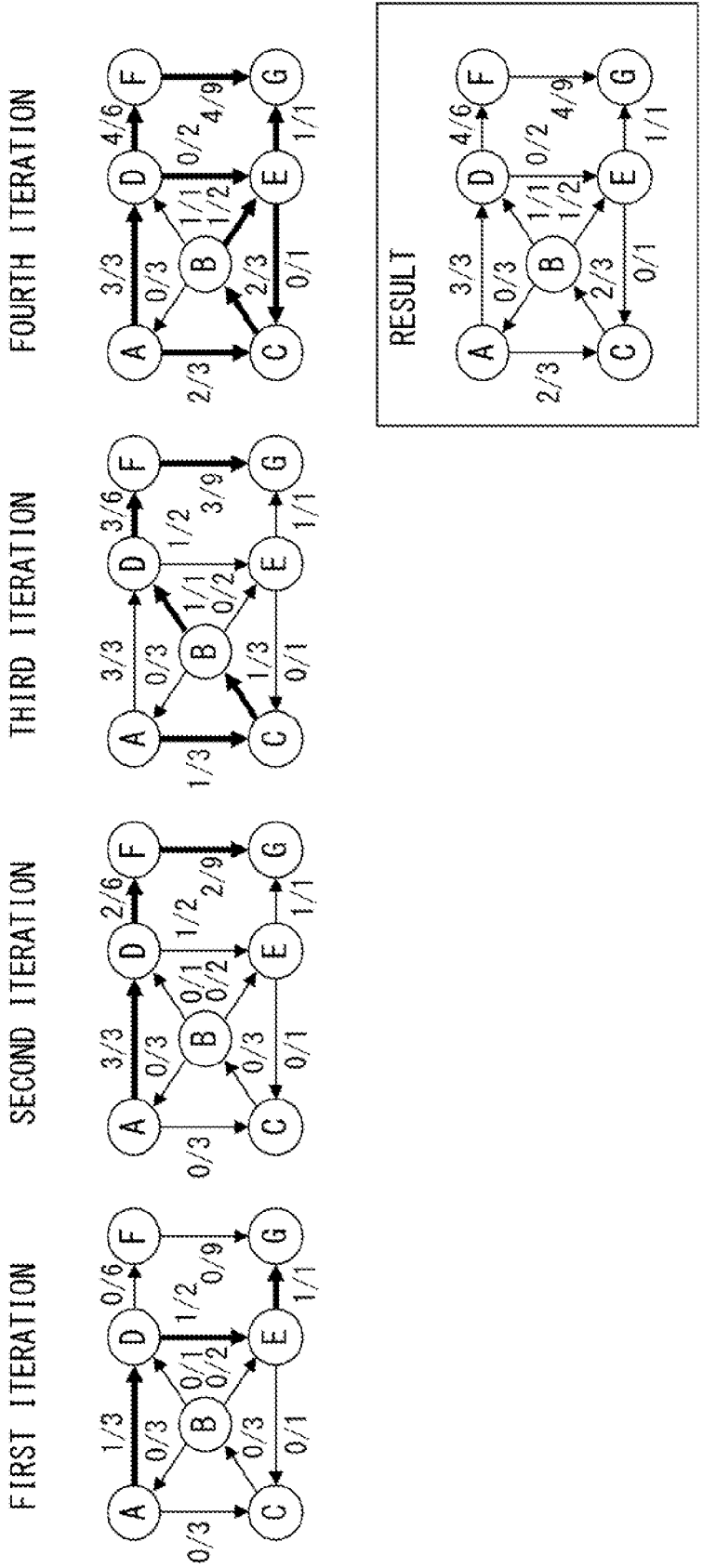
FIG. 6 is a solution to the Edmonds-Karp algorithm relating to the flow network in FIG. 4.

FIG. 6 illustrates the path detected by the iteration of the search of the path described above. The figure of the "result" in FIG. 6 illustrates the flow finally detected, and is the solution to the maximum flow problem about the flow network exemplified in FIG. 4.

In the wiring design support device 1, the flow path search unit 15 performs the search of the path of the maximum flow using the Edmonds-Karp algorithm described above for the flow network generated by the flow network generation unit 14.

Next, the outline of the automatic designing procedure of a wiring path performed by the wiring design support device 1 is described with reference to the attached drawings.

First, the generation of a flow network is described below with reference to FIGS. 7 and 8.

First, the directional graph definition unit 11 defines a directional graph having a grid point as a node and a line connecting adjacent grid points as a branch on the target area surface on which a wiring path is generated on the printed circuit board. FIG. 7 is an example of the state in which the directional graph definition unit 11 defines a directional graph on the target area surface. The circle in the figure refers to a node, and the line connecting the adjacent circles refers to a branch.

In this case, the interval of the grid points is set based on the definition of the line width and the wiring interval in the printed circuit wiring on the target area surface.

Next, the wiring prohibited area information acquisition unit 12 acquires the wiring prohibited area information 31 from the storage device 30. In the example in FIG. 7, the wiring prohibited area indicated by the wiring prohibited area information 31 is expressed by the rectangular area provided with diagonal lines.

Next, the wiring information acquisition unit 13 acquires the wiring information as the information about plural sets of grid points connected by each of plural wiring in the grid points defined on the target area surface. The wiring information acquisition unit 13 obtains the wiring information from the logical connection information 32 and the parts information 33 stored in the storage device 30.

In this example, it is assumed that the wiring information acquisition unit 13 has acquired from the logical connection information 32 the information about three sets, that is, the first, second and third sets, as the information designating a pair of terminals for connection by the wiring path. It is also assumed that the parts information 33 indicates that the position of a pair of terminals on the target area surface as the information about the first set is close to the grid points A and D. Similarly, it is assumed that a pair of terminals as the information about the second set is close to the grid points B and E, and that a pair of terminals as the information about the third set is close to the grid points C and F. In this case, the wiring information acquisition unit 13 acquires as wiring information the set of the nodes A and D, the set of the nodes B and E, and the set of the nodes C and F.

Next, the flow network generation unit 14 generates a flow network according to the following procedure.

First, the flow network generation unit 14 sets the flow capacity of "0" for the branch connected to the grid point located in the area indicated by the wiring prohibited area information 31 in the branches configuring the directional graph defined by the directional graph definition unit 11. For the other branches, the flow capacity of "1" is set.

The flow network generation unit 14 connects the starting point and the end point of the flow to a pair of grid points belonging to each of plural sets of grid points through the branch having the flow capacity of "1". In the example in FIG. 7, the starting point S is connected to the grid points A, B, and C as one of the pair of terminals indicated by the wiring information, and the end point T is connected to the grid points D, E, and F as the other end of the pair of terminals.

Figure 8:
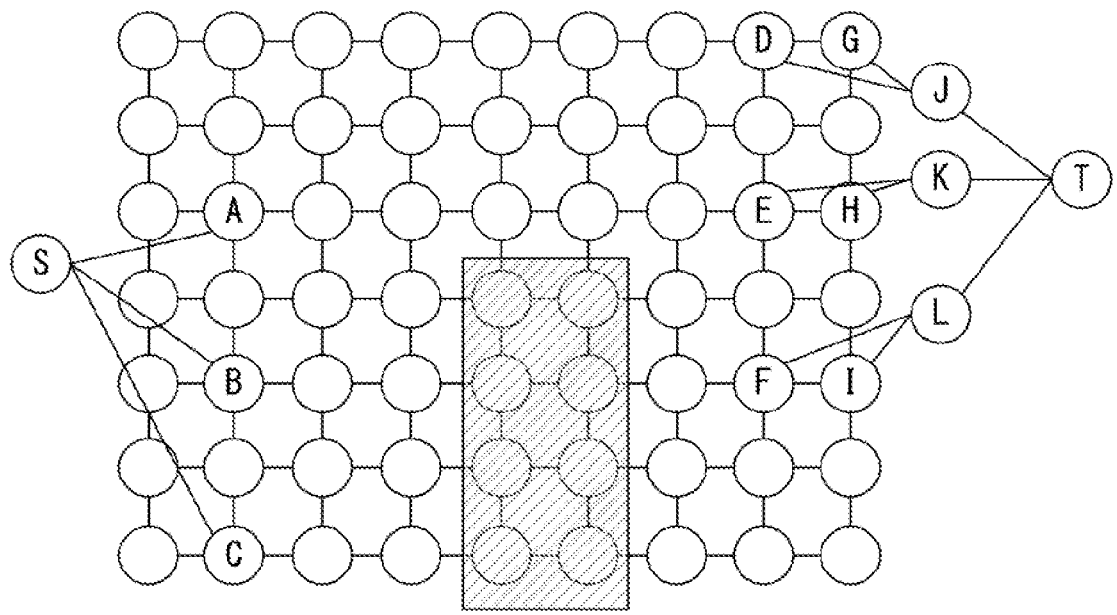
FIG. 8 is an example (2) of generating a flow network.

When the terminal indicated by the wiring information is the terminal of the 2-terminal part, the flow network generation unit 14 connects the starting point S and the end point T as illustrated in FIG. 8.

The example in FIG. 8 indicates that the set of the grid points A and G is included in the wiring information acquired by the wiring information acquisition unit 13, that the terminal near the grid point G is one terminal of the 2-terminal part, and that the other terminal is located near the grid point D. In this case, the wiring information acquisition unit 13 includes the grid point D in the wiring information about the set of the grid points A and G.

In the case of the example in FIG. 8, the flow network generation unit 14 newly defines the relay node J for the 2-terminal part, and inserts the relay nodes J into the branch connecting the grid point G and the end point T. The flow capacity of the branch connecting each of the grid point G and the end point T to the relay node J is also set to "1". Furthermore, the flow network generation unit 14 connects the relay node J to the grid point D through the branch having the flow capacity of "1".

In this case, the wiring design support device 1 automatically designs the wiring path connecting the grid point A to the grid point J. The wiring path obtained by the automatic design necessarily passes through the grid point D or the grid point G. Thus, although the logical connection information 32 indicates the connection of the terminal corresponding to the grid points A and G, there is the possibility of detecting the wiring path reaching the grid point J through the grid point D without passing through the grid point G. The wiring path is inconsistent with the logical connection information 32. However, in this case, the problem of the inconsistency between the wiring path and the wiring information can be solved only by inverting the arrangement direction (180° rotation) of the 2-terminal part. In the case of the example illustrated in FIG. 8, it is clear that the wiring path from the grid point A to the grid point D is shorter than the wiring path from the grid point A to the grid point G. The change of the information about the arrangement position of the terminal made by the 2-terminal part information exchange unit 17 corresponds to the inversion of the arrangement direction of the 2-terminal part.

The example in FIG. 8 refers to the case in which the terminal corresponding to the grid point E is one terminal of the 2-terminal part, and the other terminal corresponding to the grid point H. Therefore, the flow network generation unit 14 further includes a grid point K connected to the grid points E and H, and a grid point L connected to the grid points F and I. The end point T is connected to each of the grid point K and the grid point L.

Described below continuously is the case in which it is assumed that the flow network in FIG. 8 has been generated by the flow network generation unit 14.

Next, the flow path search unit 15 searches the flow network in FIG. 8 generated by the flow network generation unit 14 for the path of the flow having the maximum amount of flow from the starting point S to the end point T under the flow capacity set for each branch by the flow network generation unit 14.

Figure 9A:
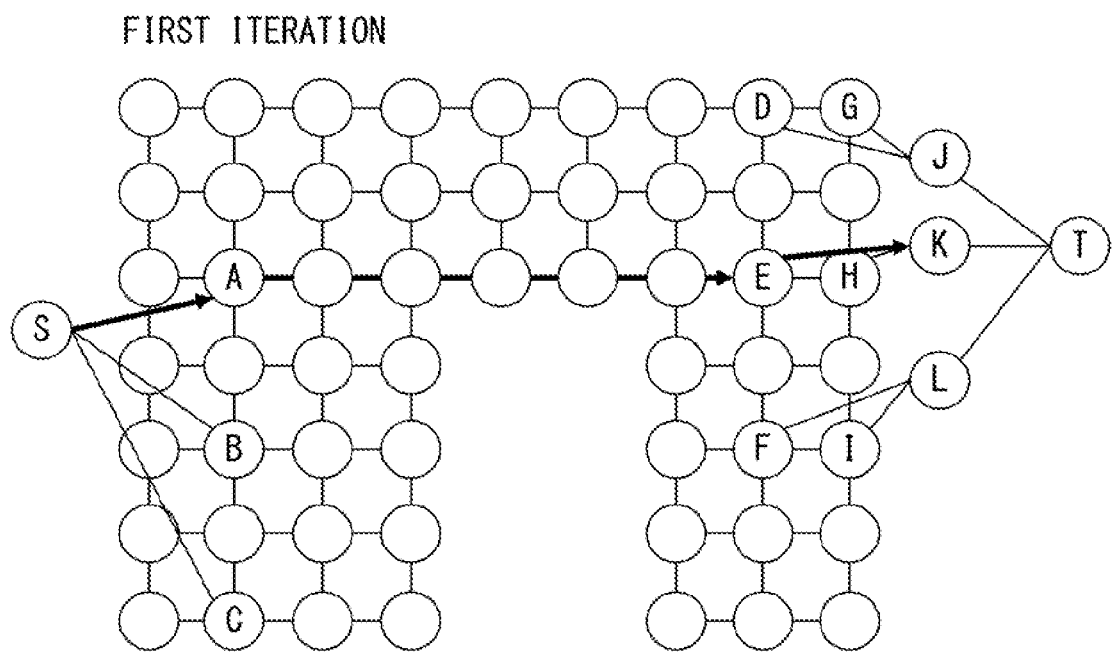
FIG. 9A is an explanatory view (1) of the outline of the procedure of automatic wiring by the wiring design support device in FIG. 1.
Figure 9B:
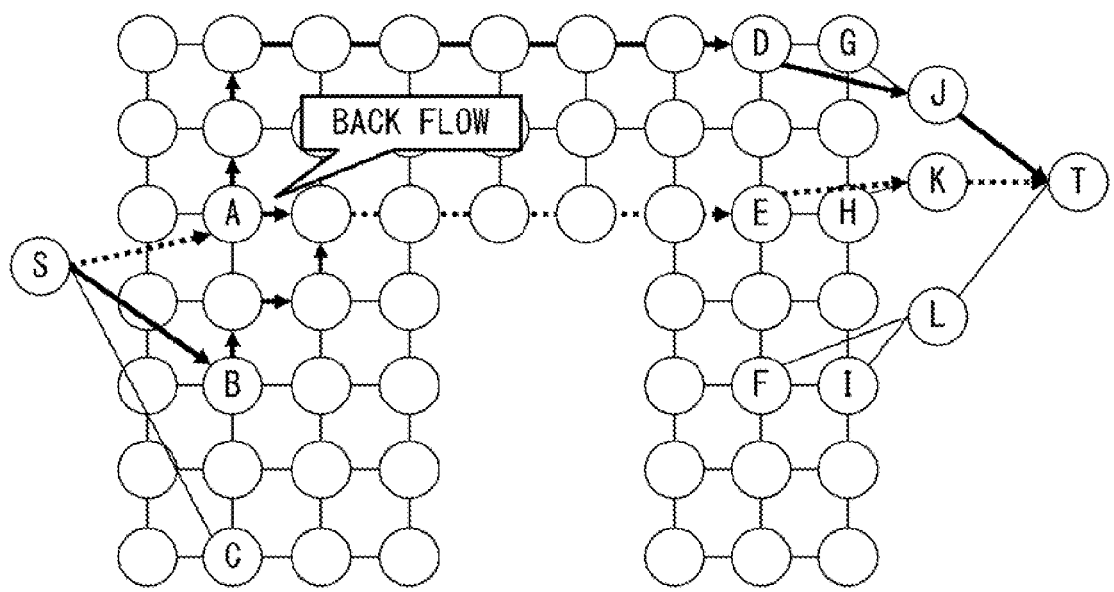
FIG. 9B is an explanatory view (2) of the outline of the procedure of automatic wiring by the wiring design support device in FIG. 1.
Figure 9C:
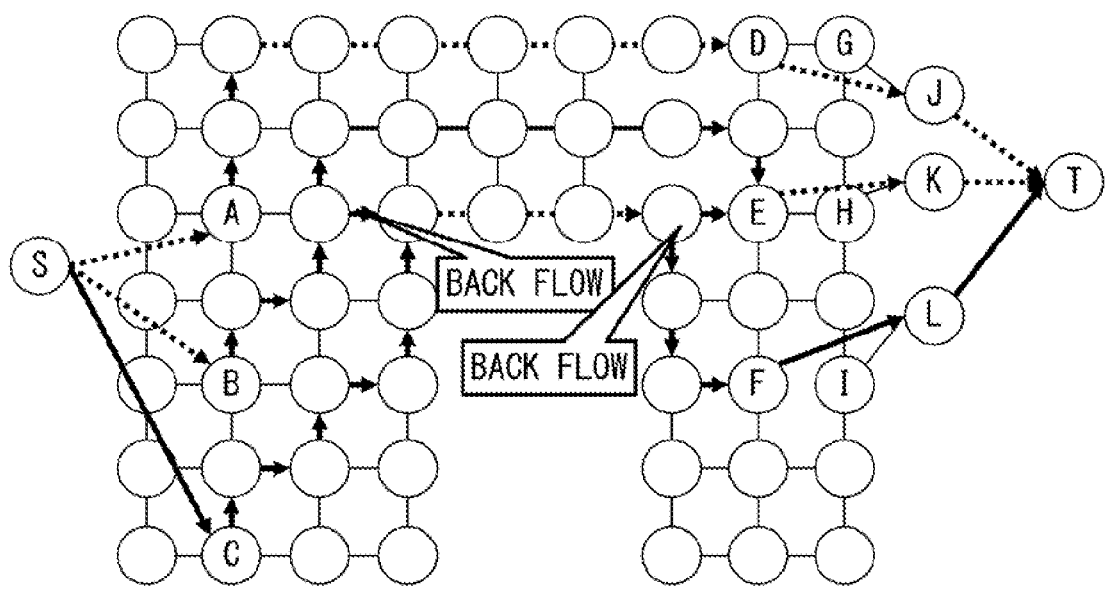
FIG. 9C is an explanatory view (3) of the outline of the procedure of automatic wiring by the wiring design support device in FIG. 1.
Figure 9D:
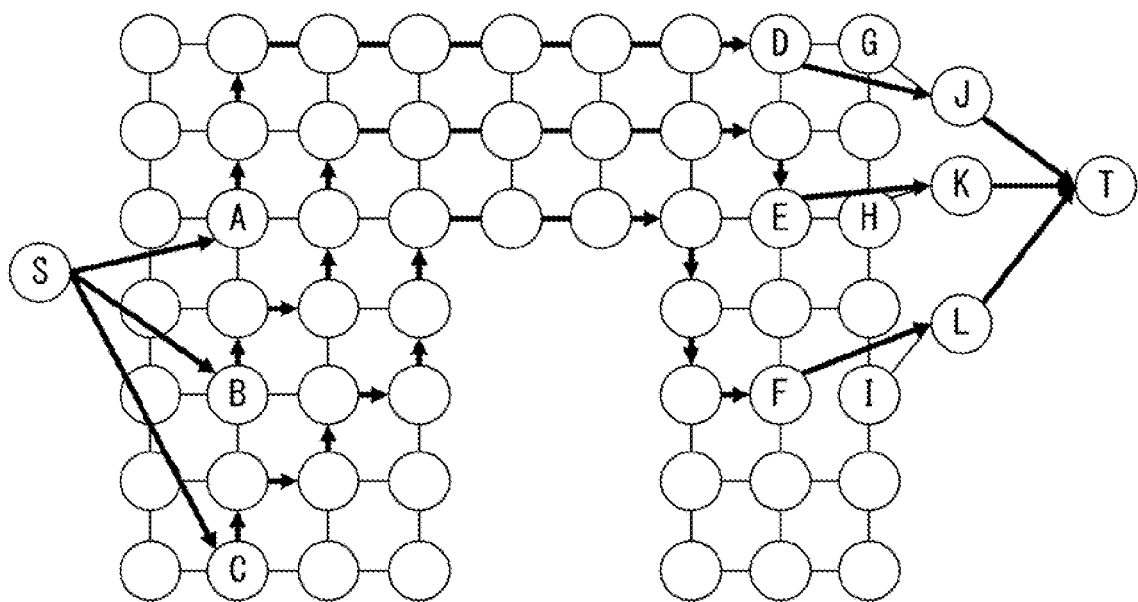
FIG. 9D is an explanatory view (4) of the outline of the procedure of automatic wiring by the wiring design support device in FIG. 1.

In the present embodiment, the flow path search unit 15 performs the search of the path of the maximum flow using the above-mentioned Edmonds-Karp algorithm. Each of FIGS. 9A, 9B, and 9C illustrates the progress of the search of the path of the maximum flow in the flow network exemplified in FIG. 8 according to the Edmonds-Karp algorithm. FIG. 9D is a solution of the maximum flow. In each of FIGS. 9A through 9D, the wiring prohibited area, the grid point located in the wiring prohibited area, and the branch connected to the grid point are omitted.

FIG. 9A illustrates the path detected by the search of the path in the first iteration indicated by a bold arrow. In this example, it is assumed that the path from the starting point S to the end point T through the grid points A and E and the relay node K.

FIG. 9B illustrates the path detected by the search of the path in the second iteration and indicated by a bold arrow. In FIG. 9B, the path detected in the first iteration is indicated by the arrow in broken line. In this example, it is assumed that the path from the starting point S to the end point T through the grid points B, A, and D and the relay node J. The branch provided with the characters "back flow" is included in the path detected in the first iteration of the search of the path, and indicates that the direction is opposite the direction in the first iteration. In this case, the flow path search unit 15 cuts off the flow of the two paths by the branch relating to which the back flow has occurred, and connects the two paths at each grid point on both ends of the branch. As a result, a path from the starting point S to the end point T through the grid points A and D and the relay node J, and a path from the starting point S to the end point T through the grid points B and E and the relay node K are generated.

FIG. 9C illustrates the path detected by the search of the path in the second iteration and indicated by a bold arrow. In FIG. 9C, the path detected up to the second iteration is indicated by the arrow in broken line. In this example, it is assumed that the path from the starting point S to the end point T through the grid points C, E, and F and the relay node L. However, it is assumed that the back flow has occurred in the two branches illustrated in FIG. 9C. The flow path search unit 15 cuts off the flow of the two paths in the branch where the back flow has occurred, and connects the two paths at each grid point at both ends of the branch. As a result, a path from the starting point S to the endpoint T through the grid points B and E and the relay node K, and a path from the starting point S to the end point T through the grid points C and F and the relay node F are generated.

FIG. 9D illustrates that the entire search of the path has terminated by the iteration above, and three paths from the starting point S to the end point T have been detected.

Through the three paths acquired as described above, the wiring path determination unit 16 generates three wiring paths, that is, a wiring path connecting the grid points A and D, the wiring path connecting the grid points B and E, and the wiring path connecting the grid points C and F, on the target area surface of the printed circuit board.

The wiring design support device 1 automatically designs the wiring paths as described above.

Next, the outline of the procedure of the wiring path automatic designing process performed by the wiring design support device 1 according to the present embodiment is described below with reference to FIGS. 10A and 10B.

The figure (1) in FIG. 10 exemplifies the connection relationship, which is expressed by the logical connection information 32, between each terminal of a part A71 and each terminal of a plurality of parts B72 having the same shape is formed by the logical connection information 32 exemplified by broken lines. The part A71 is a multi-pin part, and the part B72 is a 2-terminal part. Each of the part A71 and the part B72 refers to the state in which the parts are arranged in the positions indicated by the parts information 33 on the printed circuit board.

When a user of the wiring design support device 1 issues a specified instruction to start the automatic design of a wiring path to the wiring design support device 1, the wiring design support device 1 first extracts the information about the part having the terminal to be wired from the logical connection information 32 and the parts information 33. Then, one terminal connected by wiring is defined as the end point T side, and the other terminal as the starting point S side. If the information extracted part B72 is a 2-terminal part, the wiring design support device 1 defines the two terminals of the 2-terminal part as the endpoint T side, and the terminal of the part connected to the terminal of the part B72 by the wiring as the starting point S side.

Next, the wiring design support device 1 defines the directional graph on the target area surface of the printed circuit board. Then, the wiring design support device 1 acquires the wiring prohibited area information 31, sets the wiring prohibited area on the target area surface, and further acquires the wiring information from the logical connection information 32 and the parts information 33. In the FIG. 2) in FIG. 10A, the position of each grid point to be wired according to the wiring information is expressed by "x".

Next, the wiring design support device 1 generates the network flow, and further searches the path of the flow having the maximum amount of flow from the starting point S to the end point T in the generated network flow. According to the path acquired by the search result, a wiring path is formed on the target area surface of the printed circuit board. The FIG. 3) in FIG. 10A illustrates the generated wiring path in bold line.

The connection indicated by the logical connection information 32 by the broken lines in the FIG. 1) in FIG. 10A is not consistent with the wiring path indicated by the bold lines in the FIG. 3) in FIG. 10A. However, since the parts B72 have the same shape, the arrangement position of the own part can be replaced with the arrangement position of another part B72. Then, in this case, the wiring design support device 1 sequentially replaces the information about the arrangement positions of the parts B72 for connection through the wiring path, and matches the connection of the terminal connected by each wiring with the connection indicated by the logical connection information 32. The change of the information about the arrangement position of the terminal made by the 2-terminal part information exchange unit 17 corresponds to the replacement of the arrangement positions of the parts B72. Thus, the connection indicated by the logical connection information 32 is temporarily ignored to form a wiring path, and then the matching is performed with the logical connection information 32, thereby reducing the necessity to correct the wiring path already arranged for generating the wiring path at a lower ordinal level. As a result, the time taken to perform the designing operation can be shortened.

When one path to be wired is related to the multiple-stage part, the wiring path automatic designing process is performed in the following procedure.

The figure (1) in FIG. 10B is expressed by the logical connection information 32. The connection between each terminal of a part A71 and each terminal of a plurality of parts C73 having the same shape is formed by the logical connection information 32 and exemplified by broken lines. The part A71 is a multi-pin part, and the part C73 is a multiple-stage part. Each of the part A71 and the part C73 refers to the state in which the parts are arranged in the positions indicated by the parts information 33 on the printed circuit board.

When a user of the wiring design support device 1 issues a specified instruction to start the automatic design of a wiring path to the wiring design support device 1, the wiring design support device 1 first extracts the information about the part having the terminal to be wired from the logical connection information 32 and the parts information 33. Then, one terminal connected by wiring is defined as the end point T side, and the other terminal as the starting point S side. If the information extracted part is a multiple-stage part, the wiring design support device 1 defines the two terminals of the multiple-stage part as the end point T side, and the terminal of the part connected to the terminal of the multiple-stage part by the wiring as the starting point S side.

Next, the wiring design support device 1 defines the directional graph on the target area surface of the printed circuit board. Then, the wiring design support device 1 acquires the wiring prohibited area information 31, sets the wiring prohibited area on the target area surface, and further acquires the wiring information from the logical connection information 32 and the parts information 33. In the FIG. 2) in FIG. 10B, the position of each grid point to be wired according to the wiring information is expressed by "x".

Next, the wiring design support device 1 generates the network flow, and further searches the path of the flow having the maximum amount of flow from the starting point S to the end point T in the generated network flow. According to the path acquired by the search result, a wiring path is formed on the target area surface of the printed circuit board. The figure (3) in FIG. 10B illustrates the generated wiring path in bold line.

The connection indicated by the logical connection information 32 by the broken lines in the figure (1) in FIG. 10B is not consistent with the wiring path indicated by the bold lines in the FIG. 3) in FIG. 10B. However, the parts C73 have the same shape, and furthermore, the element values of the plurality of 2-terminal elements configuring the parts C73 are the same. Therefore, the terminal of the part C73 to be connected by wiring can be replaced with the terminal of other 2-terminal elements, or the terminal of the 2-terminal element of other parts C73. The change of the information about the arrangement position of the terminal performed by the multiple-stage parts information exchange unit 18 corresponds to the replacement of the 2-terminal element configuring the part C73 with other 2-terminal elements. Thus, the connection indicated by the logical connection information 32 is temporarily ignored to form a wiring path, and then the matching is performed with the logical connection information 32, thereby reducing the necessity to correct the wiring path already arranged for generating the wiring path at a lower ordinal level. As a result, the time taken to perform the designing operation can be shortened.

Described below are the practical contents of the wiring path automatic designing process performed by the wiring design support device 1.

Figure 11:
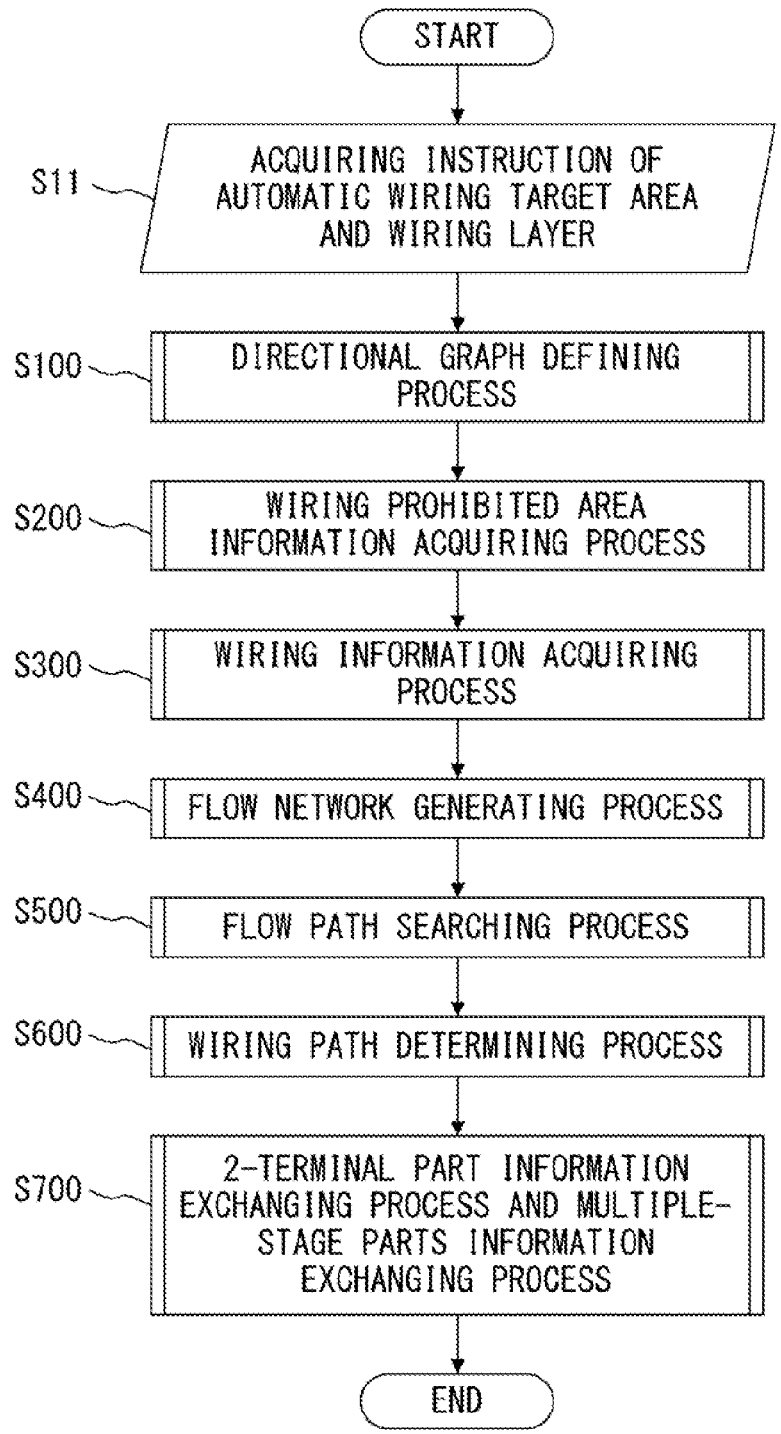
FIG. 11 is a flowchart of the contents of the wiring path automatic designing process.

The flowchart in FIG. 11 is described first. FIG. 11 is a flowchart of the contents of the wiring path automatic designing process. The process is started when the user of the wiring design support device 1 (hereafter referred to simply as a "user") operates the mouse device 42 or the keyboard device and the MPU 10 detects a specified execution start instruction.

In FIG. 11, first in S11, performed is a process of acquiring an instruction to specify a wiring target area and a wiring layer on the printed circuit board on which automatic wiring is performed and to be input by the user operating the mouse device 42 or the keyboard device 43.

Next, in S100, the directional graph definition unit 11 of the MPU 10 performs the directional graph defining process.

Next, in S200, the wiring prohibited area information acquisition unit 12 of the MPU 10 performs the wiring prohibited area information acquiring process.

Next, in S300, the wiring information acquisition unit 13 of the MPU 10 performs the wiring information acquiring process.

Next, in S400, the flow network generation unit 14 of the MPU 10 performs the flow network generating process.

Next, in S500, the flow path search unit 15 of the MPU 10 performs the flow path searching process.

Next, in S600, the wiring path determination unit 16 of the MPU 10 performs the wiring path determining process.

In S700, the MPU 10 performs the 2-terminal part information exchanging process and the multiple-stage parts information exchanging process. The 2-terminal part information exchanging process is performed by the 2-terminal part information exchange unit 17 of the MPU 10 when the terminal to be wired is a 2-terminal part or a multiple-stage part. Furthermore, the multiple-stage parts information exchanging process is performed by the multiple-stage parts information exchange unit 18 of the MPU 10 when the terminal to be wired is a multiple-stage part.

When the processes up to S700 are completed, the wiring path automatic designing process in FIG. 11 terminates.

Described next is the details of each process from S100 to S700 in FIG. 11.

Figure 12:
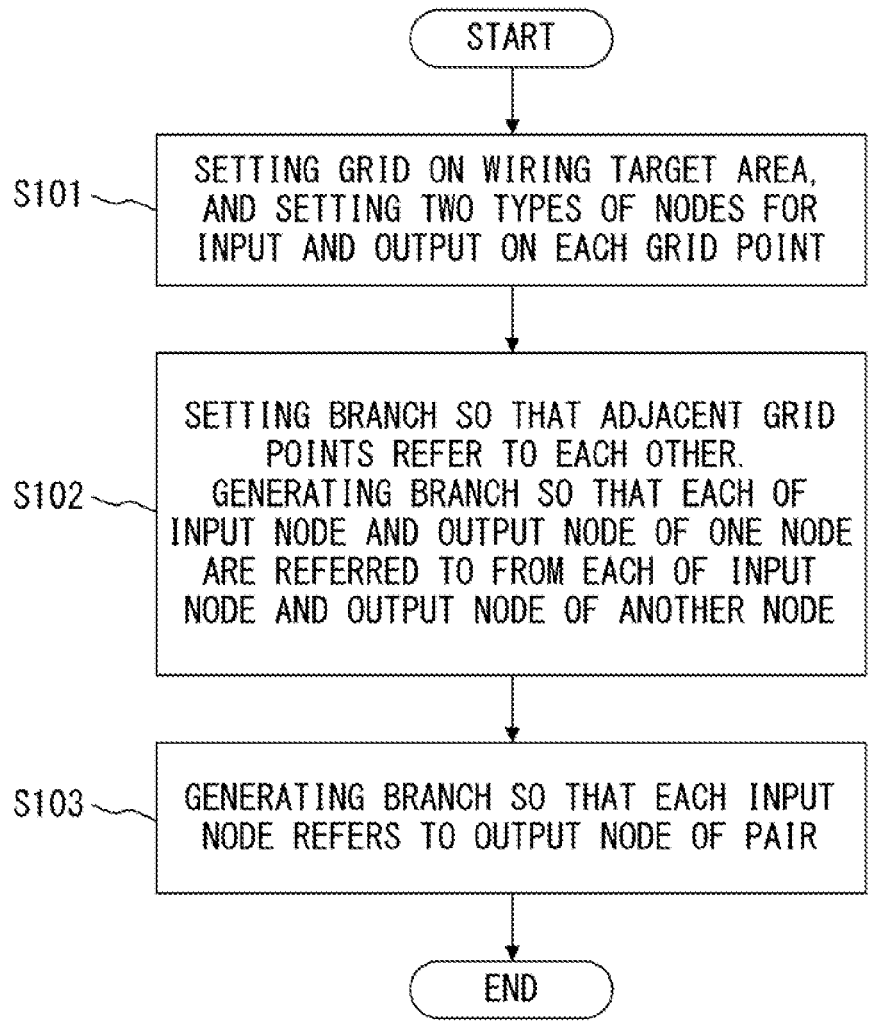
FIG. 12 is a flowchart of the contents of the directional graph defining process.

Described first is the directional graph defining process as the process in S100 in FIG. 11. FIG. 12 is a flowchart of the contents of the directional graph defining process.

Before explaining the flowchart in FIG. 12, the method of defining a node and a branch in the directional graph defining process is described with reference to FIG. 13.

In the directional graph defining process, an input-only node (input node) in the incoming direction of the flow into the grid point, an output-only node (output node) in the outgoing direction of the flow from the grid point, and a branch connecting the input node and the output node are defined for each grid point. Furthermore, in this process, as a branch connecting two adjacent grid points, a branch connecting the output node of one grid point to the input node of the other grid point, and a branch connecting the output node of the other grid point to the input node of the one grid point are defined. FIG. 13 is an explanatory view of the definition.

Figure 13:
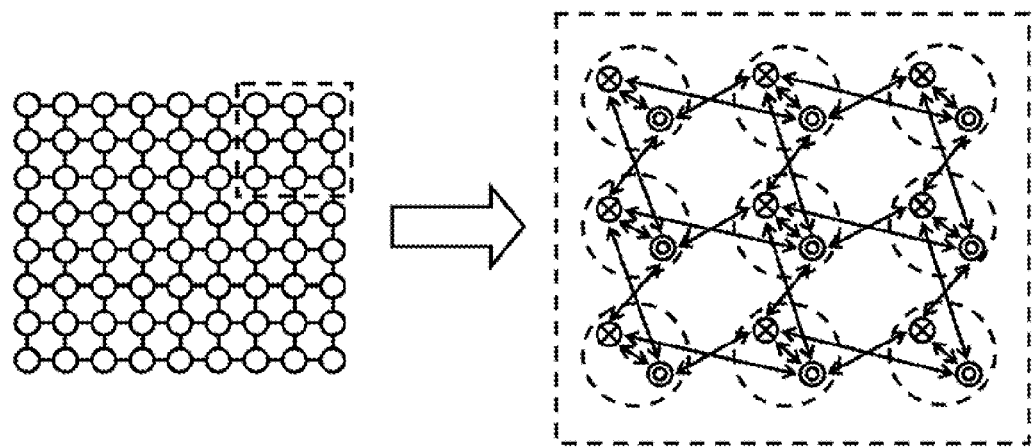
FIG. 13 is an explanatory view of the method of defining a node and a branch in the directional graph defining process illustrated in FIG. 12.

In FIG. 13, the left figure is an example of a directional graph defined in the wiring target area on the printed circuit board defined by the directional graph defining process. The right figure is an enlarged image of the area enclosed by the rectangle in broken line in the left figure.

In the right figure, the circle in broken line indicates a grid point. The circles placed in the circle in broken line and marked with x and a circle respectively indicates an input node and an output node. The bidirectional arrow in the right figure indicates the branch defined by the directional graph defining process.

The flowchart in FIG. 12 is given below. First in S101, the directional graph definition unit 11 defines a grid in the wiring target area on the printed circuit board, and the process of setting an input node and an output node at each grid point in the grid is performed.

Next, in S102, the directional graph definition unit 11 performs the process of setting a branch connecting an input node and an output node between the adjacent grid points. In this case, an arrangement is made to designate one of the nodes connected by a branch from the other node.

Next, in S103, the directional graph definition unit 11 performs the process of setting a branch connecting the input node and the output node set for each grid point in the process in S101. In this case, an arrangement is made to designate one of the nodes connected by a branch from the other node.

When the process above terminates, the directional graph defining process terminates.

The tables in FIGS. 14A and 14B are described below. FIG. 14A illustrates the data structure of a node information table 81 generated by the directional graph defining process described above. FIG. 14B illustrates the data structure of a branch information table 82 generated by the directional graph defining process.

As illustrated in FIG. 14A, the node information table 81 is a table including associated data of the items of "number", "coordinates", "number of branches", and "branch number". The "number" stores the number identifying the node set by the directional graph definition unit 11. In addition, the "coordinates" stores the data of coordinates designating the position in the wiring target area on the printed circuit board about the grid point in which the node is set. The "number of branches" stores the data of the number of branches in the outgoing direction from the node. The "branch number" stores the data designating each branch in the outgoing direction from the node.

In the node information table 81, the data in the line having the "number" of 'S', 'C', or 'T' is added to the node information table 81 by the flow network generating process described later.

As indicated in FIG. 14B, the branch information table 82 is a table including associated data of the items of "number", "node information", and "capacity". In this example, the "number" stores the number data identifying the branch set by the directional graph definition unit 11. The number data is used in the item "branch number" in the node information table 81. The "node information" stores the data designating the node directed the branch. The data of the item can be the number of "number" data in the node information table 81. The "capacity" stores the capacity data of the branch, but the value is set by the flow network generating process described later.

In the directional graph defining process in FIG. 12, the process of first generating each record of the node information table 81 by the process in S101 and storing the data of the "number" and the "coordinates" is performed. In the subsequent process in S102 and S103, each record in the branch information table 82 is first generated, the data of the "number" and the "node information" is stored, and then the data of the "branch number" of the node information table 81 is stored.

Described next is the wiring prohibited area information acquiring process as the process in S200 in FIG. 11. FIG. 15 is a flowchart of the contents of the wiring prohibited area information acquiring process.

In S201 in FIG. 15, the directional graph definition unit 11 performs the process of acquiring the wiring prohibited area information 31, and designating the node set by the directional graph definition unit 11 at the grid point located in the wiring prohibited area indicated by the wiring prohibited area information 31. When the process is terminated, the wiring prohibited area information acquiring process terminates.

Described below is the data in FIG. 16. FIG. 16 illustrates the data structure of a disabled node table 83 generated by the wiring prohibited area information acquiring process.

As illustrated in FIG. 16, the disabled node table 83 has "node number" data. The "node number" data is the data designating the node set by the directional graph definition unit 11 at the grid point located in the wiring prohibited area indicated by the wiring prohibited area information 31. The data stores the "number" data set in the node information table 81 for the node.

In S201 in FIG. 15, the wiring prohibited area information acquisition unit 12 performs the process of storing in the disabled node table 83 the "number" data about the node set by the directional graph definition unit 11 at the grid point located in the area indicated by the wiring prohibited area information 31.

Figure 17:
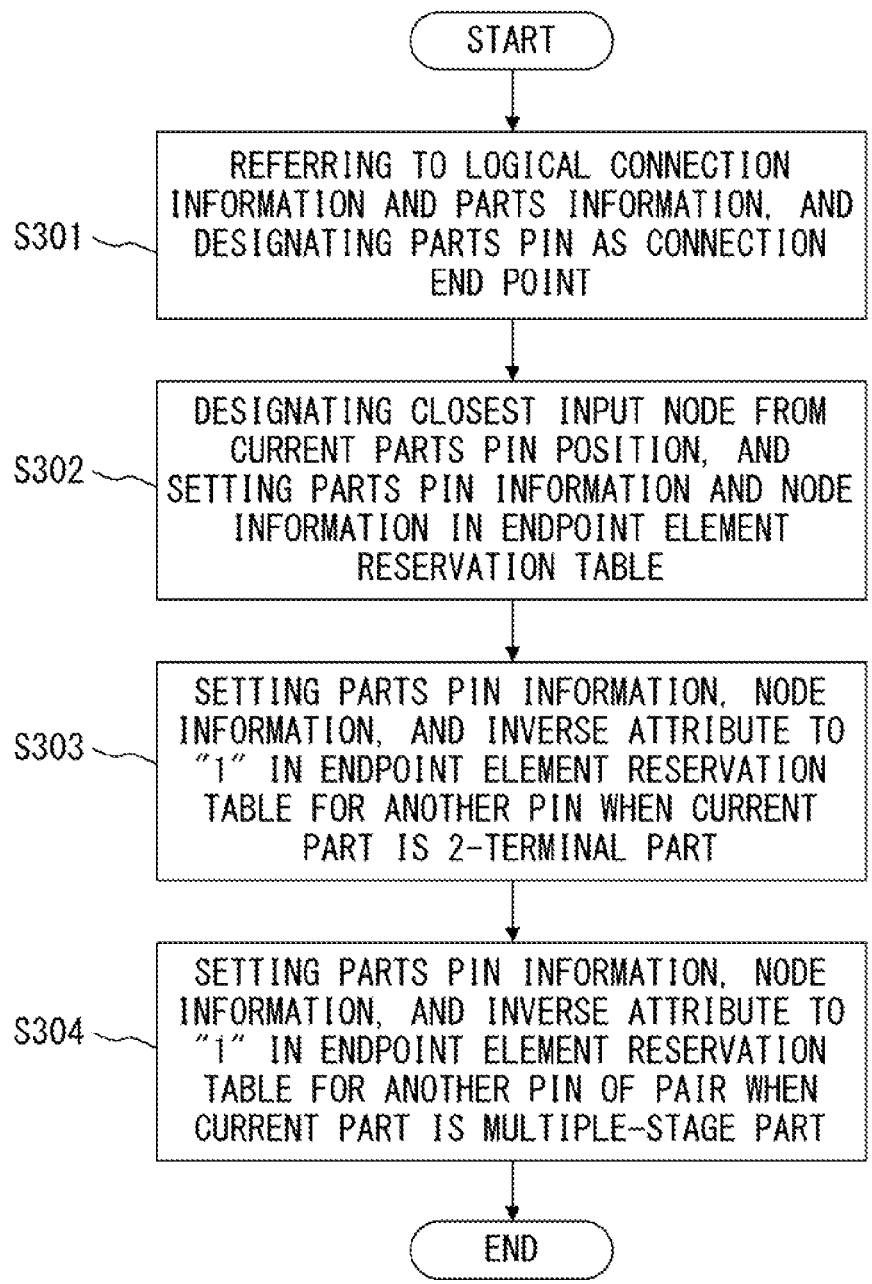
FIG. 17 is a flowchart of the contents of the wiring information acquiring process.

Described next is the wiring information acquiring process as the process in S300 in FIG. 11. FIG. 17 is a flowchart of the contents of the wiring information acquiring process.

In FIG. 17, first in S301, the wiring information acquisition unit 13 performs the process of acquiring the logical connection information 32 and the parts information 33, and acquiring the position on the printed circuit board of each terminal to be connected by automatically designed wiring according to the information.

Next, in S302, the wiring information acquisition unit 13 performs the process of referring to the node information table 81, designating the input node of the grid point closest to the position of each terminal acquired in the process in S301, and generating the correspondence between the designated input node and the terminal.

Described below is the data in FIG. 18. FIG. 18 illustrates the data structure of an endpoint element reservation table 84 generated by the wiring information acquiring process. The endpoint element reservation table 84 illustrates the correspondence between the input node and each terminal.

As illustrated in FIG. 18, the endpoint element reservation table 84 associates the data if each item of "node number", "parts pin name", "set number", "connection name", and "inversion".

The "parts pin name" stores the data designating the terminal to be connected by automatically designed wiring. The data is the information about the items of the "starting point pin name" and the "end point pin name" of the logical connection information 32.

The "node number" stores the data designating the input node set for the grid point closest to the position of the terminal designated by the "parts pin name". The data can be "number" data set in the node information table 81 for the node.

The "set number" stores the data for discrimination of the parts having a terminal designated by the "parts pin name". In the example illustrated in FIG. 18, the "set number" data of each terminal from line 1 to line 5 indicates '0', the terminals belongs to the same part ("LSI1").

The "connection name" stores the information about the item "connection name" associated by the logical connection information 32 about the terminal name indicated buy the "parts pin name". The information about the "connection name" is stored by the wiring path determining process described later, and is kept blank (null data) until the information is stored.

In the wiring information acquiring process in FIG. 17, each record of the endpoint element reservation table 84 is generated for each designated input node by the process in S302, and the "node number" is associated with the "parts pin name" and the correspondence information is expressed. The data of the items "set number" and the "connection name" is generated and stored by the wiring information acquisition unit 13 based on the data of the logical connection information 32.

The initial value of "0" is stored in the item "inversion" in the endpoint element reservation table 84, and the value "1" is stored by the processes in S303 and S304 in FIG. 17.

Back in FIG. 17, the process in S303 is performed when the terminal acquired by the process in S301 is one terminal of a 2-terminal part. In this case, the wiring information acquisition unit 13 first acquires the position of another terminal of the 2-terminal part on the printed circuit board. Then, it designates the input node of the grid point closest to the other terminal with reference to the node information table 81, and generates the correspondence information between the designated input node and the other terminal. By the process, a record is added to the endpoint element reservation table 84, and the "node number" is associated with the "parts pin name" and the correspondence information is expressed. The data of the items "set number" and the "connection name" is generated and stored by the wiring information acquisition unit 13 based on the data of the logical connection information 32. Furthermore, in the process in S303, the wiring information acquisition unit 13 performs the process of setting "1" as the value of the item "inversion" of the record of the other terminal in the endpoint element reservation table 84.

Next, the process in S304 is performed when the terminal acquired in the process in S301 is one terminal of a 2-terminal part configuring a multiple-stage part. In this case, the wiring information acquisition unit 13 first acquires the position of another terminal of the 2-terminal part on the printed circuit board. Then, it designates the input node of the grid point closest to the other terminal with reference to the node information table 81, and generates the correspondence information between the designated input node and the other terminal. By the process, a record is added to the endpoint element reservation table 84, and the "node number" is associated with the "parts pin name" and the correspondence information is expressed. The data of the items "set number" and the "connection name" is generated and stored by the wiring information acquisition unit 13 based on the data of the logical connection information 32. Furthermore, in the process in S304, the wiring information acquisition unit 13 performs the process of setting "1" as the value of the item "inversion" of the record of the other terminal in the endpoint element reservation table 84.

When the process above is completed, the wiring information acquiring process terminates.

Figure 19:
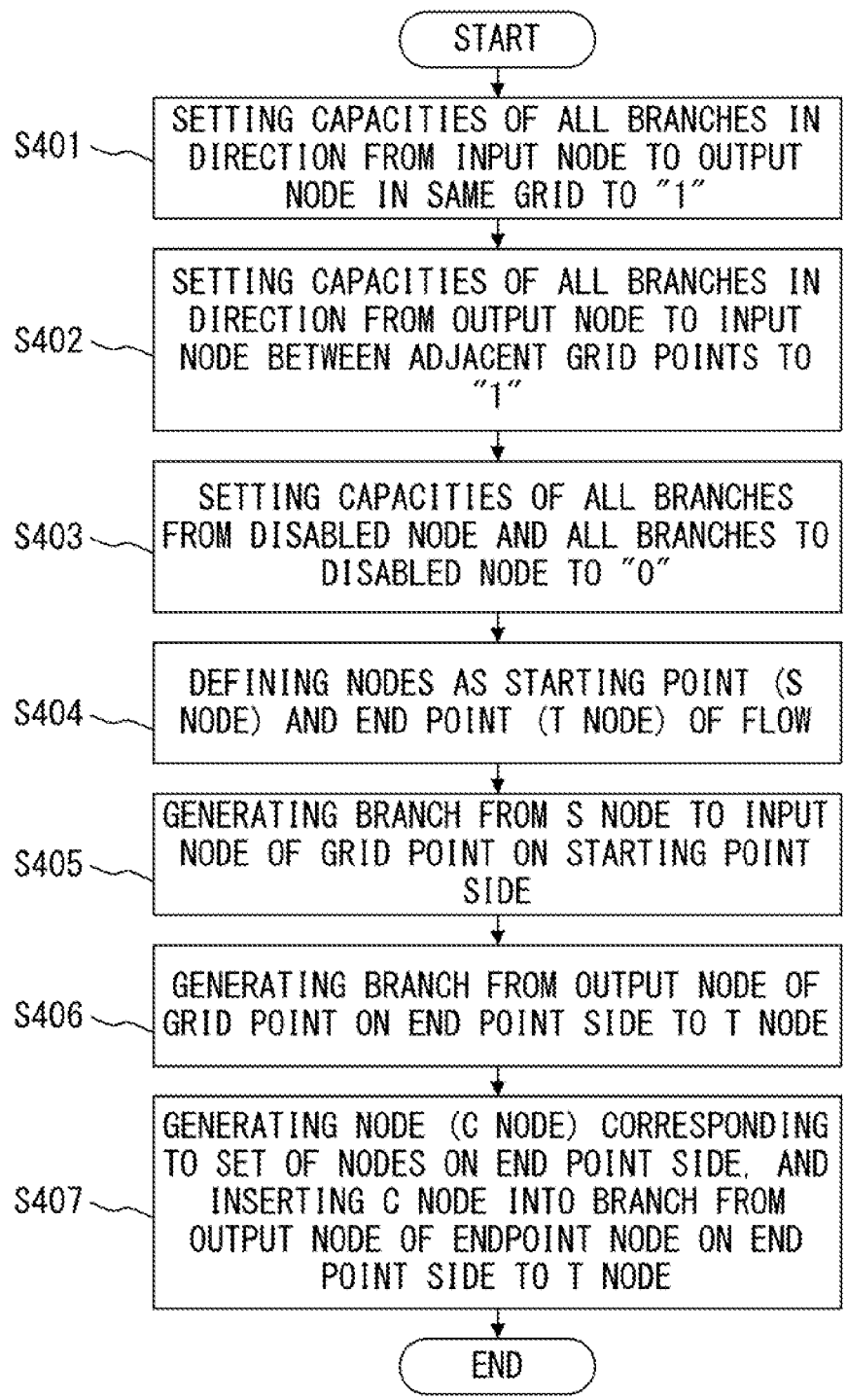
FIG. 19 is a flowchart of the contents of the flow network generating process.

Described next is the flow network generating process as the process in S400 in FIG. 11. FIG. 19 is a flowchart of the contents of the flow network generating process.

In FIG. 19, the processes from S401 to S403 are to set the flow capacity for each branch of the directional graph defined by the directional graph definition unit 11. The flow capacity is set for the item "capacity" of the branch information table 82.

First in S401, the flow network generation unit 14 performs the process of setting the flow capacity to "1" for all branches in the direction from the input node to the output node in the same grid point in the branches of the directional graph (that is, matching "coordinates" data in the branch information table 82). The input node has the "number of branches" data of '1' in the node information table 81, and the output node has the "number of branches" data of the value other than '1'.

Next, in S402, the flow network generation unit 14 performs the process of setting the flow capacity to "1" for all branches in the direction from the output node to the input node between the adjacent grid points in the branches of the directional graph.

Figure 20A:
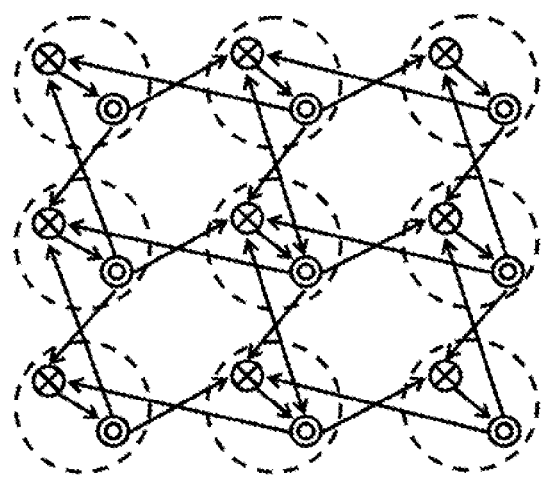
FIG. 20A is an explanatory view (1) of the contents of the flow network generating process.

FIG. 20A is a schematic diagram indicating the result of the processes in S401 and S402 for the directional graph in the right figure in FIG. 20A. In the processes above, the flow capacity of "1" is set for the direction of the arrow indicated in the figure for all branches between the nodes.

Next, in step S403, the flow network generation unit 14 performs the process of setting the flow capacity to "0" for all branches connecting the nodes storing the "node number" in the disabled node table 83 with reference to the disabled node table 83. By the process, the path through the wiring prohibited area is excluded from the candidate for an automatically designed wiring path.

Next, in S404, the flow network generation unit 14 performs the process of adding the definitions of the S node as the starting point of the flow and the T node as the end point of the flow for the directional graph defined by the directional graph definition unit 11. The addition of the definitions is performed by adding two records having the "number" of S and T.

Next, in S405, the flow network generation unit 14 performs the process of generating for a set a branch from the S node to the input node included in one of the sets of grid points performing a search of the path between the grid points. In this case, the flow network generation unit 14 performs the process of searching the "parts pin name" of the endpoint element reservation table 84 for the "starting point pin name" in the logical connection information 32. Then, it connects to the S node the node designated by the "node number" associated in the endpoint element reservation table 84 relating to the "parts pin name" detected in the searching process. In the process, the record of the branch having the flow capacity of "1" in the direction from the node above to the S node is added to the branch information table 82, and the number designating the branch is added to the "branch number" in the record of the S node in the node information table 81.

Next in S406, the flow network generation unit 14 performs the process of generating for a set a branch to the T node from the output node included in one of the sets of grid points performing a search of the path between the grid points. In this case, the flow network generation unit 14 performs the process of searching the "parts pin name" of the endpoint element reservation table 84 for the "starting point pin name" in the logical connection information 32. Then, it connects to the T node the node designated by the "node number" associated in the endpoint element reservation table 84 relating to the "parts pin name" detected in the searching process. In the process, the record of the branch having the flow capacity of "1" in the direction from the S node to the node above is added to the branch information table 82, and the number designating the branch is added to the "branch number" in the record of the T node in the node information table 81.

The process in S407 is performed by the flow network generation unit 14 when the "endpoint pin name" in the logical connection information 32 is the terminal of the 2-terminal part.

Figure 20B:
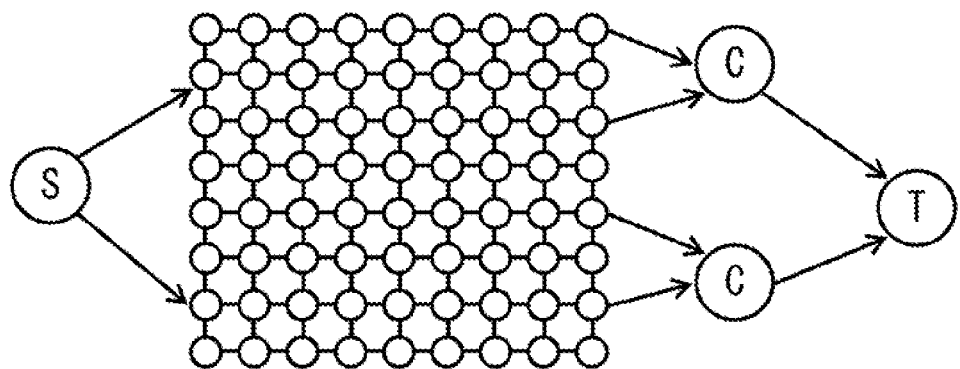
FIG. 20B is an explanatory view (2) of the contents of the flow network generating process.

First in this process, the "node number" of the node corresponding to the two terminals in the 2-terminal part is searched for in the endpoint element reservation table 84. Next, the definition of the relay node C about the 2-terminal part is added to the directional graph defined by the directional graph definition unit 11. Then, the relay node C is inserted into the branch from the two nodes corresponding to the two terminals of the 2-terminal part to the T node. The inserting process changes the direction of the branch from the two nodes corresponding to one terminal and the other terminal of the 2-terminal part to the T node into the relay node C, and the branch having the flow capacity of "1" and in the direction from the relay node C to the T node is added. FIG. 20B is an example of the directional graph into which the relay node C has been inserted in the process.

In the process in S407, the flow network generation unit 14 practically performs the following process. First, the flow network generation unit 14 adds the record of the branch in the direction from the relay node C to the node to the branch information table 82, and also adds the record having the "number" of C and including the branch in the "branch number" to the node information table 81. Next, in the node information table 81, for the "branch number" associated with the "node number" of the two nodes corresponding to the two terminals of the 2-terminal part, the records of the branch information table 82 are referenced. Then, the record having the "node information" of 'T' is retrieved, and is changed into 'C'.

When the process above is completed, the flow network generating process terminates.

Figure 21A:
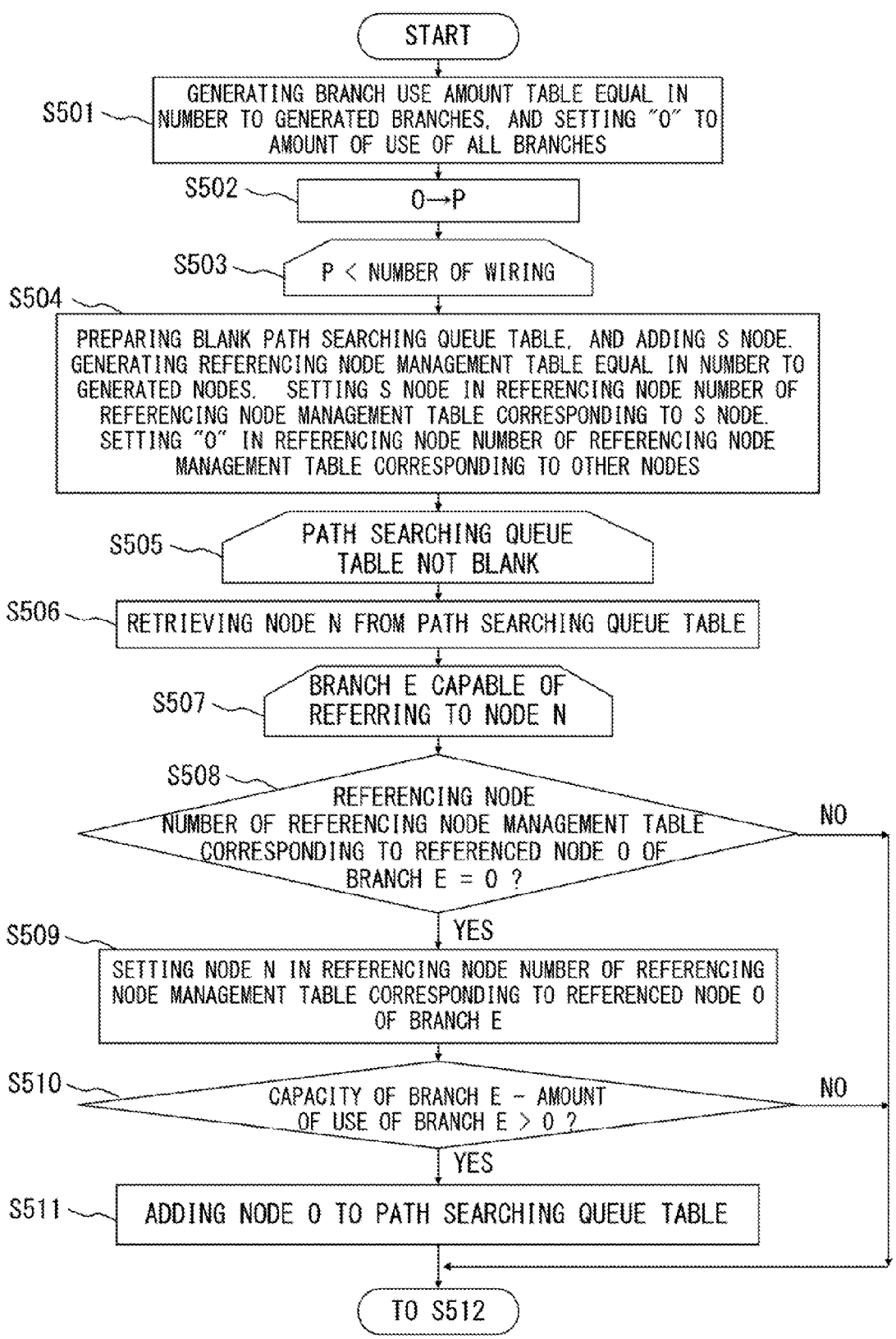
FIG. 21A is a flowchart (1) of the contents of the flow path searching process.
Figure 21B:
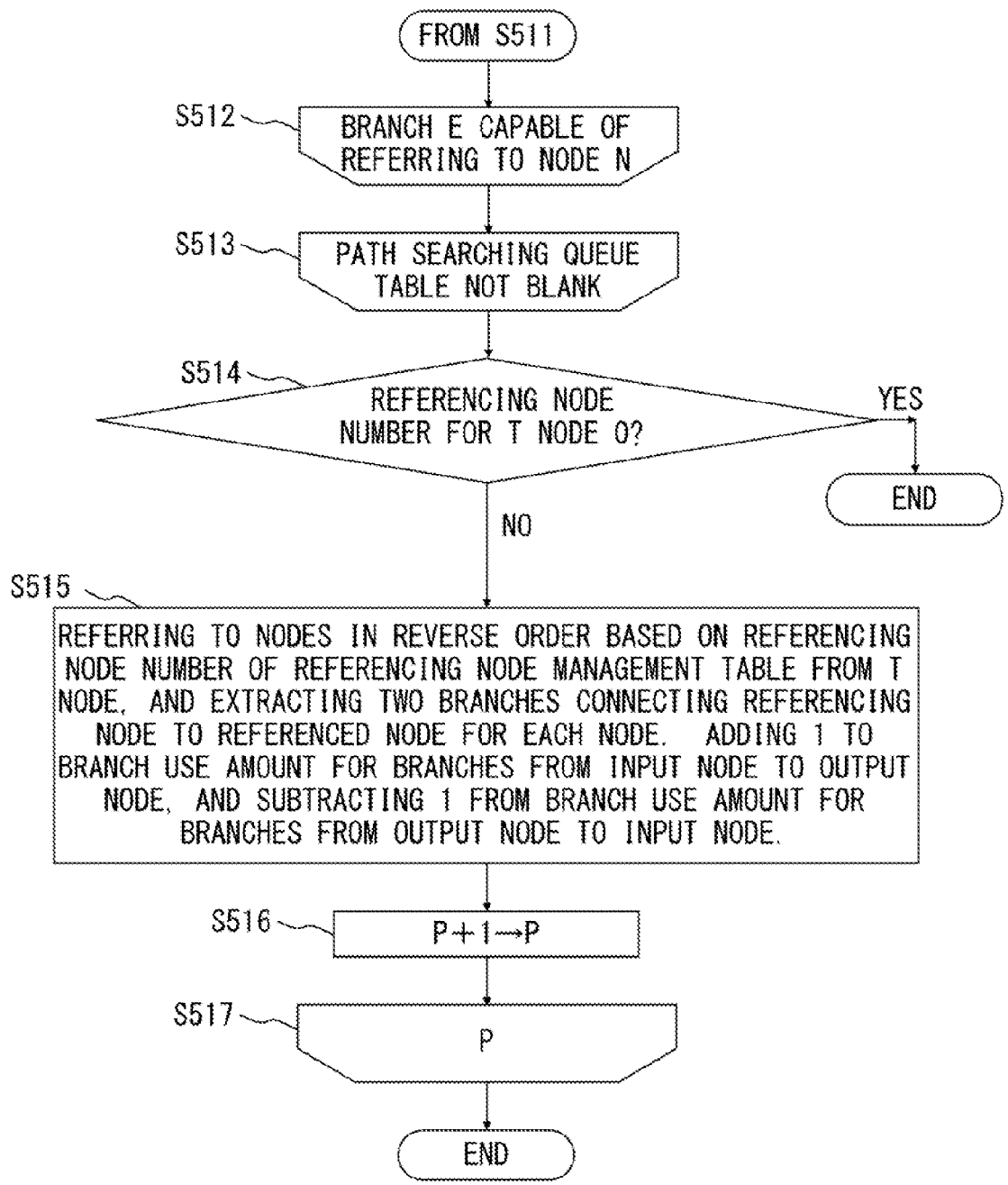
FIG. 21B is a flowchart (2) of the contents of the flow path searching process.

Described next is the flow path searching process as the process in S500 in FIG. 11. FIGS. 21A and 21B are flowcharts of the contents of the flow path searching process. FIG. 22 illustrates the data structure of various data tables used in the flow path searching process.

In FIG. 21A, first in S501, the flow path search unit 15 performs the process of generating a branch use amount table 85 having the same number of records as the branch information table 82, and setting the "amount of use" of '0' for all branches of the branch use amount table 85.

As illustrated in FIG. 22, the branch use amount table 85 stores associated data of the items "number" and "amount of use". The "number" stores the "number" used for identification of each branch in the branch information table 82. The "amount of use" is an item storing the amount of flow to be passed to a specified branch by the "number", and has a set initial value of '0' by the process in S501.

Next, in S502, the flow path search unit 15 performs the process of assigning the initial value of '0' to the variable P.

S503 is the process loop with the process pair of S517 in FIG. 21B. The flow path search unit 15 repeats the processes from S504 to S516 in FIG. 21B until the value of the variable P reaches the number of automatically designed wiring (that is, the number of records of the logical connection information 32). The processes from S504 to S516 correspond to once iteration according to the Edmonds-Karp algorithm.

In S504, the flow path search unit 15 performs the following process.

First, the flow path search unit 15 generates a path searching queue table 86 whose queue is empty, and stores 'S' indicating the S node in the path searching queue table 86. The path searching queue table 86 is a table of a queue for first in first out. As illustrated in FIG. 22, the path searching queue table 86 stores the "number" for use in identifying each node in the node information table 81 as the data of the "node number".

Next, the flow path search unit 15 performs the process of generating a referencing node management table 87 having the same number of records as the node information table 81.

The referencing node management table 87 is used in managing anode (hereafter referred to as a "referencing node") which a path reaching a certain node has passed immediately before the certain node. As illustrated in FIG. 22, the referencing node management table 87 has data of the items "number" and "referencing node number" associated with each other, and the items stores the "number" used in identifying each node in the node information table 81. The "referencing node number" stores the data designating the referencing node about the node designated by the "number" data of the same record in the referencing node management table 87.

Next, the flow path search unit 15 assigns an initial value to the item "referencing node number" of the referencing node management table 87. Practically, the flow path search unit 15 first sets the "referencing node number" in the record of the S node (the record of which the "number" is 'S') in the referencing node management table 87 to 'S'. The S node is the starting point of the flow and has no referencing node. Therefore, the S node defines itself as a referencing node, thereby making the setting. Next, the flow path search unit 15 sets the records other than the S node in the referencing node management table 87 to '0' as the initial value indicating that the node is not passed in the path being searched in the current iteration.

The flow path search unit 15 performs the process above in S504.

The process in the next S505 is the process loop with the process pair of S513 in FIG. 21B. The flow path search unit 15 repeats the processes from S506 to S512 in FIG. 21B until the path searching queue table 86 becomes empty.

First in S506, the flow path search unit 15 first retrieves and acquires the "node number" from the path searching queue table 86. The node designated by the node number acquired in the process is defined as a "node N".

The process in the next S507 is the process loop with the process pair of S512 in FIG. 21B. The flow path search unit 15 refers to the record of the node N in the node information table 81, acquires the data of the "branch number" of each branch in the outgoing direction from the node N, and performs the processes from S508 to S511 on each branch. In the explanation of the processes from S508 to S511, the branch to be processed is defined as a "branch E".

In S508, the flow path search unit 15 performs the following process.

First, the flow path search unit 15 refers to the record of the branch E in the branch information table 82, and acquires the data of the "node information" about the node in the outgoing direction of the branch E. The node designated by the data of the "node information" is defined as a "node O".

Next, the flow path search unit 15 refers to the record about the node O in the referencing node management table 87, and determines whether or not the "referencing node number" in the record remains '0' as the initial value. If the flow path search unit 15 determines that the "referencing node number" is '0' (determination result is YES), control is passed to S509. On the other hand, if the flow path search unit 15 determines that the "referencing node number" is not but the number of the referencing node about the node O has already been specified (determination result is NO), control is passed to S512 in FIG. 21B.

In S509, the flow path search unit 15 sets the number designating the node N as the referencing node for the node O in the search of the path in the current iteration to the "referencing node number" in the record of the node O of the referencing node management table 87.

Next, in S510, the flow path search unit 15 determines whether or not the value obtained by subtracting the value of the "amount of use" of the record about the branch E in the branch use amount table 85 from the value of the "capacity" of the record about the branch E in the branch information table 82 is a positive. In this example, if the flow path search unit 15 determines that the subtraction result is a positive, and it is possible to pass the flow by the search in the current iteration through the branch E (determination result is YES), control is passed to S511. On the other hand, if the flow path search unit 15 determines that the subtraction result is not a positive, and it is not possible to pass the flow through the branch E in the current iteration (determination result is NO), control is passed to S512 in FIG. 21B.

Next, in S511, the flow path search unit 15 inputs the number designating the node O to the path searching queue table 86. As a result, the search of the path after the node O is performed by the processes repeated later from S506 to S512 in FIG. 21B.

Control is passed to FIG. 21B, and in S512, the flow path search unit 15 determines whether or not the loop of the process expressed with S507 in FIG. 21A as the pair. If the flow path search unit 15 determines that the processes in the loop have been completed on all branches in the outgoing direction from the node N, then the loop of the process terminates, and control is passed to step S513.

Next, in S513, the flow path search unit 15 determines whether or not the loop of the process expressed with the pair of S505 in FIG. 21A is to be terminated. If the flow path search unit 15 determines that the path searching queue table 86 is empty, then the loop of the process terminates, and control is passed to S514.

Next, in S514, the flow path search unit 15 refers to the referencing node management table 87 and determines whether or not the "referencing node number" remains '0'. If the flow path search unit 15 determines that the "referencing node number" of the T node remains '0' (determination result is YES), then it is assumed that there are no necessary wiring path detected from the S node to the T node, thereby immediately terminating the flow path searching process. On the other hand, if the flow path search unit 15 determines that the "referencing node number" for the T node is not '0' (determination result is NO), then it is assumed that a path has been detected in the current iteration, thereby passing control to S515.

Next, in S515, the flow path search unit 15 performs the following process.

First, the flow path search unit 15 refers to the referencing node management table 87, traces backward the path for the T node from the referencing node to the S node, and acquires the number designating each branch configuring the path from the branch information table 82. Next, the flow path search unit 15 refers to the branch use amount table 85, and changes the value of the "amount of use" for each branch acquired from the branch information table 82. In the branches, the "amount of use" of the branch from the input node to the output node is obtained by adding '1' to the current value of the "amount of use" of the branch. The "amount of use" of the branch from the output node to the input node is obtained by subtracting '1' from the current value of the "amount of use" of the branch.

Next, in S516, the flow path search unit 15 assigns to the variable P the value obtained by adding '1' to the current value of the variable P.

Next, the flow path search unit 15 determines whether or not the loop of the process expressed by a pair of S517 and S503 in FIG. 21A is to be terminated. If the flow path search unit 15 determines that the value of the variable P has reached the number of automatically designed wiring, the loop of the process is terminated. When the loop of the process terminates, the flow path searching process terminates.

Figure 23A:
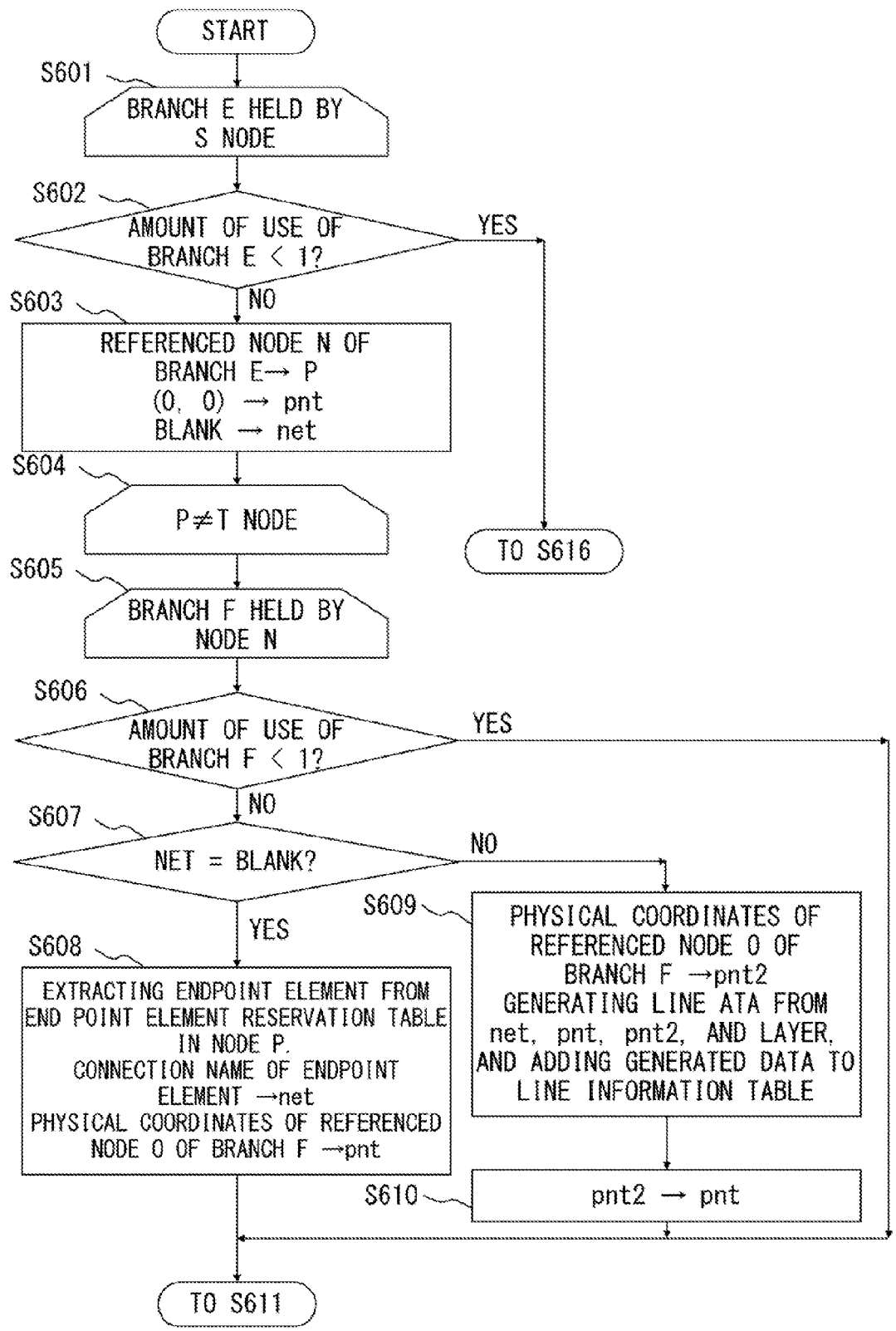
FIG. 23A is a flowchart (1) of the contents of a wiring path determining process.
Figure 23B:
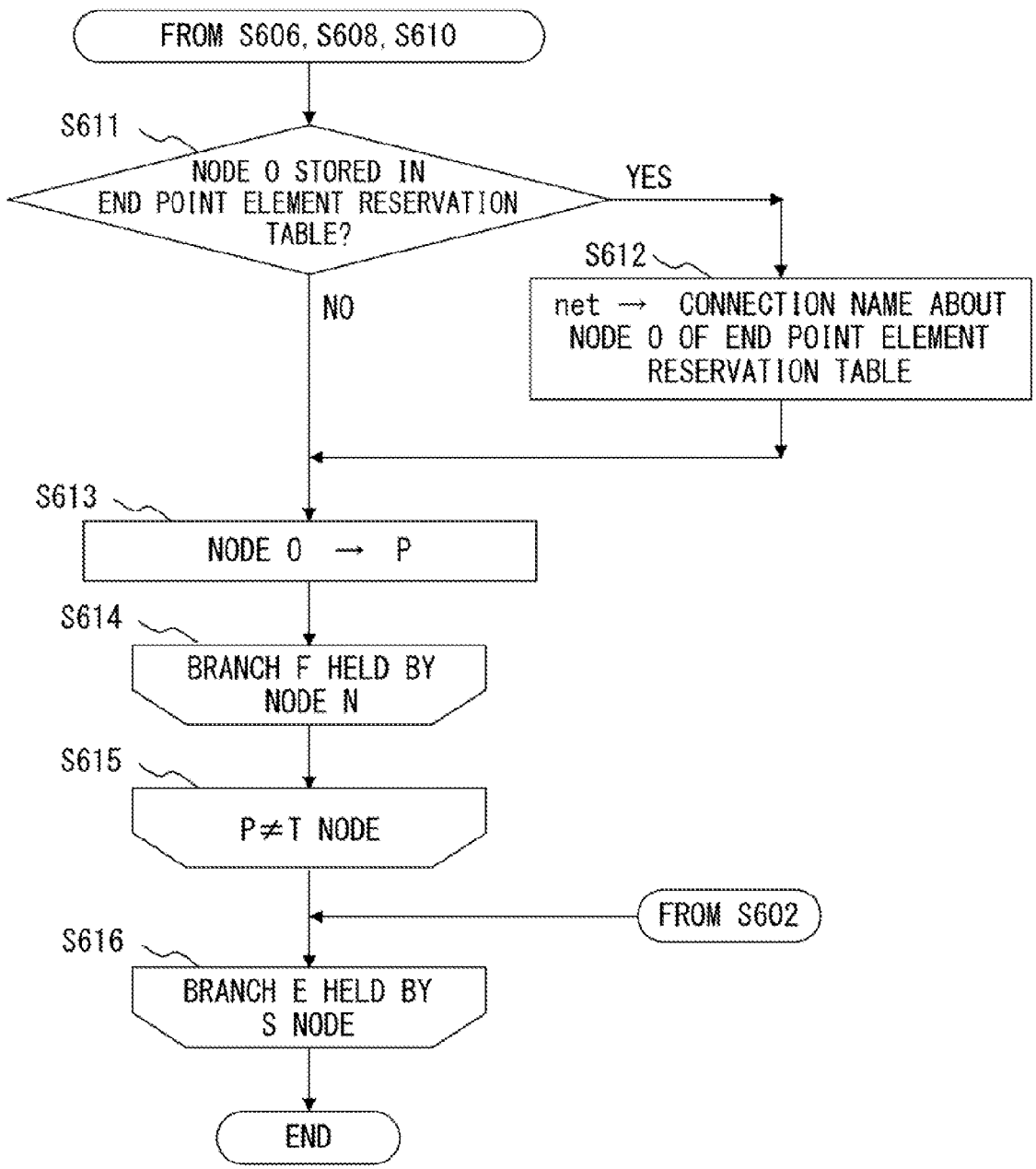
FIG. 23B is a flowchart (2) of the contents of a wiring path determining process.

Described next is the wiring path determining process as the process in S600 in FIG. 11. FIGS. 23A and 23B are flowcharts of the contents of the wiring path determining process.

In FIG. 23A, S601 indicates the loop of the process with the process pair of S616 in FIG. 23B. The wiring path determination unit 16 refers to the record of the S node in the node information table 81, acquires the data of the "branch number" of each branch in the outgoing direction from the S node, and performs the processes from S602 to S615 on each branch. In the explanation of the processes in S602 through S615, the branch designated by the data of the "branch number" of the record above for the S node is defined as "branch E".

In S602, the wiring path determination unit 16 refers to the branch use amount table 85, and determines whether or not the value of the "amount of use" of the record for the branch E is smaller than '1'. If the wiring path determination unit 16 determines that the value of the "amount of use" is smaller than '1', and the flow in the direction cannot path through the branch E any more (determination result is YES), then control is passed to S616 in FIG. 23B. On the other hand, when the wiring path determination unit 16 determines that the value of the "amount of use" is equal to or exceeds '1', and there is room for the flow in the direction to pass through the branch E (determination result is NO), then control is passed to S603.

Next, in S603, the wiring path determination unit 16 performs the following process.

First, the wiring path determination unit 16 refers to the branch information table 82, acquires the "node information" about the destination node of the branch E (hereafter referred to as a "node N"), and assigns the acquired "node information" as an initial value to the variable P.

The wiring path determination unit 16 also assigns the coordinates (0, 0) as an initial value to the variable pnt, and assigns a space (null data) as an initial value to the variable net.

The wiring path determination unit 16 performs the following process in S603.

The next process in S604 refers to the loop of the process with the pair of S615 in FIG. 21B. The wiring path determination unit 16 performs the processes from S605 through S614 so far as the node designated by the variable P (hereafter referred to as a "node P") is different from the T node.

S605 indicates the loop of the process with the process pair of S614 in FIG. 21B. The wiring path determination unit 16 refers to the record of the N node in the node information table 81, acquires the data of the "branch number" of each branch in the outgoing direction from the N node, and performs the processes from S606 to S613 on each branch. In the explanation of the processes in S606 through S613, the branch designated by the data of the "branch number" of the record above for the N node is defined as "branch F".

In S606, the wiring path determination unit 16 refers to the branch use amount table 85, and determines whether or not the value of the "amount of use" of the record for the branch F is smaller than '1'. If the wiring path determination unit 16 determines that the value of the "amount of use" is smaller than '1', and the flow in the direction cannot path through the branch F any more (determination result is YES), then control is passed to S611 in FIG. 23B. On the other hand, when the wiring path determination unit 16 determines that the value of the "amount of use" is equal to or exceeds '1', and there is room for the flow in the direction to pass through the branch F (determination result is NO), then control is passed to S607.

Next, in S607, the wiring path determination unit 16 determines whether or not the current value of the variable net remains blank as the initial value. If the wiring path determination unit 16 determines that the value of the variable net is blank (determination result is YES), control is passed to step S608. If it determines that the value of the variable net is not blank (determination result is NO), control is passed to step S609. The value of the variable net being blank is expressed by the branch F which is directly led from the node connected to the S node through the branch E.

Next, in S608, the wiring path determination unit 16 performs the following process.

First, the wiring path determination unit 16 refers to the record of the node N in the endpoint element reservation table 84 and acquires the "parts pin name" data. Then, the wiring path determination unit 16 refers to the logical connection information 32, acquires the "connection name" about the terminal indicated by the "parts pin name" data, and assigns the data to the variable net.

Next, the wiring path determination unit 16 refers to the branch information table 82, and acquires the "node information" about the destination node of the branch F. The node designated by the "node information" is referred to as a "node O". Then, the wiring path determination unit 16 refers to the record of the node O of the node information table 81, and reads the "coordinates" data in the record and assigns the data to the variable pnt.

The wiring path determination unit 16 performs the processes above in S608, and then passes control to S611 in FIG. 23B.

On the other hand, the wiring path determination unit 16 performs the following process in S609.

First, the wiring path determination unit 16 refers to the branch information table 82 and acquires the "node information" about the destination node O of the branch F as well in the process in S608. Then, the wiring path determination unit 16 refers to the record about the node O in the node information table 81, reads the "coordinates" data in the record and assigns the data to the variable pnt2.

Next, the wiring path determination unit 16 stores the data of the record about the "connection name" indicated at this moment in the variable net in the wiring path information 34. In this process, the information about the path connecting using the wiring of a specified width between the position indicated by the current coordinates of the variable pnt and the position indicated by the current coordinates of the variable pnt2 is stored in the item of "coordinates" in the wiring path information 34. About the information of the "layer", the information of the wiring layer included in the instruction acquired in the process in S11 in FIG. 11 is stored as is.

The wiring path determination unit 16 performs the process above in S609.

Next, in S610, the wiring path determination unit 16 assigns the current coordinates of the variable pnt2 to the variable pnt, and then control is passed to S611 in FIG. 23B.

In S611 in FIG. 23B, the wiring path determination unit 16 refers to the endpoint element reservation table 84, and determines whether or not a record about the node O is stored in the endpoint element reservation table 84. If the wiring path determination unit 16 determines that there is a record about the node O in the endpoint element reservation table 84 (determination result is YES), control is passed to step S612. If it determines there is no record about the node O (determination result is NO), control is passed to S613.

Next, in S612, the wiring path determination unit 16 stores the data of the "connection name" assigned to the variable net as the data of the "connection name" of the record about the node O in the endpoint element reservation table 84.

In S613, the wiring path determination unit 16 assigns the data of the "node information" designating the node O to the variable P.

Next, in S614, the wiring path determination unit 16 determines whether or not the process loop expressed with the process pair of S605 is to be terminated. If the wiring path determination unit 16 determines that the processes from S606 through S613 have been completed on all branches indicated by the "branch number" of the record about the node N in the node information table 81, the loop of the process terminates, and control is passed to step S615.

Next, in S615, the wiring path determination unit 16 determines whether or not the loop of the process expressed with the process pair of S604 in FIG. 23A is to be terminated. If the wiring path determination unit 16 determines that the node P expressed by the variable P matches the T node, the loop of the process is terminated and control is passed to S616.

Next, in S616, the wiring path determination unit 16 determines whether or not the process loop expressed with the process pair of S601 is to be terminated. If the wiring path determination unit 16 determines that the processes from S602 through S615 have been completed on all branches indicated by the "branch number" of the record about the S node in the node information table 81, the loop of the process terminates. If the loop of the process terminates, the wiring path determining process terminates.

Described next are the 2-terminal part information exchanging process and the multiple-stage parts information exchanging process as the process in S700 in FIG. 11.

Figure 24A:
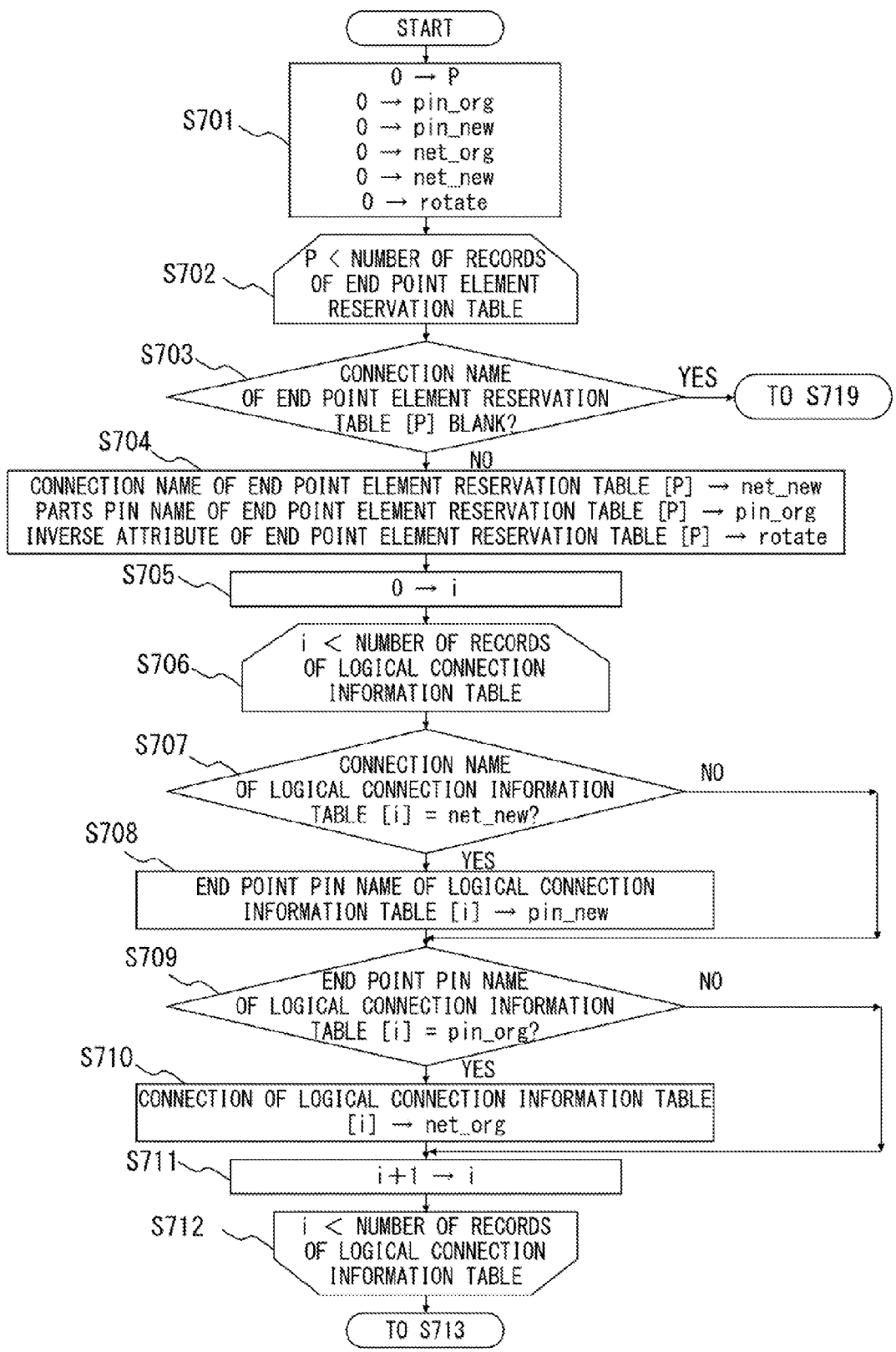
FIG. 24A is a flowchart (1) of the contents of a 2-terminal part information exchanging process.
Figure 24B:
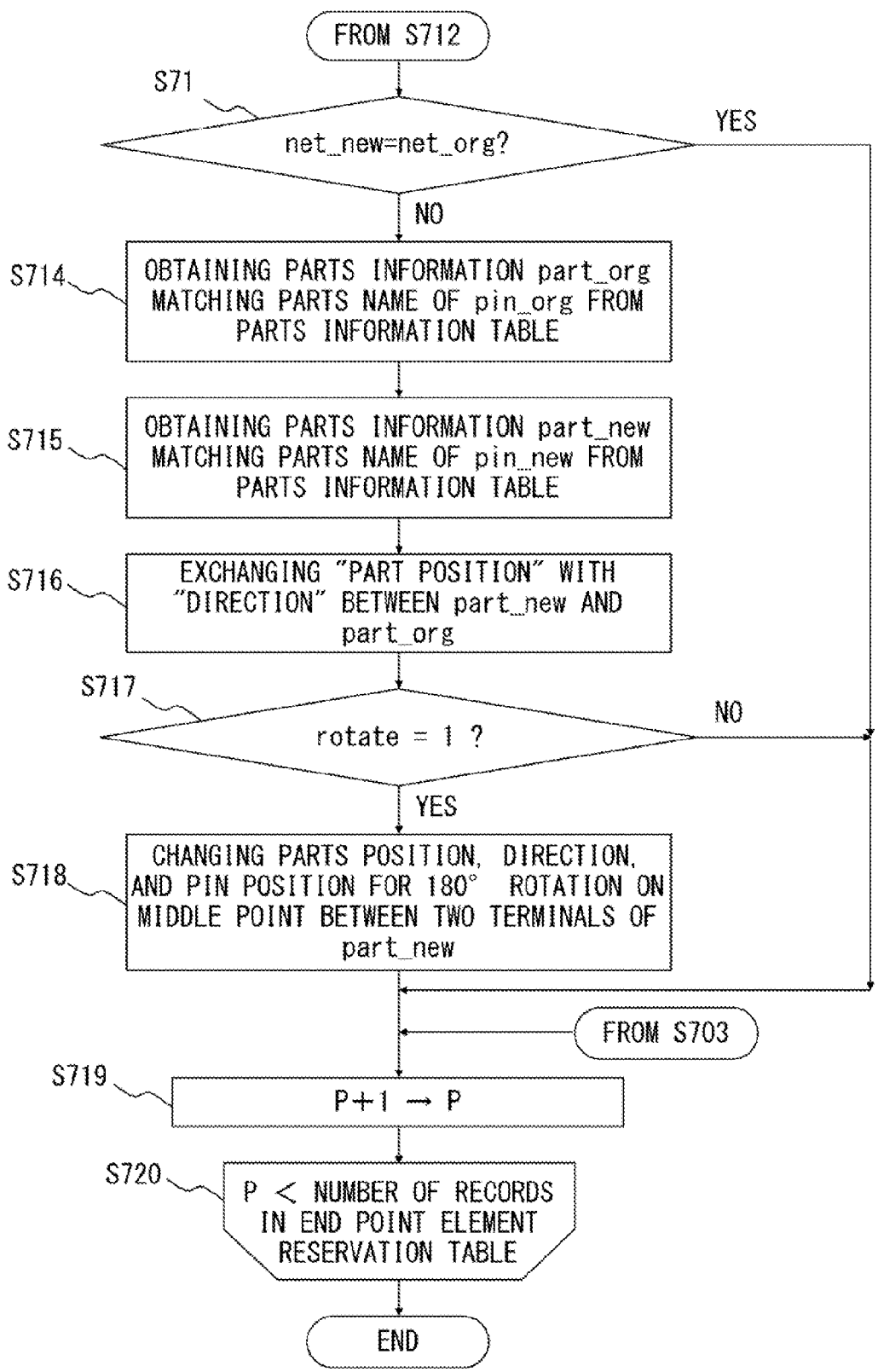
FIG. 24B is a flowchart (2) of the contents of a 2-terminal part information exchanging process.

Described first is the 2-terminal part information exchanging process. FIGS. 24A and 24B are flowcharts of the contents of the 2-terminal part information exchanging process.

In FIG. 24A, first in S701, the 2-terminal part information exchange unit 17 assigns an initial value to each variable.

Practically, the 2-terminal part information exchange unit 17 assigns the initial value of '0' to all of the variables P, pin_org, pin_new, net_org, net_new, and rotate.

The next process in S702 indicates the loop of the process with the process pair of S720 in FIG. 24B. The 2-terminal part information exchange unit 17 repeats the processes in S703 through S719 in FIG. 24B until the value of the variable P reaches the number of records of the endpoint element reservation table 84 (until it is equal to or exceeds the number of records).

Next, in S703, the 2-terminal part information exchange unit 17 refers to the P-th record of the endpoint element reservation table 84 (the first record is the '0'-th record), and determines whether or not the "connection name" data of the record is blank (null data). If the 2-terminal part information exchange unit 17 determines that the "connection name" data is blank (determination result is YES), control is passed to S719 in FIG. 24B. On the other hand, if the 2-terminal part information exchange unit 17 determines that the "connection name" is not blank (determination result is NO), control is passed to S704. The "connection name" data being not blank indicates that the node designated by the "node number" of the record including the "connection name" data is included in the automatically designed wiring path.

Next, in S704, the 2-terminal part information exchange unit 17 assigns a value to each variable. Practically, the 2-terminal part information exchange unit 17 first refers to the P-th record in the endpoint element reservation table 84, and acquires each piece of data of the "parts pin name", "connection name", and "inversion". The obtained data "parts pin name", "connection name", and "inversion" is assigned to the variables pin_org, net_new, and rotate respectively.

Next, in F705, the 2-terminal part information exchange unit 17 assigns '0' as an initial value to the variable i.

The next process in S706 indicates the loop of the process with the process pair of S712. The 2-terminal part information exchange unit 17 repeats the processes in S707 through S711 until the value of the variable i reaches the number of records of the table of the logical connection information (until it is equal to or exceeds the number of records).

Next, in S707, the 2-terminal part information exchange unit 17 refers to the i-th record of the table of the logical connection information 32 (the first record is the V-th record), and determines whether or not the "connection name" data of the record matches the value of the variable net_new. If the 2-terminal part information exchange unit 17 determines that the "connection name" data matches the value of the variable net_new (determination result is YES), control is passed to S708. On the other hand, if the 2-terminal part information exchange unit 17 determines that the "connection name" data does not match the value of the variable net_new (determination result is NO), control is passed to S709.

Next, in S708, the 2-terminal part information exchange unit 17 refers to the i-th record of the table of the logical connection information 32, and assigns the data of the "end point pin name" of the record to the variable pin_new.

Next, in S709, the 2-terminal part information exchange unit 17 refers to the i-th record of the table of the logical connection information 32, and determines whether or not the "end point pin name" data of the record matches the value of the variable pin_org. If the 2-terminal part information exchange unit 17 determines that the "end point pin name" data matches the value of the variable pin_org (determination result is YES), control is passed to S710. On the other hand, if the 2-terminal part information exchange unit 17 determines that the "end point pin name" data does not match the value of the variable pin_org (determination result is NO), control is passed to S711.

Next, in S710, the 2-terminal part information exchange unit 17 refers to the i-th record of the table of the logical connection information 32, and assigns the data of the "connection name" of the record to the variable net_org.

Next, in S711, the 2-terminal part information exchange unit 17 assigns the value obtained by adding '1' to the current value of the variable i to the variable i.

Next, in S712, the 2-terminal part information exchange unit 17 determines whether or not the loop of the process expressed with the process pair of S706 is to be terminated. If the 2-terminal part information exchange unit 17 determines that the value of the variable i has reached the number of records of the table of the logical connection information 32, the loop of the process is terminated and control is passed to S713 in FIG. 24B.

In S713 in FIG. 24B, the 2-terminal part information exchange unit 17 determines whether or not the "connection name" of the variable net_new acquired from the endpoint element reservation table 84 has matched the "connection name" of the variable net_org acquired from the table of the logical connection information 32. If the 2-terminal part information exchange unit 17 determines that these variables match in "connection name" (determination result is YES), it is not necessary to exchange the information about the parts. Therefore, control is passed to S719. On the other hand, if the 2-terminal part information exchange unit 17 determines that they do not match in "connection name" (determination result is NO), control is passed to S714.

Next, in S714, the 2-terminal part information exchange unit 17 refers to the table of the parts information 33, and acquires the information about the record about the parts having the terminal designated by the "parts pin name" of the variable pin_org. The information about the record acquired by the process is referred to as "part_org".

Next, in S715, the 2-terminal part information exchange unit 17 refers to the table of the parts information 33, and acquires the information about the record about the parts having the terminal designated by the "parts pin name" of the variable pin_new. The information about the record acquired by the process is referred to as "part_new".

Next, in S716, the 2-terminal part information exchange unit 17 exchanges the "parts position" data and the "direction" data between part_org and part_new, and returns the data to the table of the parts information 33.

Next, the 2-terminal part information exchange unit 17 determines whether or not the value of the variable rotate is '1'. If the 2-terminal part information exchange unit 17 determines that the value of the variable rotate is '1' (determination result is YES), control is passed to S718. On the other hand, if the 2-terminal part information exchange unit 17 determines that the value of the variable rotate is not '1' (that is, '0') (determination result is NO), control is passed to S719.

Next, in S718, the 2-terminal part information exchange unit 17 changes each piece of data of the "parts position", "direction", and "pin position" in the information about "part_ new". In this process, each piece of data is changed so that the position can be obtained by 180° rotating the 2-terminal part using the middle point of the line connecting the two terminals having the 2-terminal part as the center of the rotation axis.

Next, in S719, the 2-terminal part information exchange unit 17 assigns the value obtained by adding '1' to the current value of the variable P to the variable i.

Next, in S720, the 2-terminal part information exchange unit 17 determines whether or not the loop of the process expressed with the process pair of S702 in FIG. 24A is to be terminated. If the 2-terminal part information exchange unit 17 determines that the value of the variable P has reached the number of records of the table of the endpoint element reservation table 84, the loop of the process is terminated. When the loop of the process terminates, the 2-terminal part information exchanging process terminates.

Described next is the multiple-stage parts information exchanging process. FIGS. 25A, 25B, 25C, and 25D are flowcharts of the contents of the multiple-stage parts information exchanging process.

In FIG. 25A, first in S751, the multiple-stage parts information exchange unit 18 assigns an initial value to each variable. Practically, the 2-terminal part information exchange unit 17 assigns the initial value of '0' to all of the variables P, pin_org, pin_new, net_org, net_new, group_org, and group_new.

Figure 25B:
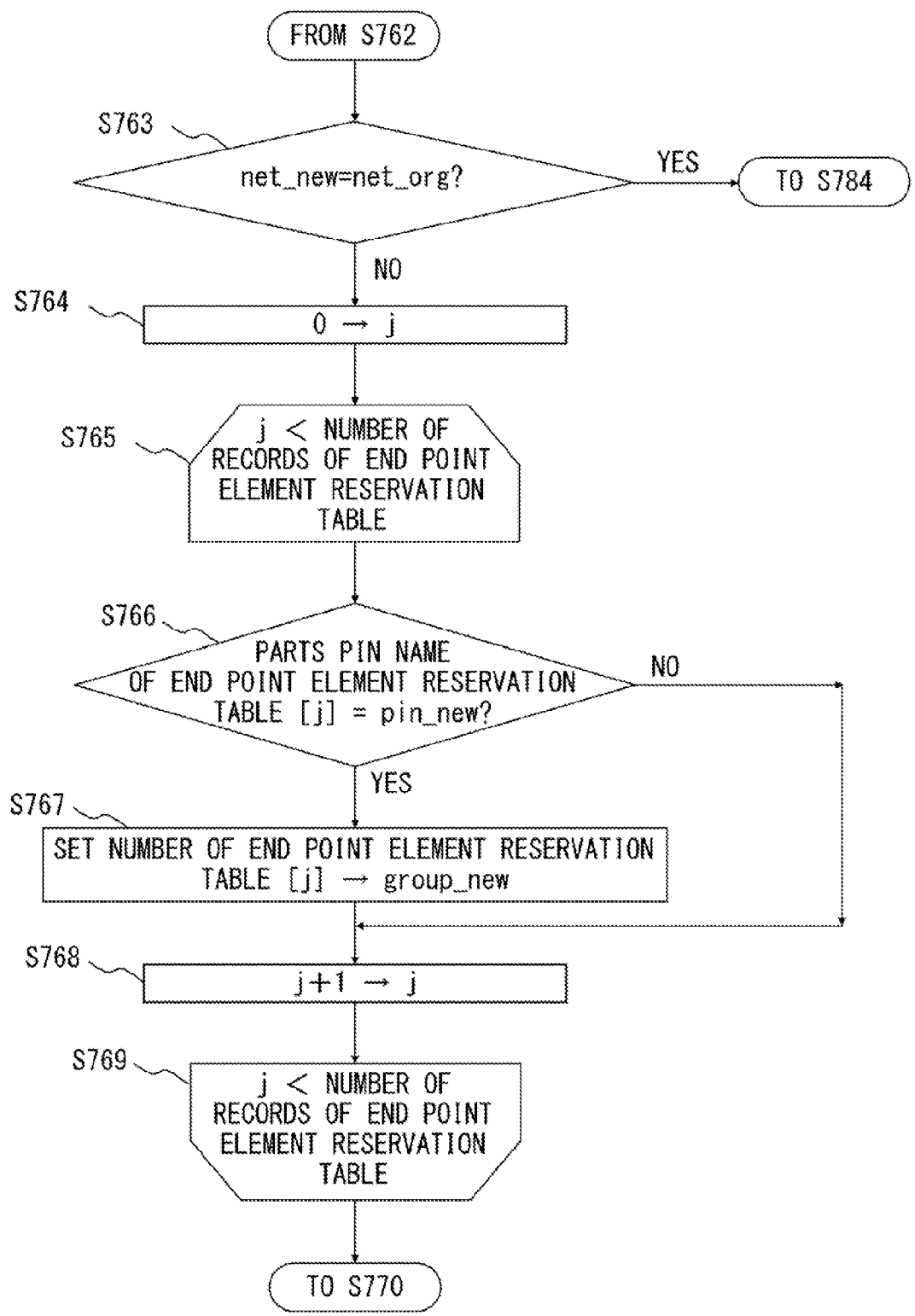
FIG. 25B is a flowchart (2) of the contents of a multiple-stage parts information exchanging process.
Figure 25C:
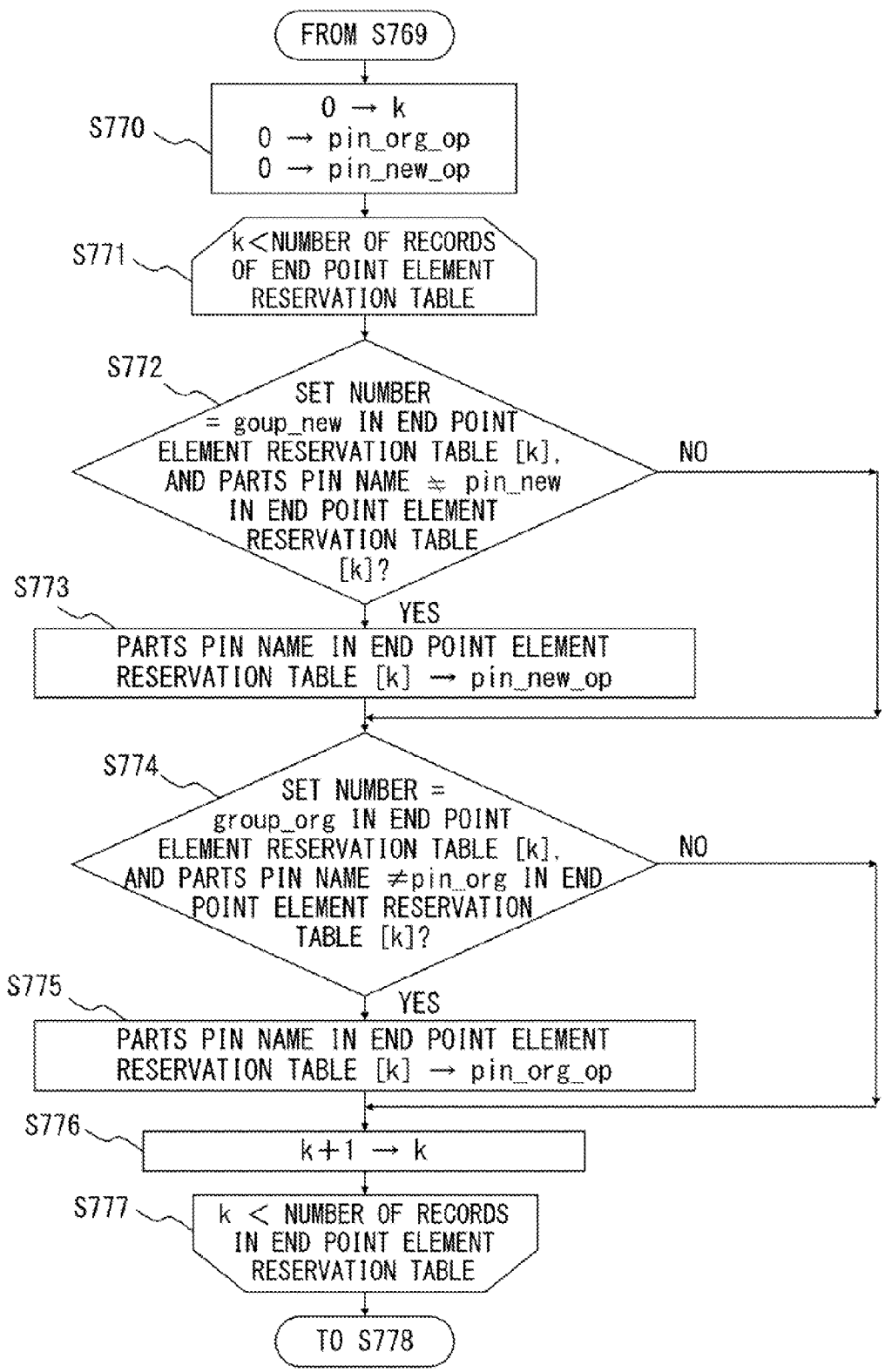
FIG. 25C is a flowchart (3) of the contents of a multiple-stage parts information exchanging process.
Figure 25D:
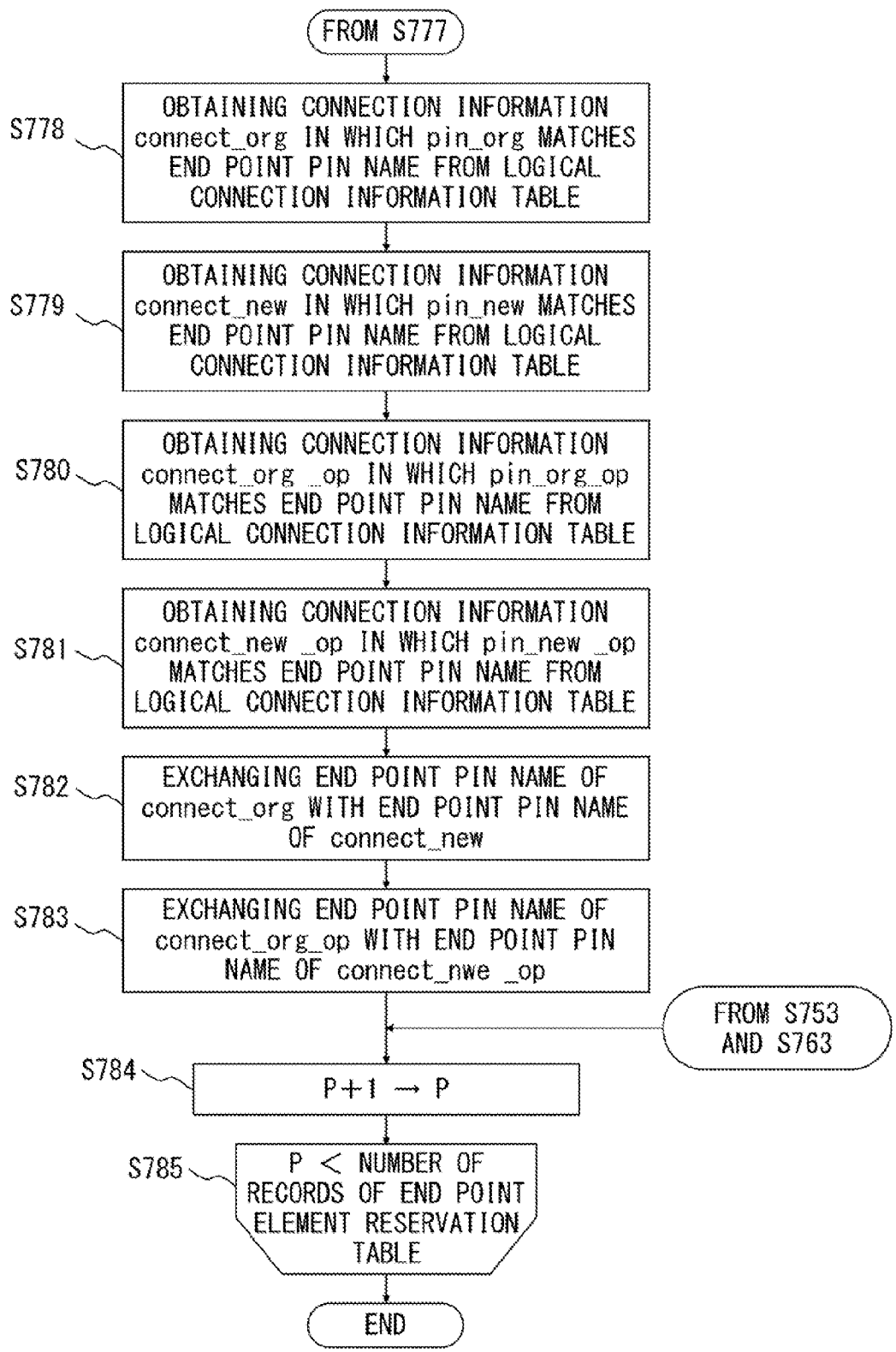
FIG. 25D is a flowchart (4) of the contents of a multiple-stage parts information exchanging process.

The next process in S752 indicates the loop of the process with the process pair of S785 in FIG. 25D. The multiple-stage parts information exchange unit 18 repeats the processes in S753 through S784 in FIG. 25D until the value of the variable P reaches the number of records of the endpoint element reservation table 84 (until it is equal to or exceeds the number of records).

Next, in S753, the multiple-stage parts information exchange unit 18 refers to the P-th record of the endpoint element reservation table 84 (the first record is the '0'-th record), and determines whether or not the "connection name" data of the record is blank (null data). If the multiple-stage parts information exchange unit 18 determines that the "connection name" data is blank (determination result is YES), control is passed to S784 in FIG. 25D. On the other hand, if the multiple-stage parts information exchange unit 18 determines that the "connection name" is not blank (determination result is NO), control is passed to S754. The "connection name" data being not blank indicates that the node designated by the "node number" of the record including the "connection name" data is included in the automatically designed wiring path.

Next, in S754, the multiple-stage parts information exchange unit 18 assigns a value to each variable. Practically, the multiple-stage parts information exchange unit 18 first refers to the P-th record in the endpoint element reservation table 84, and acquires each piece of data of the "parts pin name", "connection name", and "set number". The obtained data "parts pin name", "connection name", and "set number" is assigned to the variables pin_org, net_new, and group_org respectively.

Next, in S755, the multiple-stage parts information exchange unit 18 assigns '0' as an initial value to the variable i.

The next process in S756 indicates the loop of the process with the process pair of S762. The multiple-stage parts information exchange unit 18 repeats the processes in S757 through S761 until the value of the variable i reaches the number of records of the table of the logical connection information 32 (until it is equal to or exceeds the number of records).

Next, in S757, the multiple-stage parts information exchange unit 18 refers to the i-th record of the table of the logical connection information 32 (the first record is the V-th record), and determines whether or not the "connection name" data of the record matches the value of the variable net_new. If the multiple-stage parts information exchange unit 18 determines that the "connection name" data matches the value of the variable net_new (determination result is YES), control is passed to S758. On the other hand, if the multiple-stage parts information exchange unit 18 determines that the "connection name" data does not match the value of the variable net_new (determination result is NO), control is passed to S759.

Next, in S758, the multiple-stage parts information exchange unit 18 refers to the i-th record of the table of the logical connection information 32, and assigns the data of the "end point pin name" of the record to the variable pin_new.

Next, in S759, the multiple-stage parts information exchange unit 18 refers to the i-th record of the table of the logical connection information 32, and determines whether or not the "end point pin name" data of the record matches the value of the variable pin_org. If the multiple-stage parts information exchange unit 18 determines that the "end point pin name" data matches the value of the variable pin_org (determination result is YES), control is passed to S760. On the other hand, if the multiple-stage parts information exchange unit 18 determines that the "end point pin name" data does not match the value of the variable pin_org (determination result is NO), control is passed to S761.

Next, in S760, the multiple-stage parts information exchange unit 18 refers to the i-th record of the table of the logical connection information 32, and assigns the data of the "connection name" of the record to the variable net_org.

Next, in S761, the multiple-stage parts information exchange unit 18 assigns the value obtained by adding '1' to the current value of the variable i to the variable i.

Next, in S762, the multiple-stage parts information exchange unit 18 determines whether or not the loop of the process expressed with the process pair of S756 is to be terminated. If the multiple-stage parts information exchange unit 18 determines that the value of the variable i has reached the number of records of the table of the logical connection information 32, the loop of the process is terminated and control is passed to S763 in FIG. 25B.

In FIG. 25B, the multiple-stage parts information exchange unit 18 determines whether or not the "connection name" of the variable net_new acquired from the endpoint element reservation table 84 has matched the "connection name" of the variable net_org acquired from the table of the logical connection information 32. If multiple-stage parts information exchange unit 18 determines that these variables match in "connection name" (determination result is YES), it is not necessary to exchange the information about the parts. Therefore, control is passed to S784 in FIG. 25D. On the other hand, if the multiple-stage parts information exchange unit 18 determines that they do not match in "connection name" (determination result is NO), control is passed to S764.

Next, in S764, the multiple-stage parts information exchange unit 18 assigns '0' as an initial value to the variable j.

The next process in S765 indicates the loop of the process with the process pair of S769. The multiple-stage parts information exchange unit 18 repeats the processes in S766 through S768 until the value of the variable j reaches the number of records of the table of the logical connection information 32 (until it is equal to or exceeds the number of records).

Next, in S766, the multiple-stage parts information exchange unit 18 refers to the j-th record of the endpoint element reservation table 84 (the first record is the '0'-th record), and determines whether or not the "parts pin name" data of the record matches the value of the variable pin_new. If the multiple-stage parts information exchange unit 18 determines that the "parts pin name" data matches the value of the variable pin_new (determination result is YES), control is passed to S767. On the other hand, if the multiple-stage parts information exchange unit 18 determines that the "parts pin name" data does not match the value of the variable pin_new (determination result is NO), control is passed to S768.

Next, in S767, the multiple-stage parts information exchange unit 18 refers to the j-th record of the endpoint element reservation table 84, and assigns the data of the "set number" of the record to the variable group_new.

Next, in S768, the multiple-stage parts information exchange unit 18 assigns the value obtained by adding '1' to the current value of the variable j to the variable j.

Next, in S769, the multiple-stage parts information exchange unit 18 determines whether or not the loop of the process expressed with the process pair of S765 is to be terminated. If the multiple-stage parts information exchange unit 18 determines that the value of the variable j has reached the number of records of the endpoint element reservation table 84, the loop of the process is terminated and control is passed to S770 in FIG. 25C.

In FIG. 25C, first in S771, the multiple-stage parts information exchange unit 18 assigns an initial value to each variable. Practically, the multiple-stage parts information exchange unit 18 assigns the initial value of '0' to all of the variables k, pin_org_op, and pin_new_op.

The next process in S771 indicates the loop of the process with the process pair of S777. The multiple-stage parts information exchange unit 18 repeats the processes in S772 through S776 until the value of the variable k reaches the number of records of the endpoint element reservation table (until it is equal to or exceeds the number of records).

Next, in S772, the multiple-stage parts information exchange unit 18 performs the following process.

The multiple-stage parts information exchange unit 18 first refers to the k-th record (the first record is the '0'-th record) of the endpoint element reservation table 84, and acquires the "set number" data and the "parts pin name" data of the record. Next, the multiple-stage parts information exchange unit 18 determines the matching or non-matching between the acquired "set number" data and the variable group_new, and between the acquired "parts pin name" data and the variable pin_new. The multiple-stage parts information exchange unit 18 determines the determination result as YES and passes control to S773 only when the "set number" data matches the variable group_new, and the "parts pin name" data does not match the variable pin_new. On the other hand, in the other cases, the multiple-stage parts information exchange unit 18 determines the determination result as NO, and passes control to S774.

The multiple-stage parts information exchange unit 18 performs the process above in S772.

Next, in S773, the multiple-stage parts information exchange unit 18 assigns the "parts pin name" data of the k-th record in the endpoint element reservation table 84 to the variable pin_new_op.

Next, in S774, the multiple-stage parts information exchange unit 18 performs the following process.

The multiple-stage parts information exchange unit 18 first refers to the k-th record (the first record is the '0'-th record) of the endpoint element reservation table 84, and acquires the "set number" data and the "parts pin name" data of the record. Next, the multiple-stage parts information exchange unit 18 determines the matching or non-matching between the acquired "set number" data and the variable group_org, and between the acquired "parts pin name" data and the variable pin_org. The multiple-stage parts information exchange unit 18 determines the determination result as YES and passes control to S775 only when the "set number" data matches the variable group_org, and the "parts pin name" data does not match the variable pin_org. On the other hand, in the other cases, the multiple-stage parts information exchange unit 18 determines the determination result as NO, and passes control to S776.

The multiple-stage parts information exchange unit 18 performs the process above in S774.

Next, in S775, the multiple-stage parts information exchange unit 18 assigns the "parts pin name" data of the k-th record of the endpoint element reservation table 84 to the variable pin_org_op.

Next, in S776, the multiple-stage parts information exchange unit 18 assigns the value obtained by adding '1' to the current value of the variable k to the variable P.

Next, in S777, the multiple-stage parts information exchange unit 18 determines whether or not the loop of the process expressed with the process pair of S771 is to be terminated. If the multiple-stage parts information exchange unit 18 determines that the value of the variable k has reached the number of records of the endpoint element reservation table 84, the loop of the process is terminated and control is passed to S778 in FIG. 25D.

In S778 in FIG. 25D, the multiple-stage parts information exchange unit 18 refers to the table of the logical connection information 32, and acquires the information about the record in which the "end point pin name" data matches the "parts pin name" data of the variable pin_org. The information about the record acquired by the process is referred to as "connect_org".

Next, in S779, the multiple-stage parts information exchange unit 18 refers to the table of the logical connection information 32, and acquires the information about the record in which the "end point pin name" data matches the "parts pin name" data of the variable pin_new. The information about the record acquired by the process is referred to as "connect_new".

Next, in S780, the multiple-stage parts information exchange unit 18 refers to the table of the logical connection information 32, and acquires the information about the record in which the "end point pin name" data matches the "parts pin name" data of the variable pin_org_op. The information about the record acquired by the process is referred to as "connect_org_op".

Next, in S781, the multiple-stage parts information exchange unit 18 refers to the table of the logical connection information 32, and acquires the information about the record in which the "end point pin name" data matches the "parts pin name" data of the variable pin_new_op. The information about the record acquired by the process is referred to as "connect_new_op".

Next, in S782, the multiple-stage parts information exchange unit 18 exchanges the "endpoint pin name" data between connect_org and connect_new and returns the result to the table of the logical connection information 32.

Next, in S783, the multiple-stage parts information exchange unit 18 exchanges the "endpoint pin name" data between connect_org_op and connect_new_op and returns the result to the table of the logical connection information 32.

Next, in S784, the multiple-stage parts information exchange unit 18 assigns the value obtained by adding '1' to the current value of the variable P to the variable P.

Next, in S785, the multiple-stage parts information exchange unit 18 determines whether or not the loop of the process expressed with the process pair of S752 in FIG. 25A is to be terminated. If the multiple-stage parts information exchange unit 18 determines that the value of the variable P has reached the number of records of the endpoint element reservation table 84, the loop of the process is terminated. When the loop of the process terminates, the multiple-stage parts information exchanging process terminates.

By the MPU 10 performing each of the above-mentioned processes, a wiring path can be automatically designed by the wiring design support device 1 in FIG. 1.

Next, the process of automatically designing a path of the wiring by the wiring design support device 1 when transmitting a differential signal using the wiring on the printed circuit board is described below with reference to FIGS. 26A and 26B.

When a differential signal is transmitted, it is preferable that the paths of 2-line set differential signal transmitting wiring 91 for transmitting a pair of differential signals are arranged in parallel.

In this case, a positive side terminal or a negative side terminal is selected from between a pair of source terminals and a pair of destination terminals in the differential signal. Next, the wiring design support device 1 automatically designs a wiring path for connecting the selected terminals. Then, the wiring path obtained by the automatic designing process is replaced with differential signal wiring as a two-line set of parallel wiring by the differential signal wiring replacement unit 19.

Figure 26B:
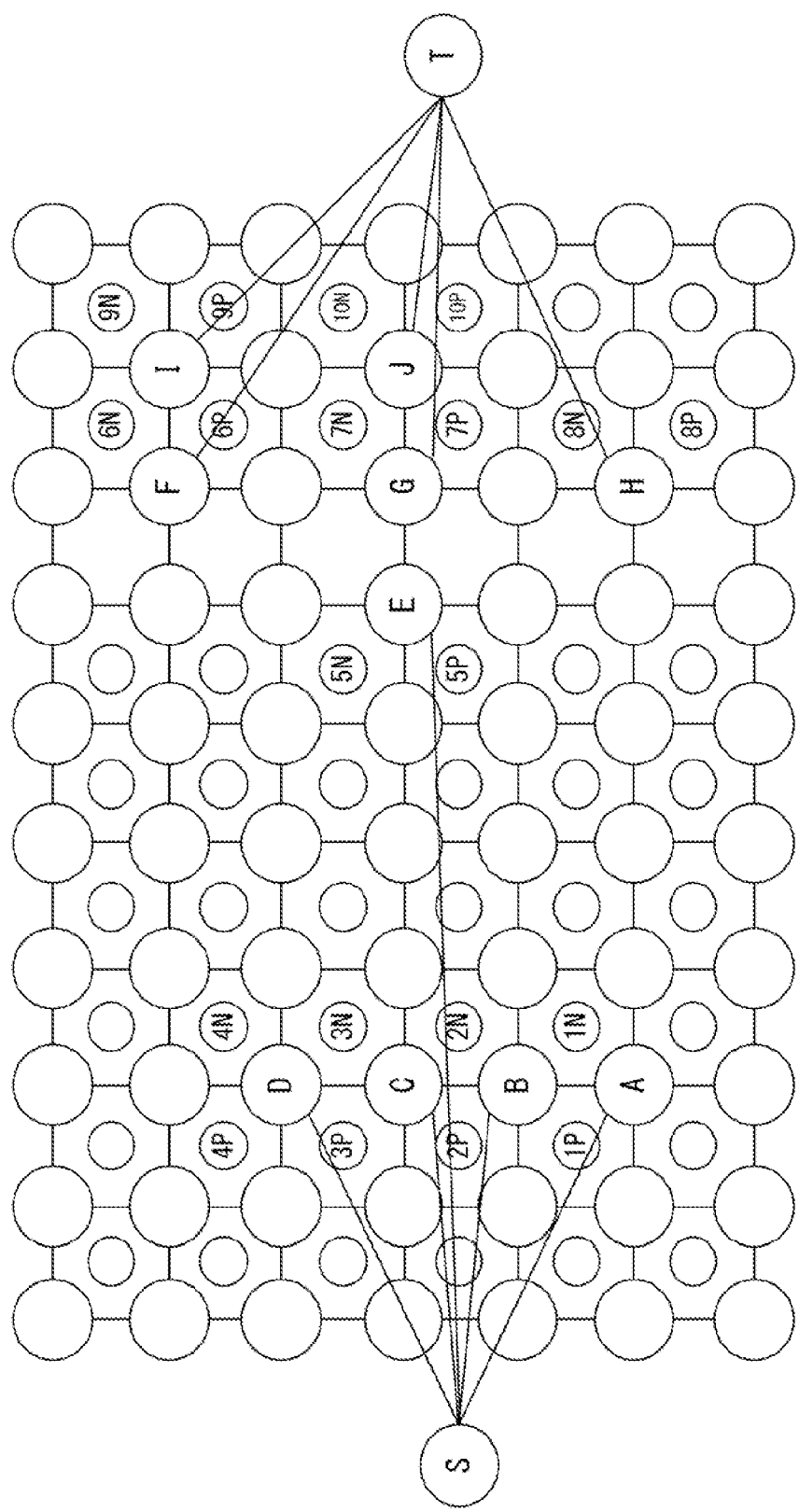
FIG. 26B is an example (3) of generating a flow network.

An example of generating a flow network in FIG. 26B is a case in which the wiring design support device 1 automatically designs differential signal wiring. In FIG. 26B, 1P, 1N, 2P, 2N, . . . , 10P, 10N indicate the positions of the terminals to be wired by the differential signal wiring. "P indicates a positive side terminal while "N" indicates a negative side terminal.

A grid point A is closest to the position of the terminal selected from between the positive side terminal 1P and the negative side terminal 1N as a pair of terminals for input or output of a differential signal. The same holds true with the grid points B through J, that is, they are the grid points closest to the position of the terminal selected from between the terminals 2P and 2N through 10P and 10N.

In this example, it is assumed that the positive side terminals 1P, 2P, . . . , and 10P are selected in the following explanation.

After designating the grid points for wiring, a flow network is generated as in the case illustrated in FIG. 7. The example in FIG. 26B is the case in which the starting point S is connected to the grid points A through E through respective branches, and the end point T is connected to the grid points F through J through respective branches. Then, the wiring design support device 1 searches a flow path, determines a wiring path based on the search result as described above, and determines five wiring paths connecting the positive side terminals 1P through 5P and 6P through 10P.

The differential signal wiring replacement unit 19 replaces each of the five wiring paths with 2-line set parallel wiring. Then, the wiring is connected to each terminal by setting one wiring of the parallel wiring as the wiring path between the positive side terminals 1P through 5P and 6P through 10P, and the other wiring as the wiring path between the negative side terminals 1N through 5N and 6N through 10N. Thus, it is appropriate for transmission of a differential signal. The wiring design support device 1 in FIG. 1 can also automatically design the path having a section in which a pair of wiring is arranged in parallel.

When the path of the differential signal wiring is automatically designed, it is preferable that the interval of the grid points in the grid designed by the directional graph definition unit 11 is longer than in the case of a normal wiring path to prevent a short circuit between wiring by the parallel wiring after the replacement or an invasion upon a wiring prohibited area.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device which supports designing a wiring path on a printed circuit board, the device comprising:
   a directional graph definition unit to define, on a target area surface on which the wiring path is generated, a directional graph having a grid point as a node and a line as a branch connecting adjacent grid points;
   a wiring prohibited area information acquisition unit to acquire an input about wiring prohibited area information about a position of an area in which an arrangement of wiring is prohibited on the target area surface;
   a wiring information acquisition unit to acquire an input about wiring information as information about a set of plural sets of grid points connected by respective wiring in the grid points defined on the target area surface;
   a flow network generation unit to generate a flow network by setting a flow capacity to "0" for a branch connected to a grid point placed in an area indicated by the wiring prohibited area information in branches configuring the directional graph, setting a flow capacity to "1" for other branches, and connecting a starting point and an end point of a flow through a branch having the flow capacity of "1" to a pair of grid points belonging to each set of the plural sets of grid points;
   a flow path search unit to search the flow network for a path of a flow having a maximum amount of flow from the starting point to the end point under the flow capacity set by the flow network generation unit for each branch; and
   a wiring path determination unit to determine the plural wiring paths connecting respective pairs of grid points belonging to respective sets of the plural sets of grid points indicated by the wiring information according to a search result of the path by the flow path search unit.

2. The device according to claim 1, wherein
   the interval of the grid point is set using a definition of a line width and a wiring interval in the wiring on the target area surface.

3. The device according to claim 1, wherein
   the wiring information acquisition unit generates correspondence information indicating a correspondence between a terminal connected through the wiring and the grid point from an input of information about an arrangement position on the target area surface of the terminal, and generates the wiring information using the correspondence information and an input of logical connection information designating a terminal for connection using the wiring.

4. The device according to claim 3, wherein:
   when a terminal connected by the wiring designated by the logical connection information is one terminal of a 2-terminal part, the wiring information acquisition unit further generates the correspondence information about another terminal of the 2-terminal part and the grid point;

when a terminal connected by the wiring designated by the logical connection information is one terminal of a 2-terminal part, the flow network generation unit newly defines a relay node for the 2-terminal part, inserts the relay node into a branch connecting a grid point for the one terminal to the starting point or the end point, and connects a grid point whose correspondence with the other terminal is indicated by the correspondence information to the relay node through a branch having a flow capacity of "1"; and the device further comprises
a 2-terminal part information exchange unit to change the input information about an arrangement position on the target area surface on a terminal to be connected by the wiring when a terminal connected by the wiring whose path is determined by the wiring path determination unit is another terminal in the 2-terminal part, and to change the information about the other terminal with the information about the other terminal in the 2-terminal part, thereby matching the terminal connected by the wiring to the terminal designated by the logical connection information.

5. The device according to claim 4, wherein
when there are at least two wiring whose connection targets are 2-terminal parts having same shapes for plural wiring determined by the wiring path determination unit, the 2-terminal part information exchange unit changes the input information about an arrangement position on the target area surface of a terminal to be connected by the wiring, and exchanges the information about the terminal of a 2-terminal part connected to one wiring with the information about the terminal of another 2-terminal part, thereby matching the terminal connected to the one wiring to the terminal designated by the logical connection information.

6. The device according to claim 3, further comprising
a multiple-stage parts information exchange unit to change the input information about an arrangement position on the target area surface of a terminal to be connected by the wiring when there are at least two wiring whose connection targets are multiple-stage parts having same shapes for plural wiring determined by the wiring path determination unit, and to exchange the information about the terminal of a multiple-stage part connected to one wiring with the information about the terminal of another multiple-stage part, thereby matching the terminal connected to the one wiring to the terminal designated by the logical connection information.

7. The device according to claim 1, further comprising
a differential signal wiring replacement unit to replace the wiring whose path is determined by the wiring path determination unit with differential signal wiring as 2-line set parallel wiring.

8. A method of supporting designing a wiring path on a printed circuit board, the method comprising:
defining, by using a computer, on a target area surface on which the wiring path is generated, a directional graph having a grid point as a node and a line as a branch connecting adjacent grid points;
acquiring, by using the computer, an input about wiring prohibited area information about a position of an area in which an arrangement of wiring is prohibited on the target area surface;
acquiring, by using the computer, an input about wiring information as information about a set of plural sets of grid points connected by respective wiring in the grid points defined on the target area surface;
generating, by using the computer, a flow network by setting a flow capacity to "0" for a branch connected to a grid point placed in an area indicated by the wiring prohibited area information in branches configuring the directional graph, setting a flow capacity to "1" for other branches, and connecting a starting point and an end-point of a flow through a branch having the flow capacity of "1" to a pair of grid points belonging to each set of the plural sets of grid points;
searching, by using the computer, the flow network for a path of a flow having a maximum amount of flow from the starting point to the end point under the flow capacity for each branch; and
determining, by using the computer, the plural wiring paths connecting respective pairs of grid points belonging to respective sets of the plural sets of grid points indicated by the wiring information according to a search result of the path.

9. The method according to claim 8, wherein
the interval of the grid point is set using a definition of a line width and a wiring interval in the wiring on the target area surface.

10. The method according to claim 8, wherein
in acquiring the input about the wiring information, correspondence information indicating a correspondence between a terminal connected through the wiring and the grid point is generated from an input of information about an arrangement position on the target area surface of the terminal, and the wiring information is generated using the correspondence information and an input of logical connection information designating a terminal for connection using the wiring.

11. The method according to claim 10, wherein:
in acquiring the input about the wiring information, when a terminal connected by the wiring designated by the logical connection information is one terminal of a 2-terminal part, the correspondence information about another terminal of the 2-terminal part and the grid point is further generated;
in generating the flow network, when a terminal connected by the wiring designated by the logical connection information is one terminal of a 2-terminal part, a relay node for the 2-terminal part is newly defined, the relay node is inserted into a branch connecting a grid point for the one terminal to the starting point or the end point, and connects a grid point whose correspondence with the other terminal is indicated by the correspondence information to the relay node through a branch having a flow capacity of "1"; and
the method further comprises
changing the input information about an arrangement position on the target area surface on a terminal to be connected by the wiring when a terminal connected by any of plural wiring determined by determining a path of the plural wiring is another terminal in the 2-terminal part, and exchanging the information about the other terminal with the information about the other terminal in the 2-terminal part, thereby matching the terminal connected by the wiring to the terminal designated by the logical connection information.

12. The method according to claim 11, wherein
in matching the terminal connected by the wiring to the terminal designated by the logical connection information, when there are at least two wiring whose connection targets are 2-terminal parts having same shapes for plural wiring determined by determining the path of the plural wiring, the input information about an arrangement position on the target area surface of a terminal to be connected by the wiring is changed, and the information about the terminal of a 2-terminal part connected to one wiring and the information about the terminal of another 2-terminal part are exchanged, thereby matching the terminal connected to the one wiring to the terminal designated by the logical connection information.

13. The method according to claim 10, further comprising changing the input information about an arrangement position on the target area surface of a terminal to be connected by the wiring when there are at least two wiring whose connection targets are multiple-stage parts having same shapes for plural wiring determined by determining a path of the plural wiring, and exchanging the information about the terminal of a multiple-stage part connected to one wiring with the information about the terminal of another multiple-stage part, thereby matching the terminal connected to the one wiring to the terminal designated by the logical connection information.

14. A computer-readable non-transitory recording medium having stored therein a program for causing a computer to execute a process for support designing a wiring path on a printed circuit board, the process comprising:
  defining, on a target area surface on which the wiring path is generated, a directional graph having a grid point as a node and a line as a branch connecting adjacent grid points;
  acquiring an input about wiring prohibited area information about a position of an area in which an arrangement of wiring is prohibited on the target area surface;
  acquiring an input about wiring information as information about a set of plural sets of grid points connected by respective wiring in the grid points defined on the target area surface;
  generating a flow network by setting a flow capacity to "0" for a branch connected to a grid point placed in an area indicated by the wiring prohibited area information in branches configuring the directional graph, setting a flow capacity to "1" for other branches, and connecting a starting point and an end point of a flow through a branch having the flow capacity of "1" to a pair of grid points belonging to each set of the plural sets of grid points;
  searching the flow network for a path of a flow having a maximum amount of flow from the starting point to the end point under the flow capacity for each branch; and
  determining the plural wiring paths connecting respective pairs of grid points belonging to respective sets of the plural sets of grid points indicated by the wiring information according to a search result of the path.

15. The recording medium according to claim 14, wherein the interval of the grid point is set using a definition of a line width and a wiring interval in the wiring on the target area surface.

16. The recording medium according to claim 14, wherein in acquiring the input about the wiring information, correspondence information indicating a correspondence between a terminal connected through the wiring and the grid point is generated from an input of information about an arrangement position on the target area surface of the terminal, and the wiring information is generated using the correspondence information and an input of logical connection information designating a terminal for connection using the wiring.

17. The recording medium according to claim 16, wherein:
in acquiring the input about the wiring information, when a terminal connected by the wiring designated by the logical connection information is one terminal of a 2-terminal part, the correspondence information about another terminal of the 2-terminal part and the grid point is further generated;
in generating the flow network, when a terminal connected by the wiring designated by the logical connection information is one terminal of a 2-terminal part, a relay node for the 2-terminal part is newly defined, the relay node is inserted into a branch connecting a grid point for the one terminal to the starting point or the end point, and connects a grid point whose correspondence with the other terminal is indicated by the correspondence information to the relay node through a branch having a flow capacity of "1"; and
the program further comprises
  changing the input information about an arrangement position on the target area surface on a terminal to be connected by the wiring when a terminal connected by any of plural wiring determined by determining a path of the plural wiring is another terminal in the 2-terminal part, and exchanging the information about the other terminal with the information about the other terminal in the 2-terminal part, thereby matching the terminal connected by the wiring to the terminal designated by the logical connection information.

18. The recording medium according to claim 17, wherein
in matching the terminal connected by the wiring to the terminal designated by the logical connection information, when there are at least two wiring whose connection targets are 2-terminal parts having same shapes for plural wiring determined by determining the path of the plural wiring, the input information about an arrangement position on the target area surface of a terminal to be connected by the wiring is changed, and the information about the terminal of a 2-terminal part connected to one wiring and the information about the terminal of another 2-terminal part are exchanged, thereby matching the terminal connected to the one wiring to the terminal designated by the logical connection information.

19. The recording medium according to claim 16, the program further comprising
changing the input information about an arrangement position on the target area surface of a terminal to be connected by the wiring when there are at least two wiring whose connection targets are multiple-stage parts having same shapes for plural wiring determined by determining a path of the plural wiring, and exchanging the information about the terminal of a multiple-stage part connected to one wiring with the information about the terminal of another multiple-stage part, thereby matching the terminal connected to the one wiring to the terminal designated by the logical connection information.

* * * * *